US 8,436,814 B2

(12) United States Patent
Hisatsugu et al.

(10) Patent No.: US 8,436,814 B2
(45) Date of Patent: May 7, 2013

(54) IN-VEHICLE MANIPULATION APPARATUS AND IN-VEHICLE INPUT APPARATUS

(75) Inventors: Shinsuke Hisatsugu, Kariya (JP); Motoki Tachiiri, Nagoya (JP); Koichi Masuda, Obu (JP); Tsuneo Uchida, Okazaki (JP); Takashi Aoki, Gifu (JP); Hiroaki Sasaki, Chiryu (JP); Kunihiro Nakagawa, Anjo (JP); Hiromune Wada, Nagoya (JP)

(73) Assignee: Denso Corporation, Kariya (JP)

( * ) Notice: Subject to any disclaimer, the term of this patent is extended or adjusted under 35 U.S.C. 154(b) by 735 days.

(21) Appl. No.: 12/564,330

(22) Filed: Sep. 22, 2009

(65) Prior Publication Data
US 2010/0073291 A1 Mar. 25, 2010

(30) Foreign Application Priority Data

Sep. 25, 2008 (JP) ................................. 2008-246263
Oct. 23, 2008 (JP) ................................. 2008-273522
Aug. 18, 2009 (JP) ................................. 2009-189061

(51) Int. Cl.
*G09G 5/08* (2006.01)
*G09G 5/00* (2006.01)

(52) U.S. Cl.
USPC ........... 345/161; 345/156; 345/184; 74/471 R

(58) Field of Classification Search .................. None
See application file for complete search history.

(56) References Cited

U.S. PATENT DOCUMENTS

| 4,895,376 | A | * | 1/1990 | Chiang Shiung-Fei ........... 463/2 |
| 6,448,670 | B1 | | 9/2002 | Onodera et al. |
| 7,215,329 | B2 | | 5/2007 | Yoshikawa et al. |
| 8,028,599 | B2 | * | 10/2011 | Mack ....................... 74/471 XY |
| 2002/0109875 | A1 | | 8/2002 | Eijk et al. |
| 2006/0022958 | A1 | | 2/2006 | Shiga |
| 2007/0064927 | A1 | | 3/2007 | Kusunoki et al. |
| 2008/0278448 | A1 | * | 11/2008 | Nilsagard et al. ............. 345/161 |

FOREIGN PATENT DOCUMENTS

| JP | 11-194891 | 7/1999 |
| JP | 11-249753 | 9/1999 |
| JP | 11-338628 | 12/1999 |
| JP | 2000-172435 | 6/2000 |
| JP | 2001-014985 | 1/2001 |

(Continued)

OTHER PUBLICATIONS

Japanese Office Action dated Nov. 11, 2010, issued in corresponding Japanese Application No. 2008-273522, with English translation.

(Continued)

*Primary Examiner* — Andrew L Sniezek
(74) *Attorney, Agent, or Firm* — Nixon & Vanderhye PC

(57) ABSTRACT

A two-dimensional operation section includes a stick-shaped rocking shaft having an end having an operation knob. The operation knob is operated within a predetermined two-dimensional operation surface determined as an operation range such that a rocking axis of the rocking shaft tilts from a predetermined neutral angular position to a direction corresponding to an instructed position. A one-dimensional operation section has an operation surface exposed in a main surface of the operation knob, the main surface being an end surface of the rocking shaft. The one-dimensional operation section can be operated in a predetermined one-dimensional operation direction determined within the two-dimensional operation surface relative to the operation surface.

22 Claims, 55 Drawing Sheets

FOREIGN PATENT DOCUMENTS

| | | |
|---|---|---|
| JP | 2002-157035 | 5/2002 |
| JP | 2002-207553 | 7/2002 |
| JP | 2002-366300 | 12/2002 |
| JP | 2003-308760 | 10/2003 |
| JP | 2003-335192 | 11/2003 |
| JP | 2004-224202 | 8/2004 |

OTHER PUBLICATIONS

Japanese Office Action dated Aug. 4, 2010, issued in corresponding Japanese Application No. 2009-189061, with English translation.

* cited by examiner

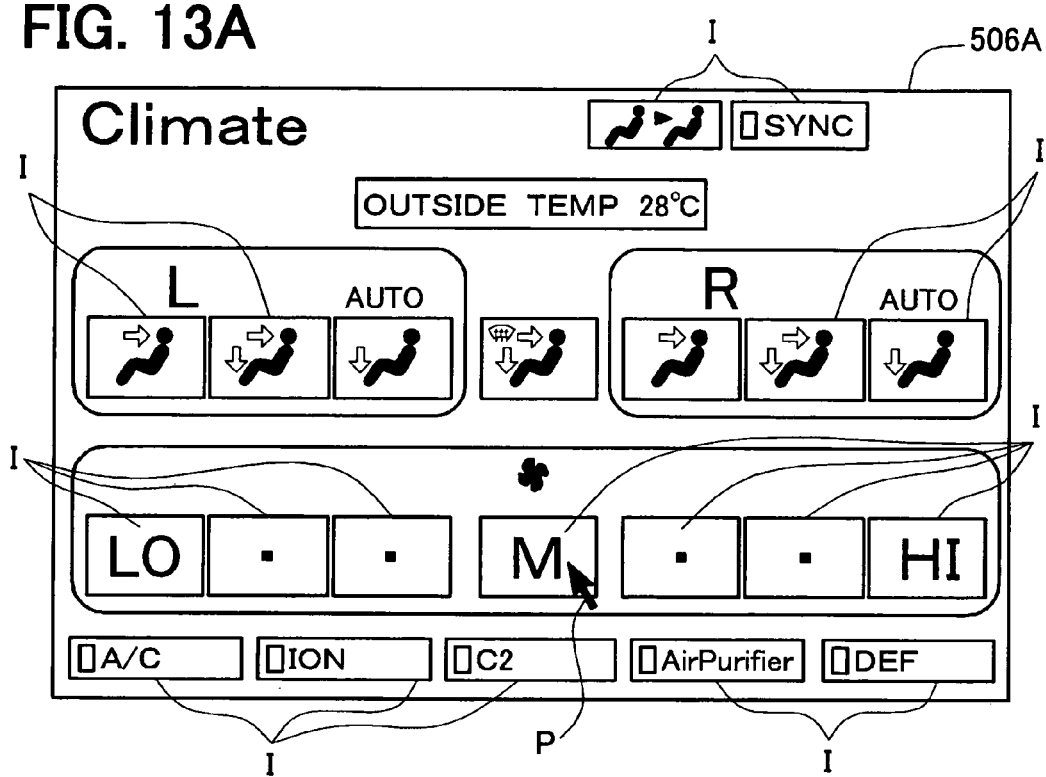
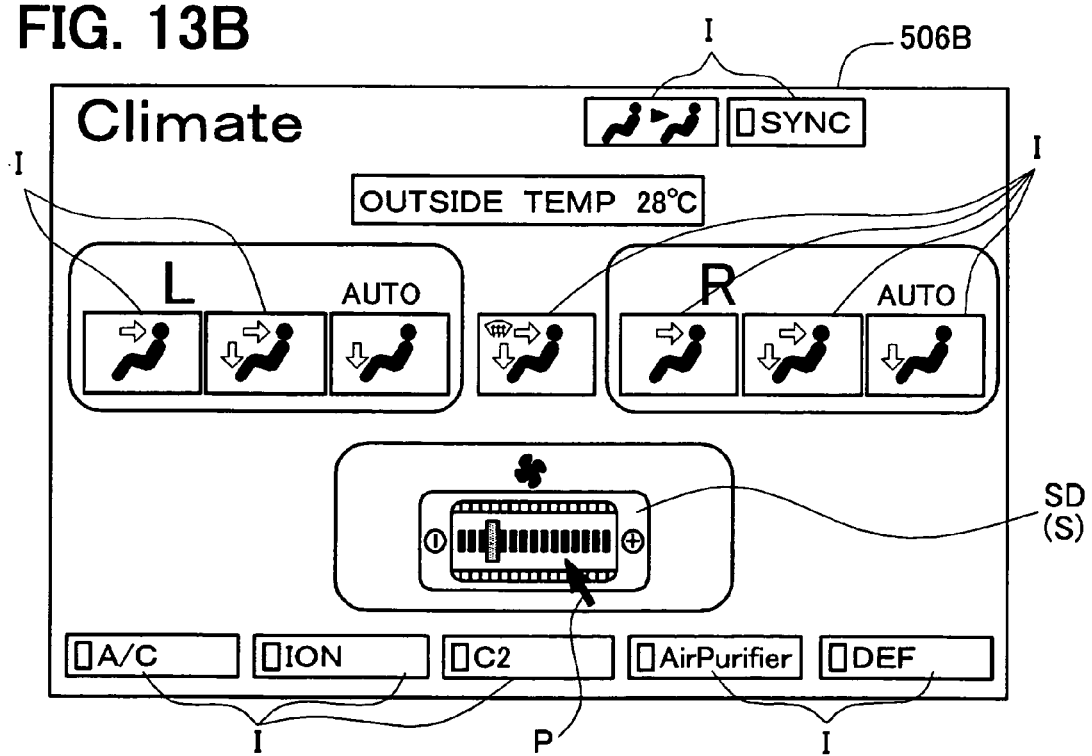

IN-VEHICLE MANIPULATION APPARATUS AND IN-VEHICLE INPUT APPARATUS

CROSS REFERENCE TO RELATED APPLICATIONS

This application is based on and incorporates herein by reference Japanese Patent Applications No. 2008-246263 filed on Sep. 25, 2008, No. 2008-273522 filed on Oct. 23, 2008, and No. 2009-189061 filed on Aug. 18, 2009.

FIELD OF THE INVENTION

The present invention relates to an in-vehicle manipulation apparatus. The present invention further relates to an in-vehicle input apparatus.

BACKGROUND OF THE INVENTION

Recently, a force-sense-applying manipulation apparatus is developed and put into practice as a two-dimensional manipulation apparatus, in which when operating force is applied to a movable operation section, reaction force against such operating force is applied to a stick-type operation section, so that a force sense to the operation is applied (for example, JP-A-2002-207553). However, when such a manipulation apparatus is used to move a predetermined display object such as a pointer image displayed on a screen to perform position instruction, the following problem occurs. That is, since the stick-type movable operation section uses wrist power to perform operation, a pointer image is hard to be finely moved, so that the pointer image is not easily placed on an intended position. Particularly, in the case of Japanese Syllabary input screen, while an input range (operation image) is set and displayed for each character on the screen, a pointer image is hard to be located on an intended character area because each input range is narrow. Furthermore, it is easily conceived that when such operation is performed in a form of blind operation by a driver, movement of a pointer image becomes more difficult. In this way, the stick-type movable operation section (two-dimensional operation section) mounted in a vehicle has had a problem that fine position instruction operation is difficult, leading to an excessive operation load to a user.

Furthermore, such a manipulation apparatus may be operated even during vehicle traveling. Since vibration tends to occur during vehicle traveling, fine position instruction-operation as above becomes more difficult during that.

Patent applications have been made on an input apparatus that is mounted in a vehicle (for example, motorcar) for operating various in-vehicle devices, and has a function of preventing false operation. For example, according to a technique of JP-A-2003-335192, a particular amount of operation reaction force corresponding to operation amount of an operator is exerted in a coordinate input apparatus (simply called "input apparatus") depending on a vehicle condition, so that false operation is prevented. Such an input apparatus requires various input methods. In contrast, the input apparatus further requires an input method, which may prevent false operation, by reason of the various input methods.

SUMMARY OF THE INVENTION

In view of the foregoing problems, it is a first problem of the invention to produce an in-vehicle manipulation apparatus having a stick-type two-dimensional operation section, which enables fine position instruction operation, and may reduce operation load of a user. It is a second problem of the invention to produce an in-vehicle input apparatus that reduces occurrence of false operation.

According to an aspect of the invention, an in-vehicle manipulation apparatus, which is in an operable position for a user sitting on a seat, comprises a two-dimensional operation section (200) having a stick-shaped rocking shaft (114S) having an operation knob (101) formed at an end of the shaft, wherein the operation knob (101) is operated within a predetermined two-dimensional operation surface determined as an operation range such that a rocking axis (Z) of the rocking shaft (114S) tilts from a beforehand determined, neutral angular position to a direction corresponding to an instructed position. The in-vehicle manipulation apparatus further comprises a one-dimensional operation section (300) that has an operation surface (301a) exposed in a main surface (101a) of the operation knob (101), the main surface being an end surface of the rocking shaft (114S), and can be operated in a predetermined one-dimensional operation direction (Y) determined within the two-dimensional operation surface relative to the operation surface (301a).

According to another aspect of the invention, an in-vehicle manipulation apparatus, which is mounted in an operable position for a user sitting on a seat, comprises a display device (51) disposed in a screen-viewable manner for the user. The in-vehicle manipulation apparatus further comprises a two-dimensional operation section (200) having a stick-shaped rocking shaft (114S) having an operation knob (101) formed at an end of the shaft, wherein the operation knob (101) is operated within a predetermined two-dimensional operation surface determined as an operation range such that a rocking axis (Z) of the rocking shaft (114S) tilts from a beforehand determined, neutral angular position to a direction corresponding to a direction along which the display object is to move on the screen. The in-vehicle manipulation apparatus further comprises a one-dimensional operation section (300) that has an operation surface exposed in a main surface (101a) of the operation knob (101), the main surface being an end surface of the rocking shaft (114S), and can be operated in a predetermined one-dimensional operation direction (Y) relative to the operation surface. The in-vehicle manipulation apparatus further comprises two-dimensional operation control means (S4) that two-dimensionally moves, on the screen of the display device (51), a predetermined display object being displayed on the screen based on operation to the two-dimensional operation section (200). One-dimensional operation control means (S5) that can perform at least one of the following i) and ii), on the screen of the display device (51), to a predetermined display object being displayed on the screen based on the operation to the one-dimensional operation section (300): i) display movement control of moving the display object in a predetermined one-dimensional display direction corresponding to the one-dimensional operation direction (Y) along which operation is performed, and ii) control content change control of sequentially changing a plurality of control contents beforehand determined in changing order into a direction corresponding to the one-dimensional operation direction (Y), along which operation is performed, between forward and reverse directions of the changing order.

According to still another aspect of the invention, an in-vehicle input apparatus comprises a first input device (4) operated by operation of an operator. The in-vehicle input apparatus further comprises a second input device (5) that is operated by operation of an operator, the operation being similar to or different from the operation to the first input device (4), and integrally provided with the first input device (4) as a part of the first input device (4). The in-vehicle input apparatus further comprises holding means (S300) for stopping operation of the first input device (4) and holding the first input device (4). The holding means (S300) temporarily locks operation of the first input device (4) so as to hold the first input device (4) not to work in the case that the following condition i) is satisfied: i) operation to the second input device (5) is performed.

According to still another aspect of the invention, an in-vehicle input apparatus, which performs predetermined input to an output device, comprises a first input device (4) operated by operation of an operator. The in-vehicle input apparatus further comprises a second input device (5) that is operated by operation of an operator, the operation being similar to or different from the operation to the first input device (4), and integrally provided with the first input device (4) as a part of the first input device (4). The in-vehicle input apparatus further comprises holding means (S300) for stopping operation of the first input device (4) and holding the first input device (4). The holding means (S300) temporarily locks operation of the first input device (4) so as to hold the first input device (4) not to work in the case that the following conditions i) and ii) are satisfied: i) operation to the second input device (5) is performed during performing operation to the first input device (4), and ii) output from the output device relates to output produced when the second input device (5) is operated.

BRIEF DESCRIPTION OF THE DRAWINGS

The above and other objects, features and advantages of the present invention will become more apparent from the following detailed description made with reference to the accompanying drawings. In the drawings:

FIG. 13A It is an eighth embodiment of image display on a display device;

FIG. 13B It is a ninth embodiment of image display on a display device;

DETAILED DESCRIPTION OF PREFERRED EMBODIMENTS

[First Embodiment]

Figure 1:
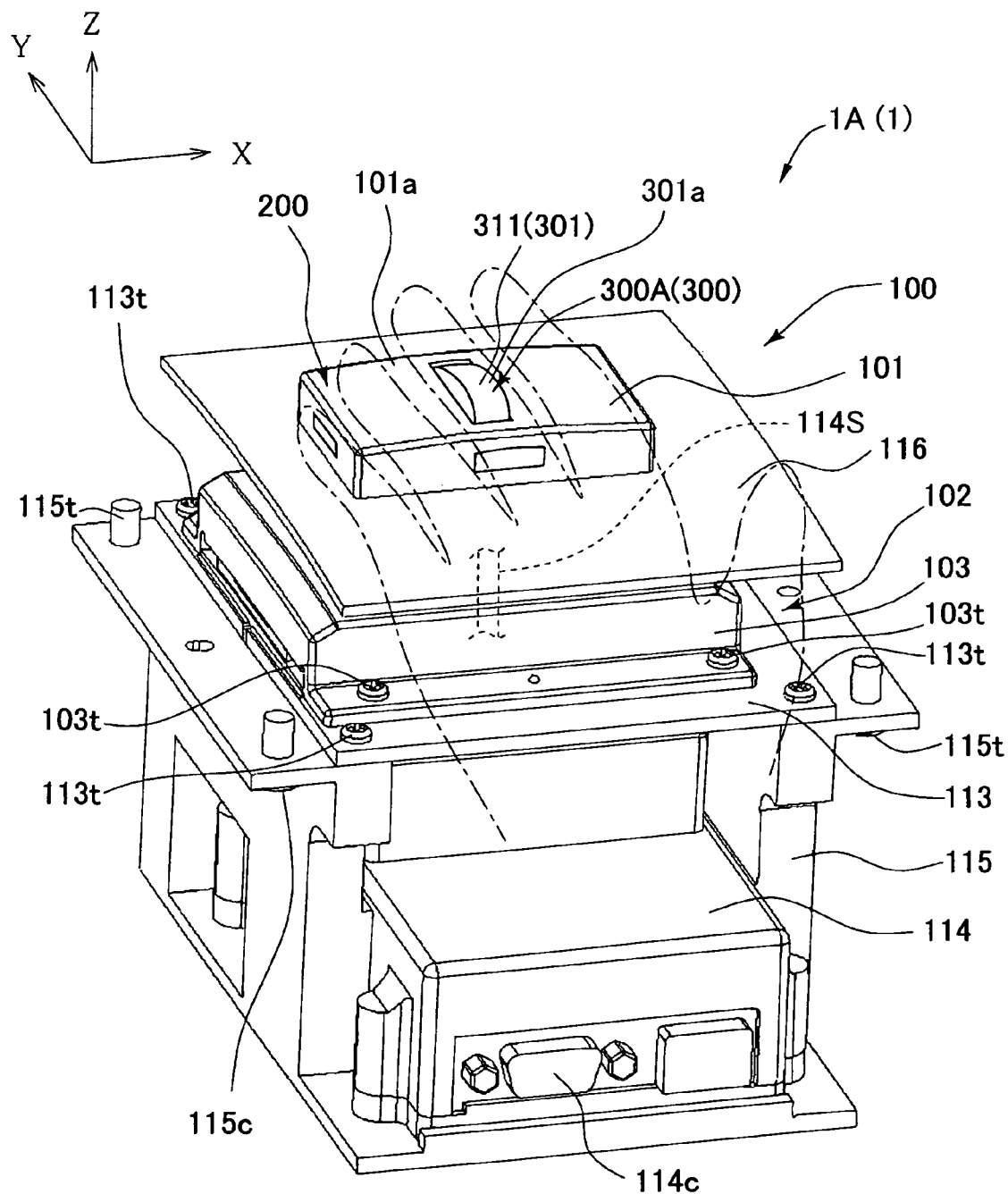
FIG. 1 It is an outside perspective view of a body of a manipulation apparatus of a first embodiment.
Figure 2:
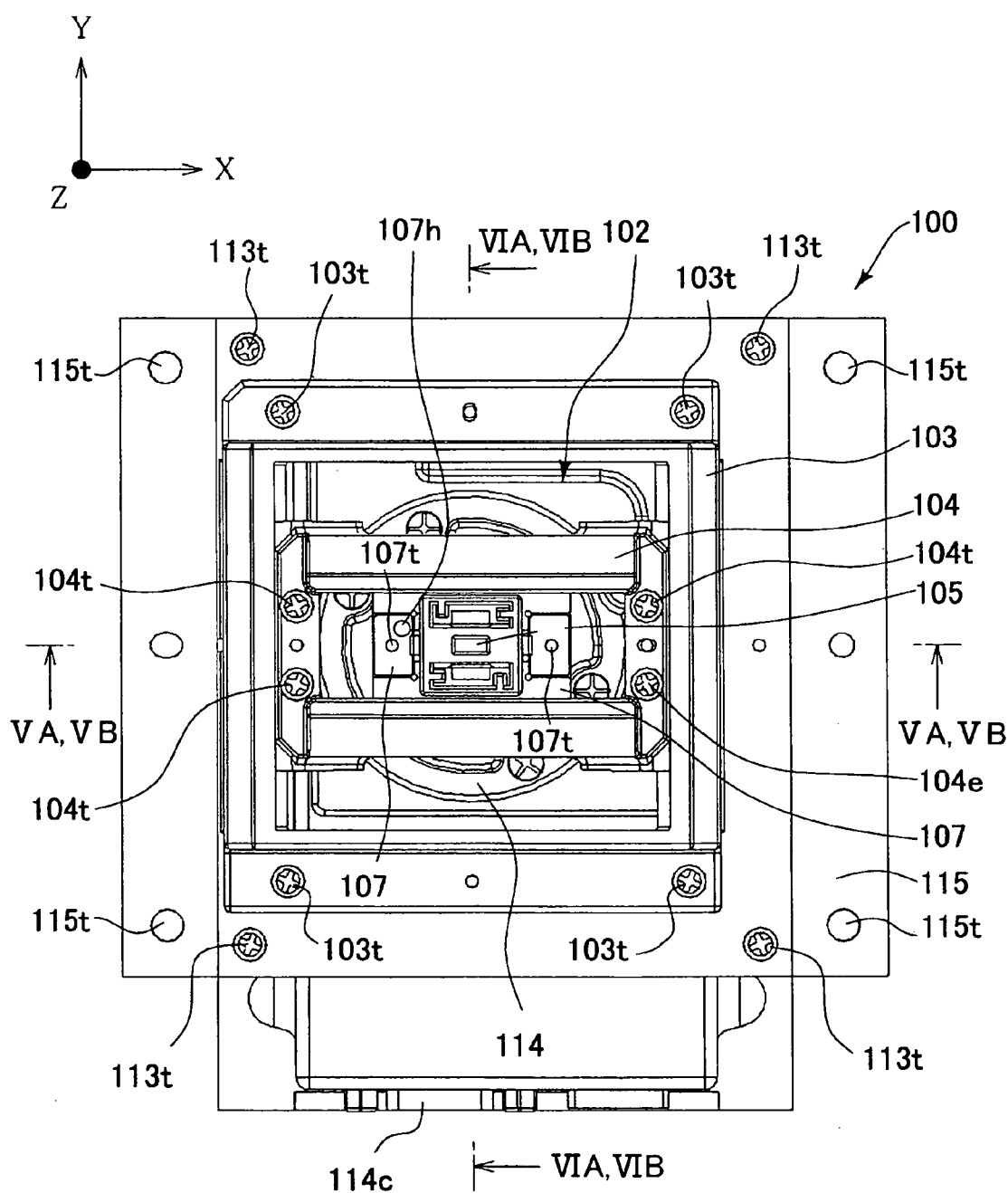
FIG. 2 It is a plan view of a bezel and a movable operation section of the manipulation apparatus of FIG. 1 as viewed in a removed condition.
Figure 37:
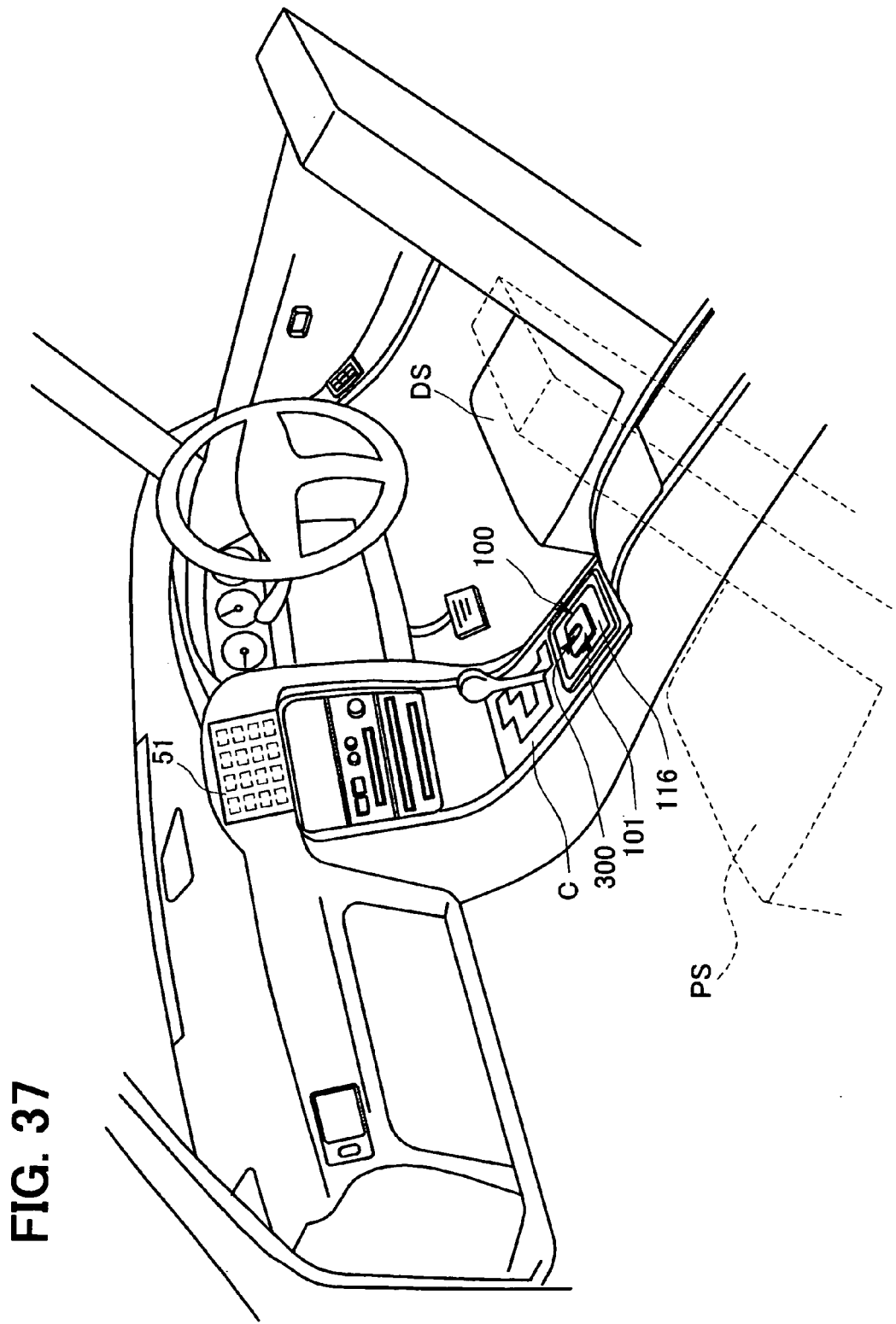
FIG. 37 It is a view showing a vehicle interior of a vehicle mounted with an in-vehicle manipulation apparatus.

FIG. 1 is a perspective view showing an operational structure portion (body) of an in-vehicle manipulation apparatus, and FIG. 2 is a plan view of a body 100 in a state where a movable operation section 101 is removed. The in-vehicle manipulation apparatus 1A(1) is fixed to a side of a driver seat DS in a center console C in an interior of a car as shown in FIG. 37, and may be operated by a user in either of the driver seat DS and a passenger seat PS. While a use object of the in-vehicle manipulation apparatus 1A(1) is not particularly limited, for example, the manipulation apparatus is used for operation (display position movement operation) of moving, on the screen, a display position of a beforehand determined display object being displayed on the screen while viewing a screen of a monitor (display device) 51 provided in a center console. The in-vehicle manipulation apparatus 1A(1) is used for operation (position specifying input) for performing position specifying input of an operation image being displayed on the screen. Furthermore, the in-vehicle manipulation apparatus 1A(1) is used for operation (control content change operation) of changing a plurality of control contents beforehand determined in changing order into one of forward and reverse directions of the changing order. The in-vehicle manipulation apparatus 1A(1) is used for performing function operation of a car navigation device or a car audio device. As the display object, a pointer image P displayed on a screen, a scroll image (including a partial image displayed on a part of a screen or over the whole screen), and the like may be supposed.

The body 100 of the in-vehicle manipulation apparatus 1 of FIG. 1 has a movable operation section (operation knob) 101 to be held by a user for two-dimensional operation, and a two-dimensional operation section 200 that transmits two-dimensional operational displacement (operation amount) occurring in the movable operation section 101 to a rocking shaft (stick-type rocking shaft, FIG. 3) 114S supported in a rocking-allowable manner by a joystick body (manipulation apparatus body) 114 via a displacement transmission mechanism 102. The two-dimensional operation section 200 has the movable operation section 101, the displacement transmission mechanism 102, and the rocking shaft 114S. The two-dimensional operation section 200 performs two-dimensional operation of moving a display position of a predetermined display object, which is to be displayed on a screen of the display 51, in a two-dimensional direction on the screen. The movable operation section 101 is attached to an end of the rocking shaft 114S via the displacement transmission mechanism 102, and is supposed to be operated in a manner of putting a hand on an end surface 101a of the operation section. However, an operation range of the movable operation section 101 is specified within a beforehand determined two-dimensional operation surface. The main surface 101a of the movable operation section 101 is a flat or curved surface perpendicular to a rocking axis of the rocking shaft 114 in a neutral state of both the rocking shaft 114 and the displacement transmission mechanism 102. Here, the main surface 101a of the movable operation section 101 is a curved surface extending in a movement direction of the section 101. Thus, a user may be conscious of a two-dimensional operation direction of the movable operation section 101 from a shape of the surface. A bezel 116, the upper part of which is covered with the movable operation section 101, is formed to have the same curved surface.

The two-dimensional operation of the movable operation section 101 herein is tilting operation of tilting the rocking axis of the rocking shaft 114S from a beforehand determined neutral angle position to a direction corresponding to a direction along which a position of a predetermined display object being displayed on a screen is to be moved. An operation result of the two-dimensional operation is transmitted to the joystick body 114 as operation information.

An operation direction of the movable operation section 101 is determined within a two-dimensional plane having two axes in a Y direction corresponding to a vehicle traveling direction (vehicle longitudinal direction), and in an X direction corresponding to a vehicle width direction (vehicle lateral direction). The displacement transmission mechanism 102 has a Y directional sliding mechanism sliding in the Y direction in response to operational displacement of the movable operation section 101, and an X directional sliding mechanism similarly sliding in the X direction.

On the screen of the display 51, a direction corresponding to the Y direction being an operation direction of the movable operation section 101 is a longitudinal direction of the screen (vehicle vertical direction), and a direction corresponding to the X direction being another operation direction of the section 101 is a lateral direction of the screen (vehicle lateral direction). Thus, for example, the movable operation section 101 is operated in the Y direction to move a screen-displayed pointer image P in the longitudinal direction of the screen by the movable operation section. Similarly, the section 101 is operated in the X direction to move a screen-displayed pointer image P in the lateral direction of the screen by the movable operation section 101.

Figure 3:
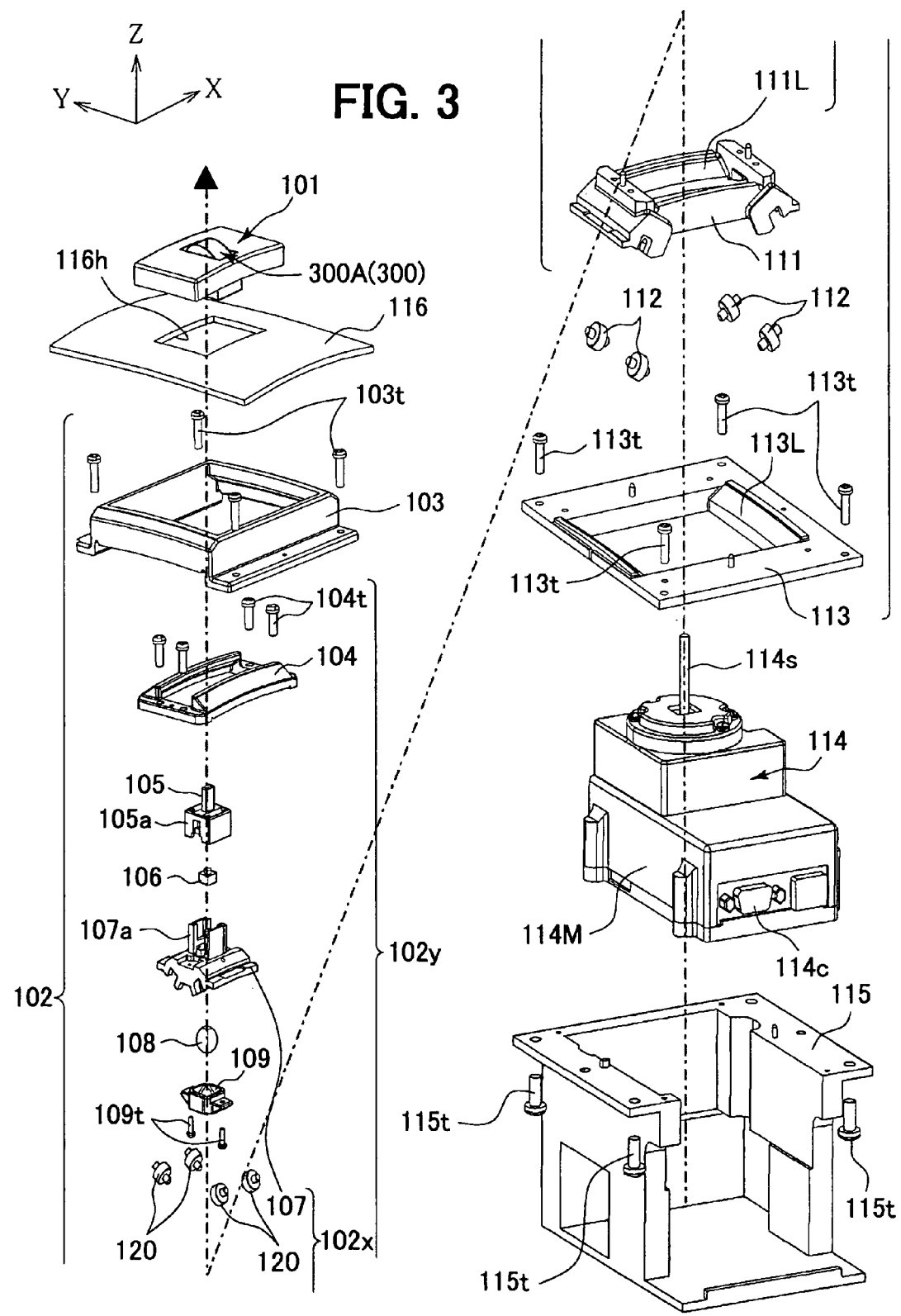
FIG. 3 It is an exploded perspective view of the manipulation apparatus of FIG. 1.

FIG. 3 is an exploded perspective view of the body 100, the body having a lower case 115 attached to a base on a vehicle side by screws (fastening members) 115t, the lower case accommodating the joystick body 114 in the inside of the lower case. The joystick body 114 has a well-known structure where a lower end of the rocking shaft 114S is connected to a not-shown biaxial universal joint within a body case 114M, and the rocking shaft 114S may independently rock around two rotation axes of the universal joint. One of such rocking directions corresponds to the X direction, and the other corresponds to the Y direction. The two-dimensional operation section 200 (FIG. 1) of the example is a force-sense-applying operation section. Specifically, as shown in a block diagram of FIG. 7, rotational displacement of each shaft of the universal joint is independently detected by each of an X-directional rotation sensor 81 and a Y-directional rotation sensor 82. On the other hand, the axles are independently rotated to generate reaction force by an X-directional reaction motor 83 and a Y-directional reaction motor 84 (FIG. 7) via not shown gear mechanisms respectively. Within the joystick 114, the X-directional rotation sensor 81, the Y-directional rotation sensor 82, the X-directional reaction motor 83 (operational reaction force applying means, reaction force drive section), and the Y-directional reaction motor 84 (operational reaction force applying means, reaction force drive section) are connected to CPU 80, and output of the X-directional rotation sensor (tilting displacement detection section) 81 and output of the Y-directional rotation sensor (tilting displacement detection section) 82, each output being changed depending on an operation position of the rocking shaft 114S, that is, depending on an operation position of the movable operation section 101, are converted into X, Y input coordinate values by the CPU 80, and output of the coordinate values may be extracted from a connector 114c in FIG. 1 via a communication interface (communication I/F circuit) 85. The CPU 80 even acts as a drive control section (operation reaction control means) of each of the X-directional reaction motor 83 and the Y-directional reaction motor 84 as described later.

Return to FIG. 3, a frame-like base 113 is attached to a top of the lower case 115 by using screws 113t. A pair of Y-directional rails (Y-axial movement guides) 113L, 113L, each having an inwardly descending tapered section, are integrally formed on both inside tops in the X direction of a base (Y-axial guide member) 113, and a frame-like Y-directional slider (Y-axial movement member) 111 is set slidably in the Y-direction on the Y-directional rails 113L, 113L via a plurality of Y-directional rollers 112 in a manner of being received in the inside of the base 113. The Y-directional rails 113L, 113L, the Y-directional rollers 112, and the Y-directional slider 111 configure the described Y-directional sliding mechanism. Each of the Y-directional rollers 112 is rotatably fitted in a bottom of the Y-directional slider 111 in such a manner that a rotational axis of the roller is inclined along a slope direction of each of the Y-directional rails 113L, 113L.

On the other hand, a pair of X-directional rails (X-axial movement guides) 111L, 111L, each having an inwardly descending tapered section, are integrally formed on both inside tops in the Y direction of the Y-directional slider 111, and an X-directional slider (X-axial movement member) 107 is set slidably in the X-direction on the X-directional rails 111L, 111L via a plurality of X-directional rollers 120 in a manner of being received in the inside of the Y-directional slider 111. The X-directional rails 111L, 111L, the X-directional rollers 120, and the X-directional slider 107 configure the described X-directional sliding mechanism 102x. Each of the X-directional rollers 120 is rotatably fitted in a bottom of the X-directional slider 107 in such a manner that a rotational axis of the roller is inclined along a slope direction of each of the X-directional rails 111L, 111L. A movable range of the X-directional slider 107 is determined by both end walls in the X direction of the Y-directional slider 111.

The rocking shaft 114S of the joystick body 114 is slidably connected to a bottom side of the X-directional slider 107 at an upper end of the shaft via a sliding ball 108 mounted via a ball cover 109 (attached to the bottom of the X-directional slider 107 by screws 109t) in a manner of penetrating the base 113 and the Y-directional slider 111. On an upper side of the X-directional slider 107, a frame-like slider cover 104, which retains the slider 107 in a Z direction while allowing relative sliding in the X direction with respect to the Y-directional slider 111, is assembled to the Y-directional slider 111 by using screws 104t. The Y-directional slider 111, the X-directional rollers 120, the X-directional slider 107, and the slider cover 104 configure a Y-directional sliding unit 102y, and the Y-directional sliding unit collectively slide in the Y direction on the base 113 via the Y-directional rollers 112. An upper case 103, which retains the whole of the Y-directional sliding unit 102y in the Z direction with respect to the base 113, is disposed on an upper side of the unit 102y, and assembled to the lower case 115 by using screws 103t. A top side of the lower case 115 is covered with the protective bezel 116. A movable range of the Y-directional slider 117 is determined by both end walls in the X direction of the Y-directional slider 111.

A switch case portion 107a is integrally formed on a top of the X-directional slider 107 in a projecting manner, and a push switch (tact switch herein) 106 is accommodated within the switch case portion. A push guide portion 105a for pressing and urging the push switch 106 is engaged with the switch case portion 107a so as to enable relative sliding in a vertical direction (Z direction) with respect to the switch case portion 107a, and disable relative movement in a plane perpendicular to the vertical direction. Specifically, the push guide portion 105a is opened at a bottom side, and formed in a box shape into which the switch case portion 107a is inserted in the Z direction, and attached to the X-directional slider 107 by using screws 107t. A stem 105 is integrally formed on an upper end of the push guide portion 105a. The stem 105 upward projects penetrating the slider cover 104, the upper case 103, and the bezel 116, and attached with the movable operation section 101 at an end of the stem.

Figure 5A:
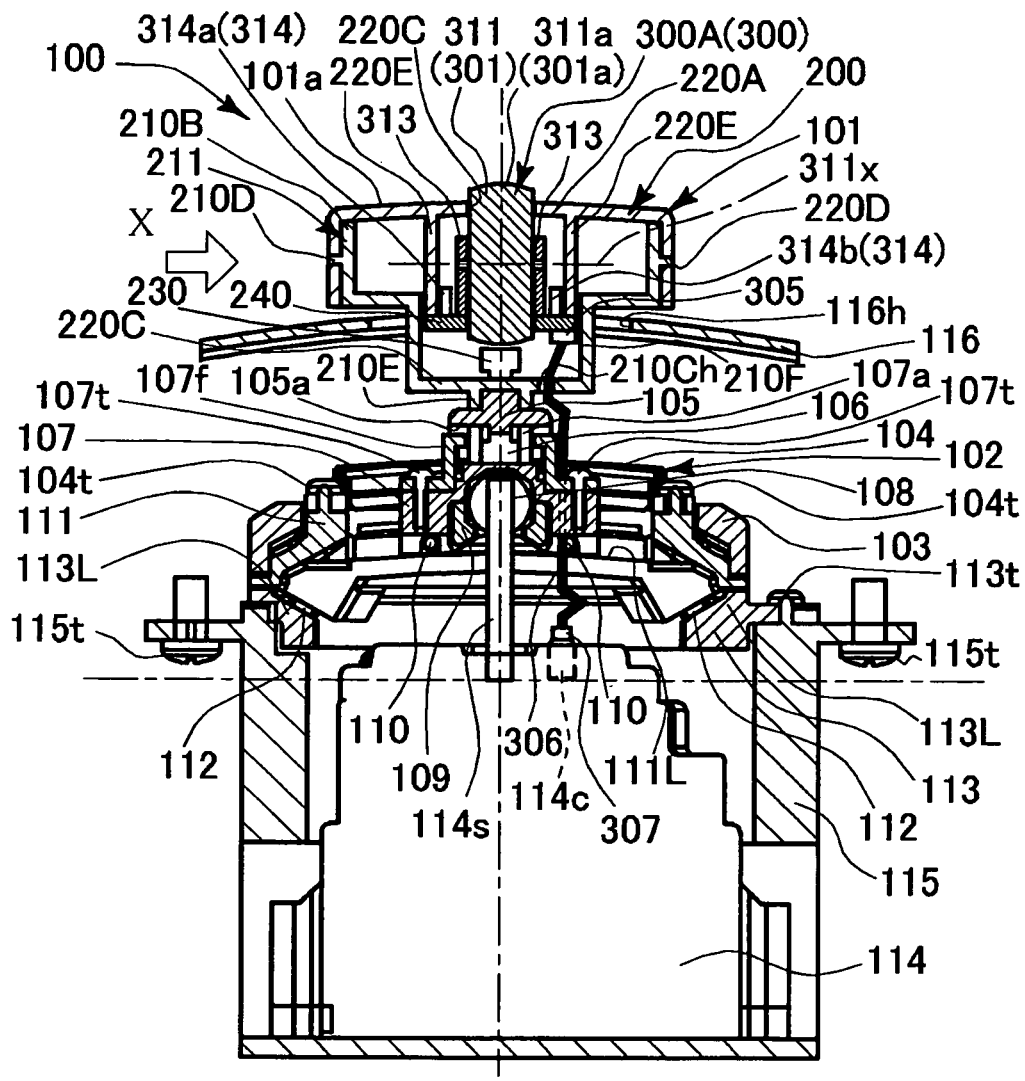
FIG. 5A It is a section view along VA-VA when a two-dimensional operation section is in a neutral state in FIG. 2.
Figure 6A:
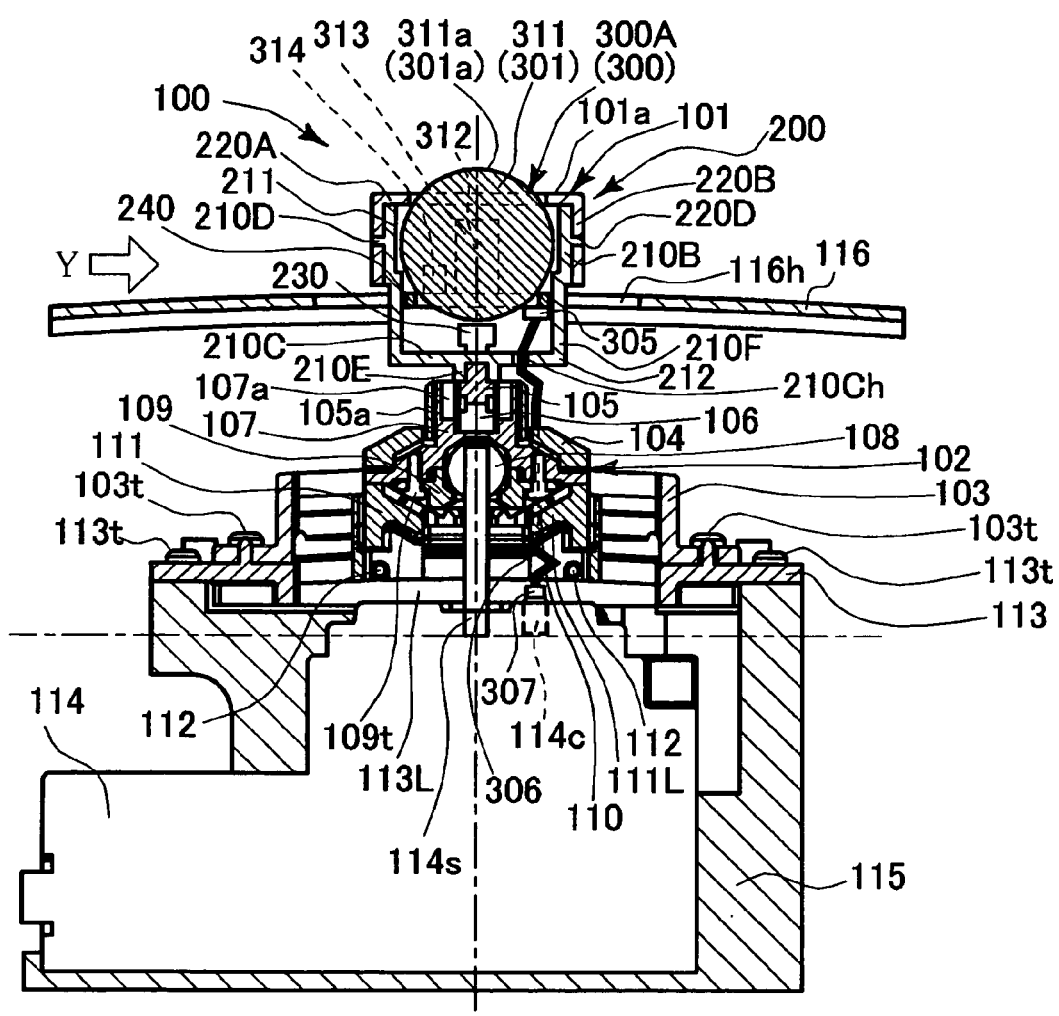
FIG. 6A It is a section view along VIA-VIA when the two-dimensional operation section is in the neutral state in FIG. 2.

FIG. 5A is a section view including a central axis of the stem 105 in a plane parallel to the X direction in FIG. 1. Similarly, FIG. 6A is a section view in a plane parallel to the Y direction. The rocking shaft 114S of the joystick body 114 has no displacement in either of the X and Y directions in a neutral state, and a central axis of the shaft 114S corresponds to the Z direction (vertical direction) in the neutral state.

Figure 5B:
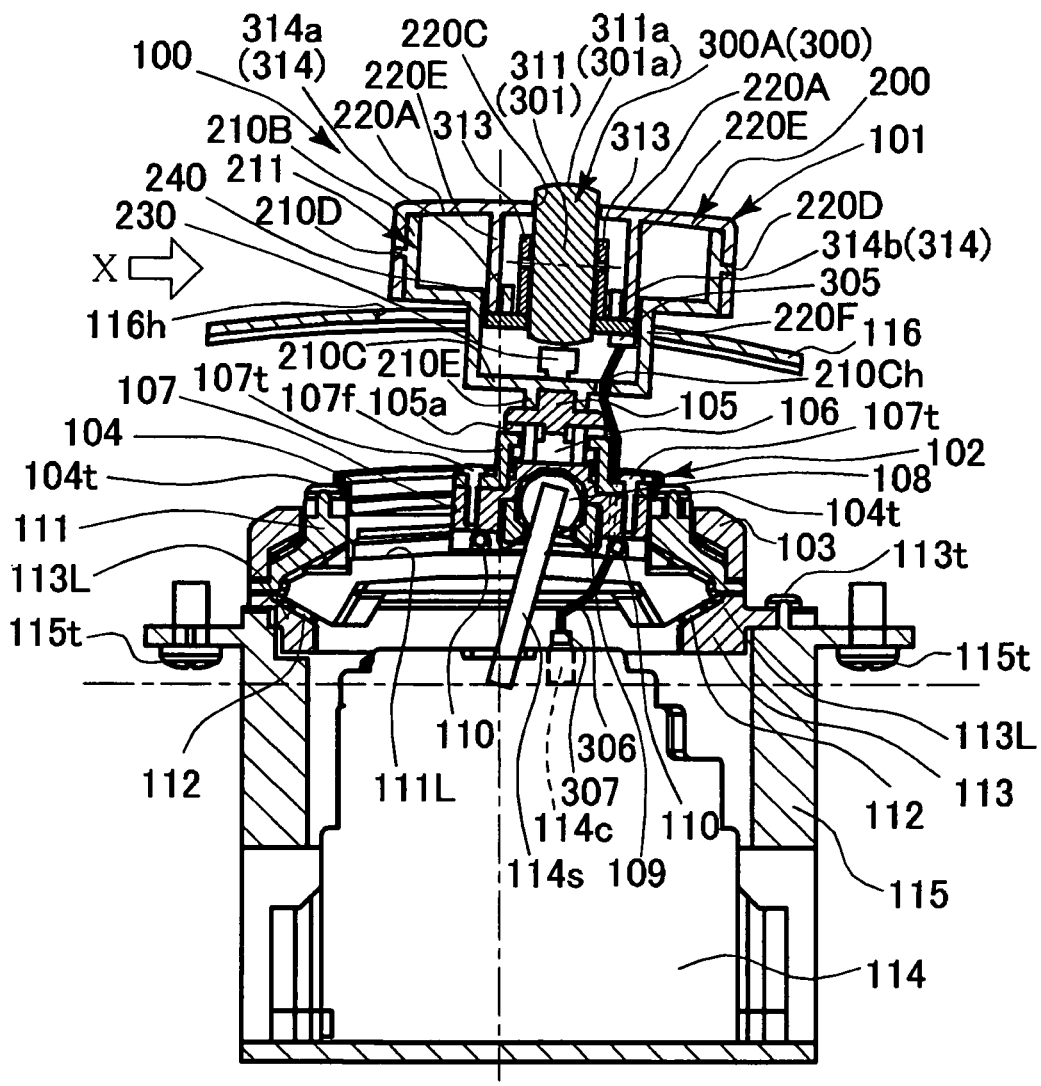
FIG. 5B It is a section view along VB-VB when the two-dimensional operation section is not in the neutral state in FIG. 2.
Figure 7:
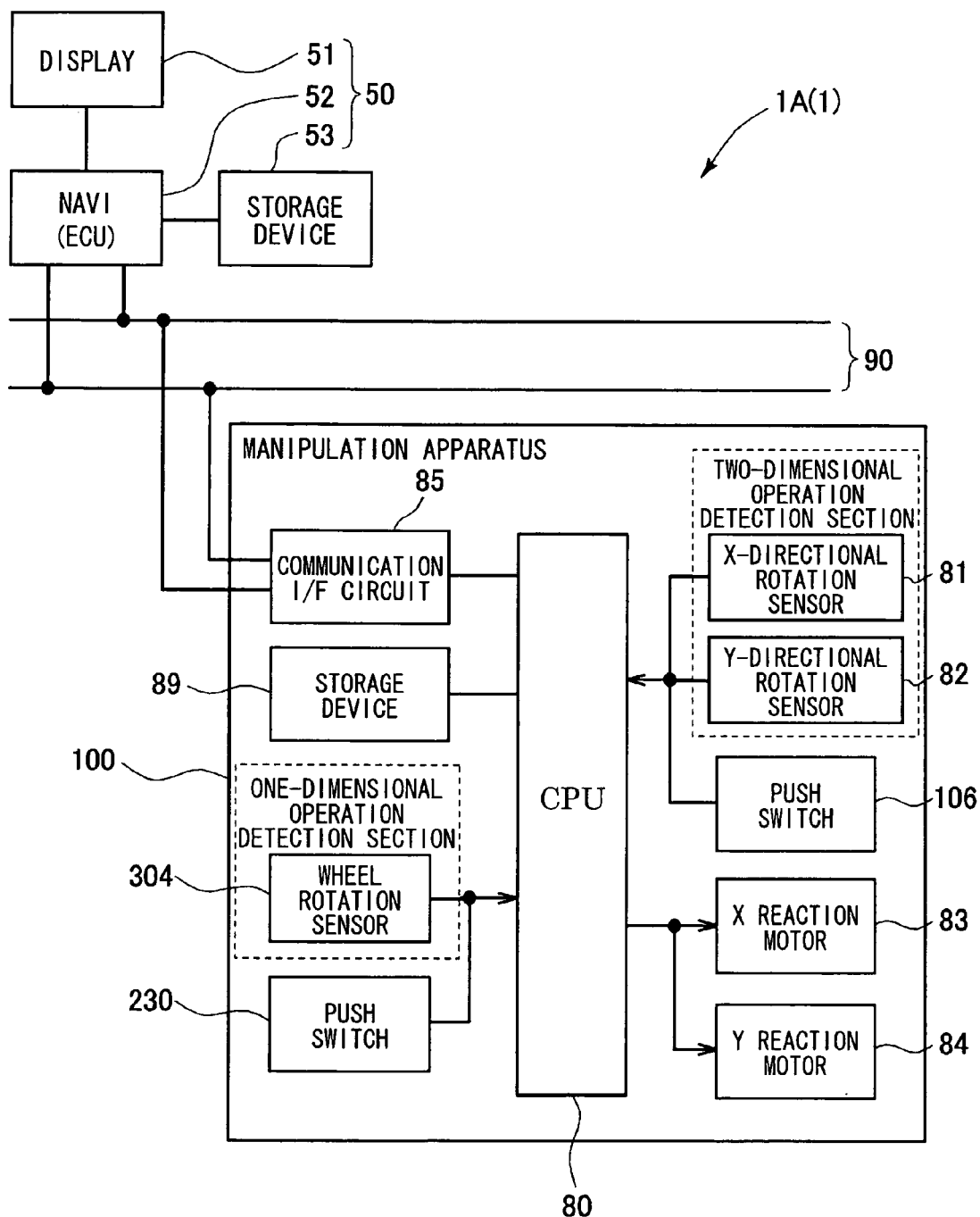
FIG. 7 It is a block diagram showing a general configuration concept of the manipulation apparatus of FIG. 1.

When X-directional operating displacement is applied to the movable operation section 101 in this state, the rocking shaft 114S rotates in the X direction while the X-directional slider 107 slides in the X direction on the Y-directional slider 111 via the X-directional rollers 120 as shown in FIG. 5B, and rotational displacement of the shaft is detected by the Y-directional rotation sensor 81 in FIG. 7. The CPU 80 drives the X reaction motor 83 such that the rocking shaft 114S is pushed back in a direction opposite to a direction of the detected X-directional displacement depending on a value of the X-directional displacement according to a predetermined reaction force control program, so that an X-directional reaction component is generated in the rocking shaft 114S.

Figure 6B:
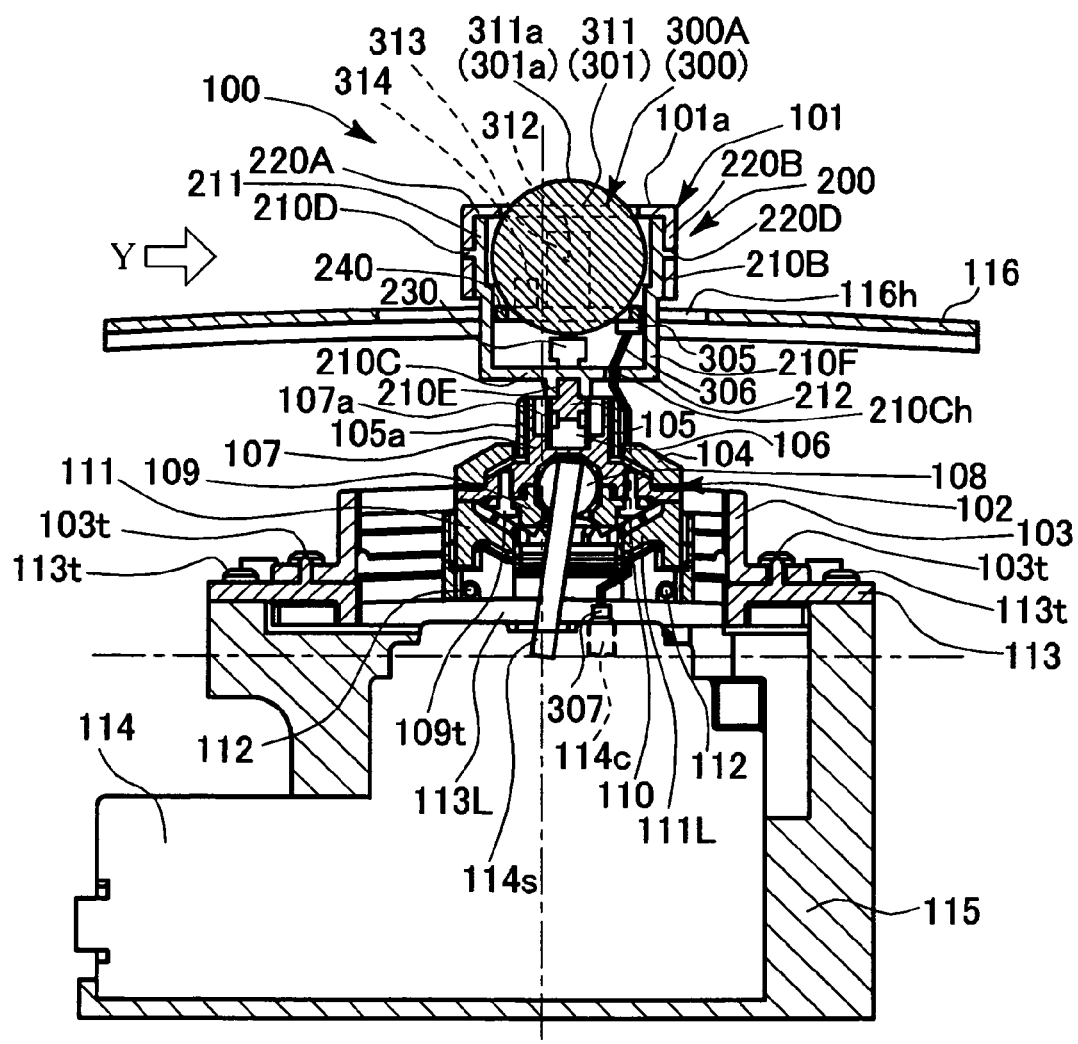
FIG. 6B It is a section view along VIB-VIB when the two-dimensional operation section is not in the neutral state in FIG. 2.

Similarly, when Y-directional operating displacement is applied to the movable operation section 101, the rocking shaft 114S rotates in the Y direction while the Y-directional slider 111 (that is, the Y-directional sliding unit 102y in FIG. 3) slides on the base 113 in the Y direction via the Y-directional rollers 112 as shown in FIG. 6B, and rotational displacement of the shaft is detected by the Y-directional rotation sensor 82 in FIG. 7. The CPU 80 drives the Y reaction motor 84 such that the rocking shaft 114S is pushed back in a direction opposite to a direction of the detected Y-directional displacement depending on a value of the Y-directional displacement, so that a Y-directional reaction component is generated in the rocking shaft 114S. That is, each of the X and Y reaction motors 83 and 84 acts as operation-reaction-force applying means for applying operation reaction force to tilting operation to the two-dimensional operation section 200.

For a drive level of standard reaction force given by the X or Y reaction motor 83 or 84, various correspondence relationships may be beforehand determined depending on a value of X or Y directional displacement. For example, while it is determined in the embodiment that X or Y directional standard reaction force is increased with increase in amount of displacement from a neutral position, this is not limitative. On the other hand, when the movable operation section 101 is pressed in the Z direction, the push switch 106 is urged, and occurrence of such pressing operation is thus recognized.

The in-vehicle manipulation apparatus 1 is provided with a one-dimensional operation section 300 that has an operation surface exposed in the main surface of the movable operation section 101 of the two-dimensional operation section 200, and may be operated in a predetermined one-dimensional operation direction relative to the operation surface. The one-dimensional operation section 300 has an operation surface 301a exposed in the main surface 101a of the movable operation section 101, the operation surface being an end surface of the rocking shaft 114S. The operation surface 301a is supposed to be operated by a finger of a hand put on the end surface 101a of the movable operation section 101 to operate the operation section. The body 100 is inputted with operation contents in the one-dimensional operation section 300 as an operation signal. NAVI ECU 52 communicatively connected to the body 100 performs at least one of the following two kinds of control to a predetermined display object, which is displayed on a screen of the display 51, on the screen based on operation contents in the one-dimensional operation section 300 acquired from the body 100:

1) display movement control of moving the display object in a predetermined one-dimensional display direction corresponding to a one-dimensional operation direction along which operation is performed; and 2) control content change control of sequentially changing a plurality of control contents beforehand determined in changing order in a direction corresponding to a one-dimensional operation direction, along which operation is performed, between forward and reverse directions of the changing order (two-dimensional operation control means and one-dimensional operation control means).

Specifically, the one-dimensional operation direction of the one-dimensional operation section 300 is allowed to be corresponding to a beforehand determined one-dimensional display direction on a screen, or a changing order beforehand determined for a plurality of control contents. Thus, when one-dimensional operation in the one-dimensional operation direction is performed, a display object may be moved in such a manner that a movement direction is limited to a one-dimensional display direction corresponding to the operation direction (display position movement operation), or the control contents may be sequentially changed according to a changing order corresponding to the operation direction (control content change operation).

Figure 4:
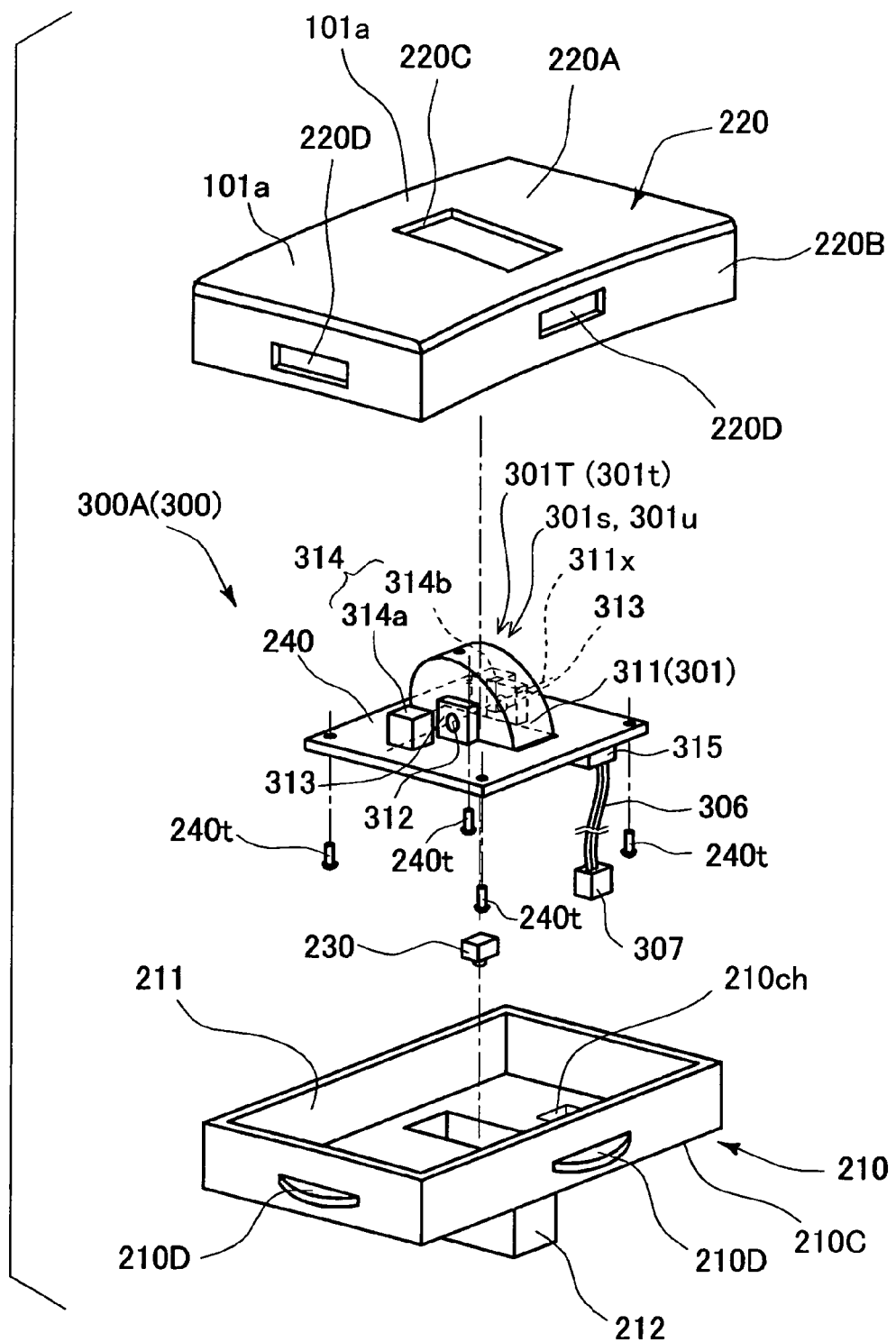
FIG. 4 It is an exploded perspective view of the movable operation section of the manipulation apparatus of FIG. 1.

FIG. 4 is an exploded perspective view of the movable operation section 101. The one-dimensional operation section 300 of the embodiment is a rotational operation section 300A. The rotational operation section 300A has a wheel-shaped rotational operation member 311 being an operation object member 301. The rotational operation member 311 has a predetermined rotational axis 311x perpendicular to a rocking axis when the movable operation section 101 of the two-dimensional operation section 200 is in a neutral state. The rotational operation member 311 may be rotated with respect to the movable operation section 101. An operation surface 301a is an exposed surface 311a of an outer circumferential surface of the rotational operation member 311, the exposed surface 311a exposed from the main surface 101a of the movable operation section 101. Rotational operation to the exposed surface 311a is determined as rotational feed operation (forward direction rotational operation) or rotational back operation (reverse direction rotational operation) to the exposed surface (operation surface) 311a along the one-dimensional operation direction determined in the two-dimensional operation surface being an operation range of the two-dimensional operation section 200. In rotational operation to the exposed surface 311a, rotational displacement of the rotational operation member 311 caused by the rotational operation is detected as operational displacement (operation amount). In this way, the rotational operation member 311 of the embodiment may be operated in the one-dimensional operation direction determined on the two-dimensional displacement direction (two-dimensional operation surface) of the movable operation section 101.

In the embodiment, the Y direction is determined as the one-dimensional operation direction. The rotational axis 311x is determined along a vehicle lateral direction such that rotational feed operation (forward direction rotational operation) or rotational back operation (reverse direction rotational operation) may be performed to the exposed surface (operation surface) 311a.

The rotational operation section 300A has the wheel-shaped rotational operation member 311, a wheel shaft 312 integrated with the rotational operation member 311, rotation supports 313, 313 rotatably supporting the wheel-shaped rotational operation member 311 via the wheel shaft 312 with respect to the movable operation section 101, a wheel rotation sensor (operation amount detection section) 314 detecting rotational displacement (operation amount) of the rotational operation member 311, a signal output section 305 outputting an operation signal based on detected rotational displacement, and a signal wiring section 306 including a bendable member extending to a joystick body 114 side in order to input the outputted operation signal to a main control circuit section (not shown) incorporated in the joystick body 114.

The movable operation section 101 includes an operation cover 220 on a fore end side (upper end side) and a holder 210 on a lower end side, those being fixed to each other. Here, the holder 210 is fitted into the operation cover 220, and latching projections 210D provided on upper end sidewalls 210B of the holder 210 are accommodated in openings 220D provided in side faces 220B of the operation cover 220, thereby the operation cover 220 is fixed to the holder 210. The operation cover 220 has an opening 220C in a part of an upper end surface portion 220A to project and expose part of an outer circumferential surface (operation surface for a user) of the rotational operation member 311. A lower end side of the operation cover 220 is opened to allow fitting of the holder 210. The holder 210 has an upper end portion 211 to be fitted with the operation cover 220, and a lower end portion 212 extending downward from the center of a bottom of the upper end portion 210A, and passing through a through-hole 116h in the center of the bezel 116. The lower end portion 212 has a fixing portion 220E on a lower end side for integrally fixing the stem 105, and the upper end portion 211 is opened at an upper end side. Therefore, the movable operation section 101, including the operation cover 220 and the holder 210 fixed to the operation cover, has a hollow inside, and the rotational operation section 300A is accommodated in the hollow inside.

Specifically, the movable operation section 101 has a housing structure. The movable operation section 101 accommodates the rotational operation section within the section 101 in such a manner that the operation surface 301a of the one-dimensional operation member 301 is exposed on a main surface 101a side of the movable operation section 101. The movable operation section 101 accommodates the wheel rotation sensor 314 and the signal output section 305 within the section 101. The signal wiring section 306 extends to the outside from the signal output section 305 via a wiring hole 210CH penetrating a bottom wall 210C of the housing structure. A board 240 is attached on the inside of the movable operation section 101. The board 240 is attached on ends of ribs 220E, 220E, which extend downward from the upper end portion 220A, by using screws 240t in the inside of the operation cover 220. The support bases 313, 313 being rotation supports, and the wheel rotation sensor (operation amount detection section) 314 are mounted on the board 240 in the embodiment. Furthermore, a push switch (tact switch herein) 230 is provided on a bottom of the board 240.

The wheel rotation sensor 314 may be a well-known rotation sensor, and the sensor is an infrared transmitter/receiver being an optical rotation sensor in the embodiment. The rotational operation member 311 is provided with a plurality of transmissive portions (not shown) that may transmit infrared rays with certain intervals along a circumferential arcuate path. An infrared transmitter 314a and an infrared receiver 314b are opposed across the arcuate path. As the rotational operation member 311 rotates, the receiver 314b intermittently receives infrared rays transmitted from the transmitter 314a. The receiver 314b outputs a detection result as a rotational operation signal, and transmits the signal to the signal output section 315 via wiring on the board 240. Furthermore, the rotational operation signal is transmitted from the signal output section 315 to the joystick body 114 via the bendable wiring harness (signal wiring section) 306, and then inputted to the CPU 80 within the joystick body.

The wiring harness 306 penetrates the wiring hole 210Ch provided in the bottom 210C of the lower end portion 211 of the holder 210. The wiring harness 306 is enclosed by outer circumferential walls 220F of the lower end portion 211 so as to be not contacted to the bezel 116 (FIG. 5A). Furthermore, the wiring harness 306 extends from the signal output section 305 to the joystick body 114 in a manner of penetrating the wiring through-hole 107h provided in the X-directional slider 107. A terminal 307, which is provided at an end of the wiring harness 306, is connected to a connector portion 114c provided on an upper end surface of the joystick body 114. The wiring harness 306 is excellent in bending resistance, and disposed with margin in length so that the harness does not obstruct X-directional movement of the X-directional sliding mechanism 102x or Y-directional movement of the Y-directional sliding unit 102y.

When a user performs a certain amount of rotational operation to the wheel-shaped rotational operation member 311, the user is correspondingly applied with a certain force sense. In the embodiment, the rotational operation member 311 is provided with a convex portion array 301T in which a plurality of convex portions 301t are arranged with certain intervals along a circumferential arcuate path, and a urging strip 301s that presses and urges each convex portion 301t in a rotational operation direction as the rotational operation is performed to the rotational operation member 301, where a convex portion 301t is released from such pressing and urging as the strip has passed the convex portion in a transverse manner. The rotational operation performed by a user to the rotational operation member 301 causes click feeling (force sense) to the user as the urging strip 301s passes over each convex portion 301t. That is, the urging strip 301s and the convex portions 301t form rotational-operation force sense applying means. In FIG. 37, each convex portion 301t is a portion between circumferentially adjacent concave portions 301u. A method of generating click feeling (force sense) is not limited to the method.

In contrast, the push switch 230 is pressed and urged through downward pressing operation of the rotational operation member 311. Such Z-directional pressing operation of the push switch 230 and of the aforementioned push switch 106 corresponds to position specifying input in the embodiment. The rotational operation member 311 is supported by the rotation supports 313, 313 in a manner of being upward urged by urging means (not shown). The rotational operation member 311 is displaced downward against urging force of the urging means by such pressing operation, so that the push switch 230 is pressed and urged. As the push switch 230 is pressed and urged in this way, the push switch 230 outputs a pressing operation signal. The pressing operation signal is transmitted to the signal output section 305 via wiring on the board 240, and in turn transmitted to the joystick body 114 via the wiring harness 306, and inputted to the CPU 80 within the joystick body.

FIG. 7 shows a system configuration example of the in-vehicle manipulation apparatus 1 of the embodiment. The manipulation apparatus body 100 has a communication interface 85, and the CPU 80 is connected by the connector 114c in FIG. 1 to a multiple communication line 90 on a car side via the communication interface 85. The multiple communication line 90 is connected with a car navigation system 50 (including the NAVI ECU 52, and a monitor (display: display means) 51 and a storage device 53 connected to the NAVI ECU).

Angle detection values of the X-directional rotation sensor 81 and the Y-directional rotation sensor 82, the values showing operational displacement in X and Y directions of the movable operation section 101, are converted into X-Y two-dimensional input coordinate values by the CPU 80 respectively. The angle detection values are, for example, transmitted to the NAVI ECU 52 via the multiple communication line 90 to be used for position movement of a predetermined display object on the display 51 of the car navigation system 50.

Similarly, an angle detection value of the wheel rotation sensor 304, the value showing rotational operation displacement (operation amount) of the rotational operation member 311 incident to rotational operation to the rotational operation section 300A, is converted into a one-dimensional input coordinate value in the Y direction by the CPU 80, and, for example, transmitted to the NAVI ECU 51 via the multiple communication line 90 to be used for position movement of a predetermined display object, or change of control contents on the display 51 of the car navigation system 50.

In contrast, the NAVI ECU 52 is inputted with the X-Y two-dimensional input coordinate values detected as operation amount of the two-dimensional operation section 200, or the one-dimensional input coordinate value in the Y direction detected as operation amount of the one-dimensional operation section 300. The NAVI ECU 52 performs operation limiting processing shown in FIGS. 14, 15 and 16, in which one-dimensional operation is disabled depending on situations.

Figure 14:
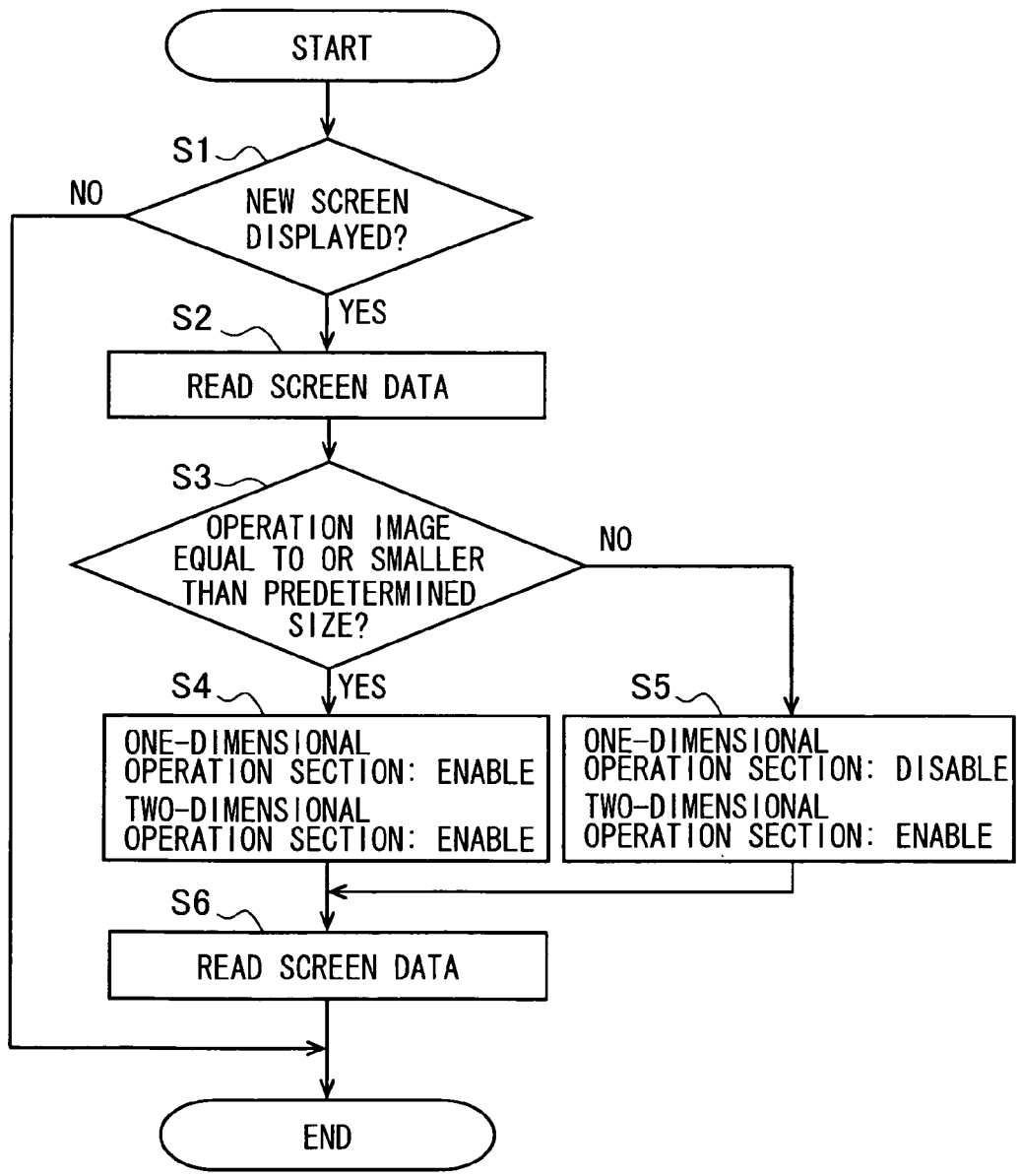
FIG. 14 It is a flowchart showing a first embodiment of operation limiting processing.

Processing of FIG. 14 is carried out along with change of a display screen of the display 51. In S1, whether a new screen is displayed is determined.

When it is determined in S1 that a new screen is not displayed, this routine is finished.

When it is determined in S1 that a new screen is displayed, data of a screen to be subsequently displayed is read in S2.

In S3, whether an operation image (operation area) I set on a screen has size equal to or smaller than a beforehand determined size or not is determined based on the read screen data.

When the operation image (operation area) I set on the screen has size equal to or smaller than the beforehand determined size, advance is made to S4, and both operation of the one-dimensional operation section 300 and operation of the two-dimensional operation section 200 are enabled.

When the operation image (operation area) I set on the screen has size larger than the beforehand determined size, advance is made to S5, and only operation of the two-dimensional operation section 200 is enabled, and operation of the one-dimensional operation section 300 is disabled. In addition, in S5, a subsequent screen is displayed based on the image data read in S1.

Figure 15:
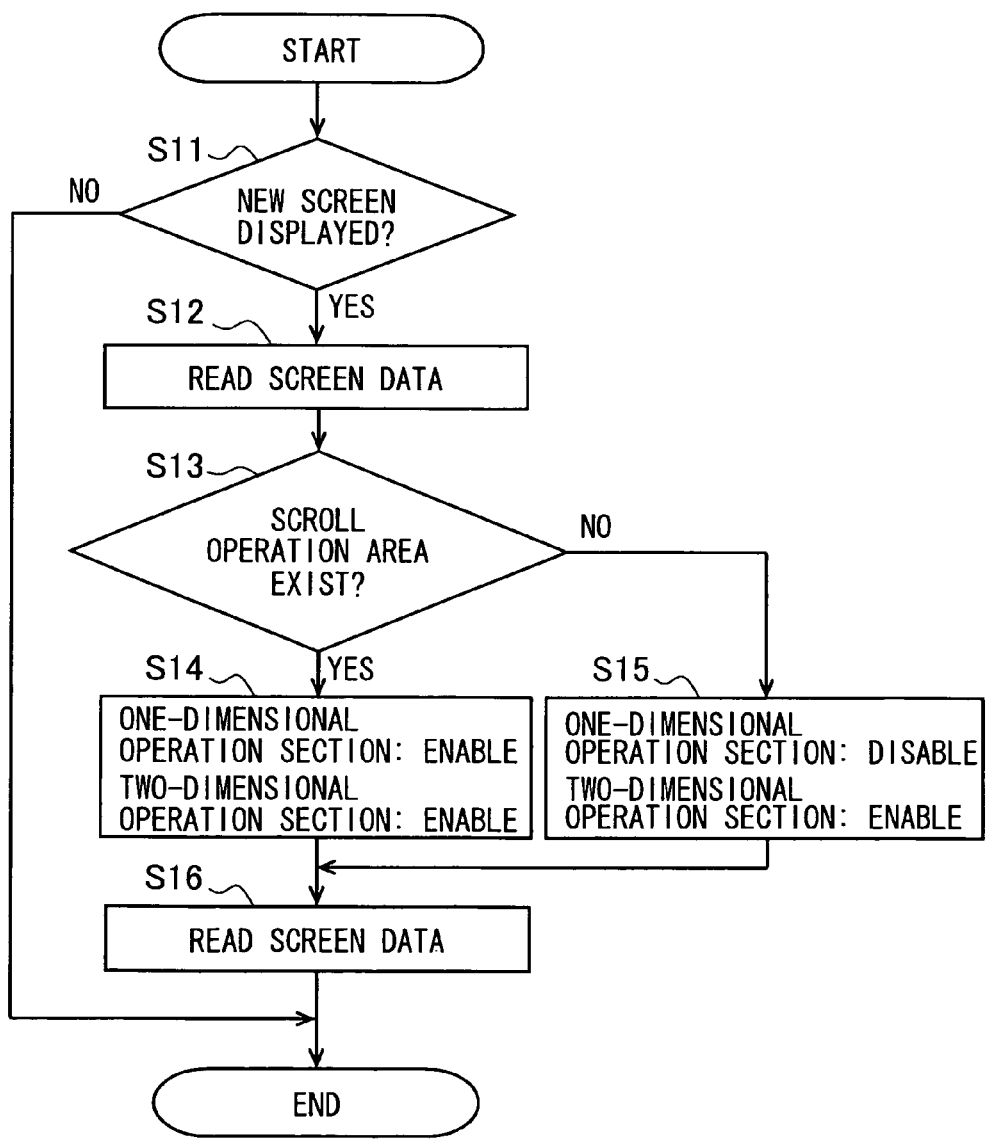
FIG. 15 It is a flowchart showing a second embodiment of operation limiting processing.

Processing of FIG. 15 is also carried out along with change of a display screen of the display 51. In S11, whether a new screen is displayed is determined. When it is determined in S11 that a new screen is not displayed, this routine is finished. When it is determined in S11 that a new screen is displayed, data of a screen to be subsequently displayed is read in S12. In S13, whether a scroll operation area S exists or not in the screen is determined based on the read screen data. When the scroll operation area S exists, advance is made to S14, and both operation of the one-dimensional operation section 300 and operation of the two-dimensional operation section 200 are enabled. When the scroll operation area S does not exist, advance is made to S15, and only operation of the two-dimensional operation section 200 is enabled, and operation of the one-dimensional operation section 300 is disabled. In addition, in S15, a subsequent screen is displayed based on the image data read in S11.

Regarding whether each of the one-dimensional operation section 300 and the two-dimensional operation section 200 is enabled or disabled, even if determination based on the image data is not made unlike the above, it is acceptable that each screen is beforehand determined to be enabled or disabled, and each operation section is set to be enabled or disabled according to such determined contents. However, such determination is preferably made in such a way that both of operation of the one-dimensional operation section 300 and operation of the two-dimensional operation section 200 are set to be enabled for a screen having one of the operation image I having size larger than the beforehand determined size and the scroll operation area S, and only operation of the two-dimensional operation section 200 is set to be enabled for other screens.

Figure 16:
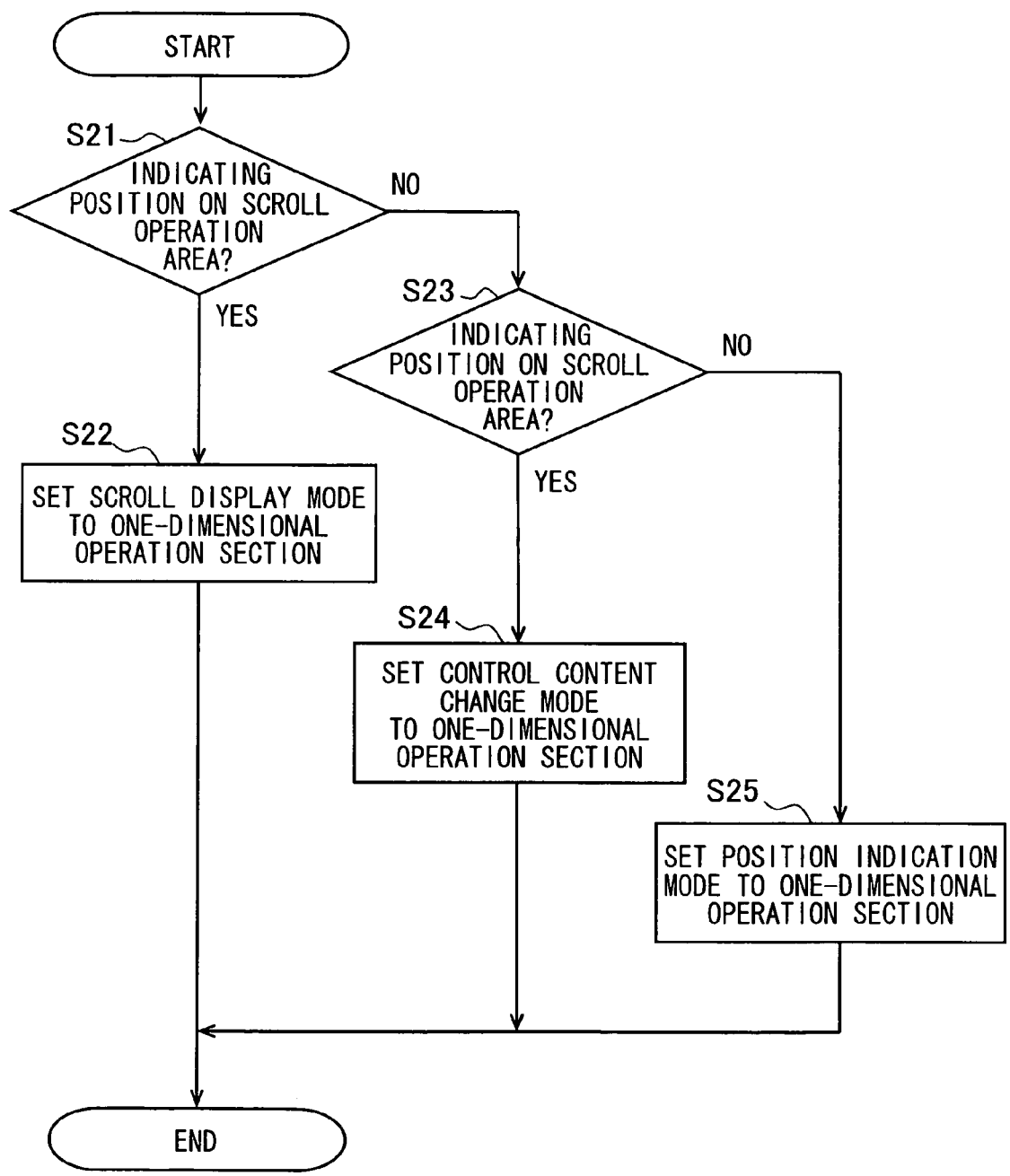
FIG. 16 It is a flowchart showing a third embodiment of operation limiting processing.

When it is determined in S12 that the scroll operation area S exists, operation limiting processing according to the one-dimensional operation section 300 as shown in FIG. 16 is carried out after the subsequent screen is displayed.

That is, in S21, determination is made on whether or not a currently indicating position of a pointer image P, which may be moved in position on a screen of the display 51 by the two-dimensional operation section 200, is located on a scroll display area SD, in which scroll display may be performed, on the screen of the display 51. When the currently indicating position of the pointer image P is located on the scroll display area SD, advance is made to S22, and an operation mode of the one-dimensional operation section 300 is set to a scroll display mode. Thus, a scroll image displayed within the scroll display area SD may be scrolled in a beforehand determined one-dimensional display direction (corresponding to a one-dimensional operation direction) depending on operation amount to the one-dimensional operation section 300, so that display contents in the display area S may be changed. On the other hand, when the currently indicating position of the pointer image P is not located on the scroll display area SD, advance is made to S23.

In S23, determination is made on whether or not a currently indicating position of the pointer image P is located on a control content change area SC in which control contents may be changed according to a predetermined order. When the currently indicating position of the pointer image P is located on the control content change area SC, advance is made to S24, and an operation mode of the one-dimensional operation section 300 is set to a control content change mode. Thus, control contents displayed in the control content change area SC may be sequentially changed according to a beforehand determined order (corresponding to a one-dimensional operation direction) depending on operation amount of the one-dimensional operation section 300. Consequently, a control content corresponding to control content information being displayed may be carried out. The control content may be carried out along with display change, or position instruction operation may be performed to executed, another operation image so as to carry out a corresponding control content above the currently displayed content. On the other hand, when the currently indicating position of the pointer image P is not located on the control content change area SC, advance is made to S25.

In S25, when the currently indicating position of the pointer image P is not located on the control content change area SD, the operation mode of the one-dimensional operation section 300 is set to a position instruction mode. Thus, the pointer image P displayed on the screen of the display 51 may be moved in a beforehand determined one-dimensional display direction depending on operation amount of the one-dimensional operation section. The one-dimensional display direction in the position instruction mode is preferably set to a direction smaller in width between longitudinal and lateral directions in a rectangular screen in which the pointer image P is displayed.

Operation to the one-dimensional operation section 300 (one-dimensional operation) may be enabled only when a scroll operation area S such as the scroll display area SD or the control content change area SC is indicated in position by a pointer image P that may moved by operation to the two-dimensional operation section 200 (two-dimensional operation).

Hereinafter, description is made on a display example according to display control on the display 51 performed by the NAVI ECU 52 based on operation to the two-dimensional operation section 200 and operation to the one-dimensional operation section 300 in the manipulation apparatus 1 of the embodiment.

FIGS. 8A to 8E show a display example on the display 51. The figures show herein a flow of screen display for setting a destination by inputting a name of the destination.

Figure 8A:
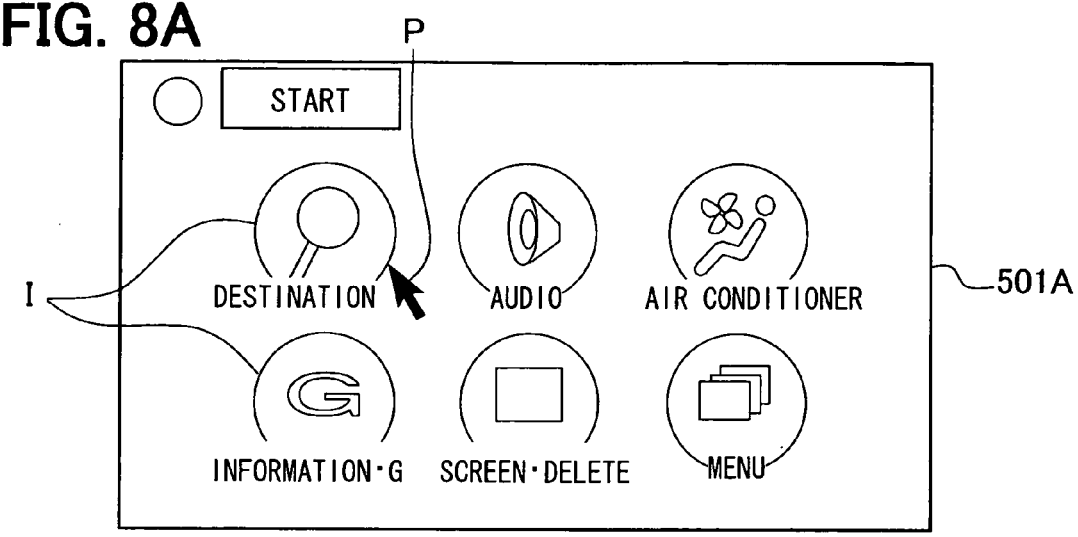
FIG. 8 It is a first embodiment of image display on a display device.

A display screen 501A shown in FIG. 8A is a menu screen. A plurality of operation images (operation icons) I are displayed on the menu screen 501A. Position specifying input is performed while position instruction is performed to an operation image I by a pointer image P, thereby the CPU 80 outputs a control signal so that a corresponding control content is carried out by a corresponding control object. Here, it is assumed that position specifying input is performed to an operation image I having correspondence to a control content of changing the menu screen 501A to a destination setting screen 501B.

Figure 8B:
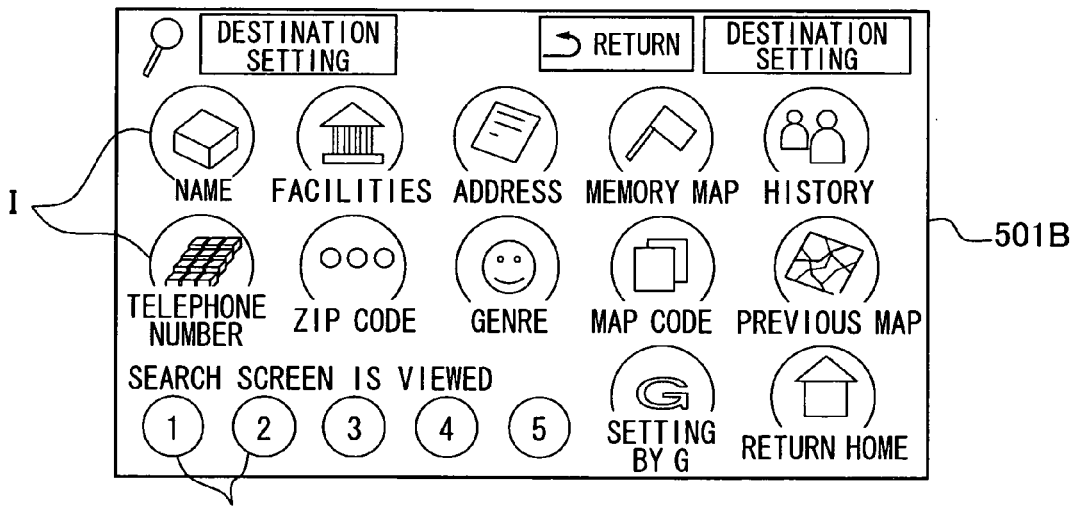

A display screen 501B shown in FIG. 8B is the destination setting screen 501B, which is a low order hierarchy screen of the menu screen 501A. A plurality of operation images I are displayed even on the destination setting screen 501B. Here, it is assumed that position specifying input is performed while position instruction is performed by a pointer image P to an operation image I having correspondence to a control content of changing the destination setting screen 501B to a destination name input screen 501C.

Figure 8C:
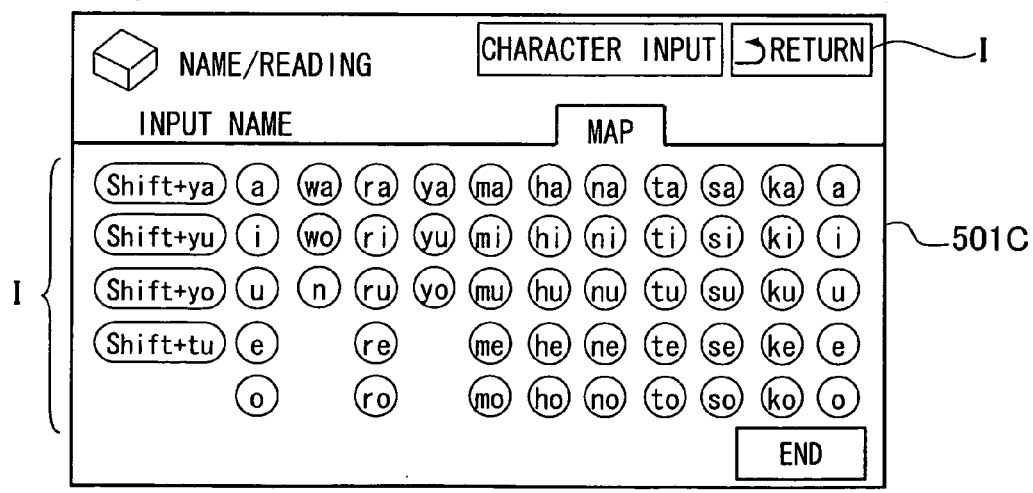

A display screen 501C shown in FIG. 8C is the destination name input screen, which is a low order hierarchy screen of the destination setting screen 501B. A plurality of operation images I are displayed even on the destination name input screen 501C. However, operation images I, which are small in image range compared with the screens 501A and 501B, are set in large numbers compared with the screens. The destination name input screen 501C is a letter input screen for indicating an operation image I corresponding to each letter, and a control content of selecting a corresponding letter is allowed to be corresponding to the operation image I by position specifying input to the operation image I. A name of a destination is inputted through formation of a string by sequentially selected letters. When position specifying input is performed while position instruction by a pointer image P is performed to an operation image I where name input is completed, search of destinations, which include a string formed by previous letter selection, is performed, and control of changing a screen to a destination-search-result display screen 501D, which displays a result of the search, is performed.

Figure 8D:
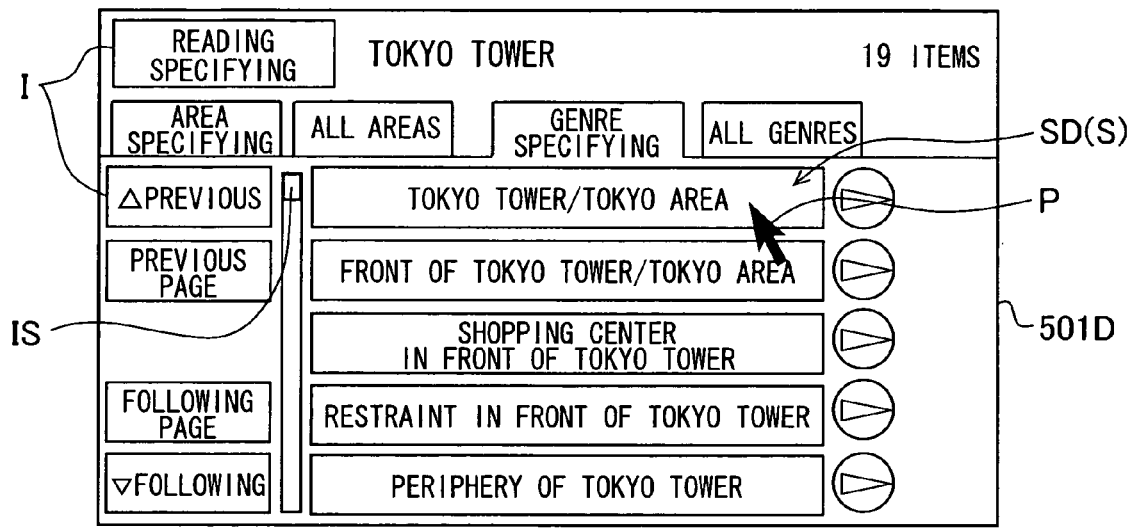

A display screen 501D shown in FIG. 8D is the destination-search-result display screen, which is a low order hierarchy screen of the destination name input screen 501C. The destination-search-result display screen 501D has a longitudinal scroll operation area S. The scroll operation area S is a scroll display area SD having a list of destination search results displayed thereon, in which part of a beforehand determined scroll image is displayed in a predetermined display area. In the scroll operation area S, scroll display of moving a scroll image within a predetermined display area may be performed through scroll operation by the one-dimensional operation section 300, or position specifying input by the two-dimensional operation section 200 to an operation image I (IS) for scroll operation having correspondence to scroll operation. For operation images I displayed in a list in the scroll display area SD as the destination search results, positional information corresponding to each operation image is displayed, and a control content of specifying the relevant position to a destination is set along with position specifying input to one of the operation images I.

Figure 8E:
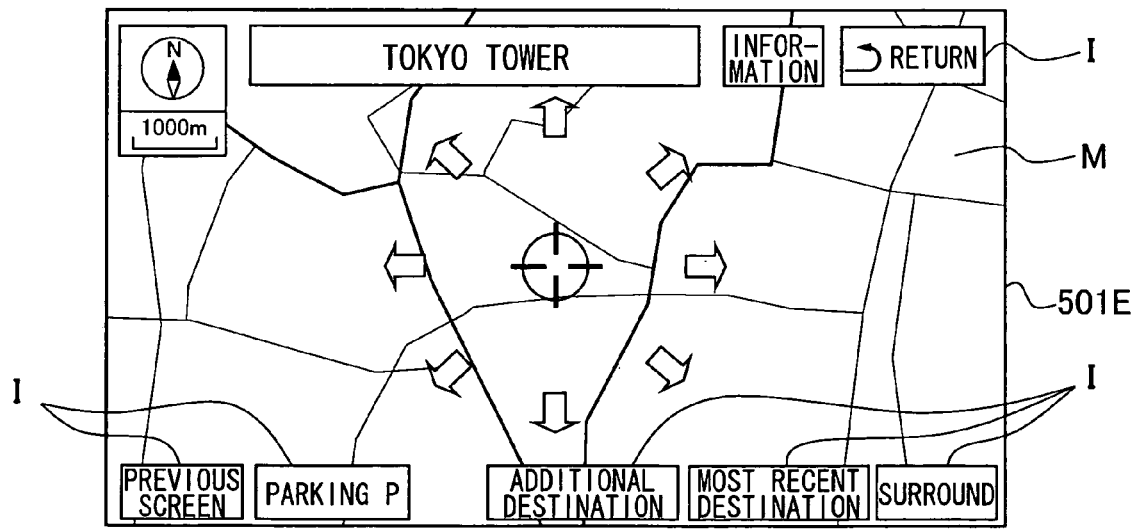

A display screen 501E shown in FIG. 8E is a destination search determination screen, which is a low order hierarchy screen of the destination-search-result display screen 501D. In the destination search determination screen 501E, a map image M about a destination specified on the destination-search-result display screen 501D is displayed, and an operation image I having correspondence to a control content of determining the destination as a new destination is displayed.

In the display examples shown in FIGS. 8A to 8E, the two-dimensional operation section 200 two-dimensionally moves a pointer image P on a screen of the display 51 in any of screens of FIGS. 8A to 8E. Such operation of two-dimensionally moving the pointer image P corresponds to the position instruction operation of the embodiment. On the other hand, regarding the one-dimensional operation section 300, any operation to the one-dimensional operation section 300 is disabled for screens of high order hierarchy (FIGS. 8A and 8B) where a comparatively large operation image I is displayed. However, one-dimensional operation is enabled for screens of still lower order hierarchy (FIGS. 8C to 8E). Here, operation of one-dimensionally linearly moving a pointer image P on a screen of the display 51 (here, operation of moving the pointer only in a longitudinal direction of the screen) may be performed. Such operation of one-dimensionally moving the pointer image P also corresponds to the position instruction operation of the embodiment.

In FIG. 8C, a predetermined amount of operation is performed to the one-dimensional operation section 300, thereby the pointer image P may be sequentially moved on images from a current operation image I indicated in position to another operation image I according to an order beforehand determined for a plurality of operation images I. That is, in this case, a one-dimensional display direction having correspondence to the one-dimensional operation direction of the one-dimensional operation section 300 is an order determined for a plurality of operation images I. Since the screen is a Japanese Syllabary input screen, a "row a" is sequentially displayed in a longitudinal direction. A "row ka" is sequentially displayed next to the left of the "row a". Since other rows are sequentially displayed, the "a-i-u-e-o order" of "a-i-u-e-o-ka-ki-ku-ke ●●●" is determined as the one-dimensional direction. The pointer image P is sequentially moved on operation images I according to the order. Thus, when the one-dimensional operation section 300 is operated in a forward direction of the one-dimensional operation direction, the pointer image P may move according to the determined order in such a manner that the pointer image advances downward on the row a, and in turn advances to the upper left "ka", and advances downward on the row ka.

In FIG. 8D, the scroll display area SD exists. The scroll operation area S corresponds to the scroll display area SD, and, for example, when the pointer image P is located on the area S by position instruction operation using the two-dimensional operation section 200, an operation mode of the one-dimensional operation section 300 is changed from the position instruction mode to the control content change mode. When the one-dimensional operation section 300 is operated in this state, scroll display is performed in a direction according to a forward or reverse operation direction.

Figure 9:
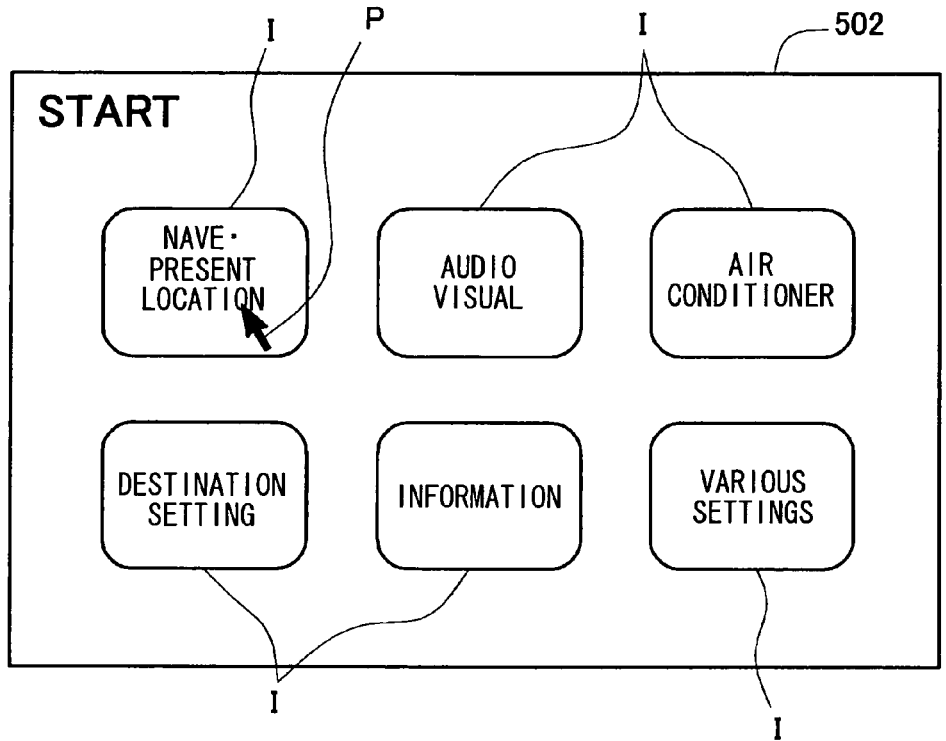
FIG. 9 It is a second embodiment of image display on a display device.

FIG. 9 shows a display example on the display 51, in which a menu screen is displayed, and a plurality of operation images I are displayed as in FIG. 8A. However, a displayed operation image I is different from that of FIG. 8A. Each operation image I displayed herein has correspondence to a control content of changing display to a corresponding display screen.

Figure 10:
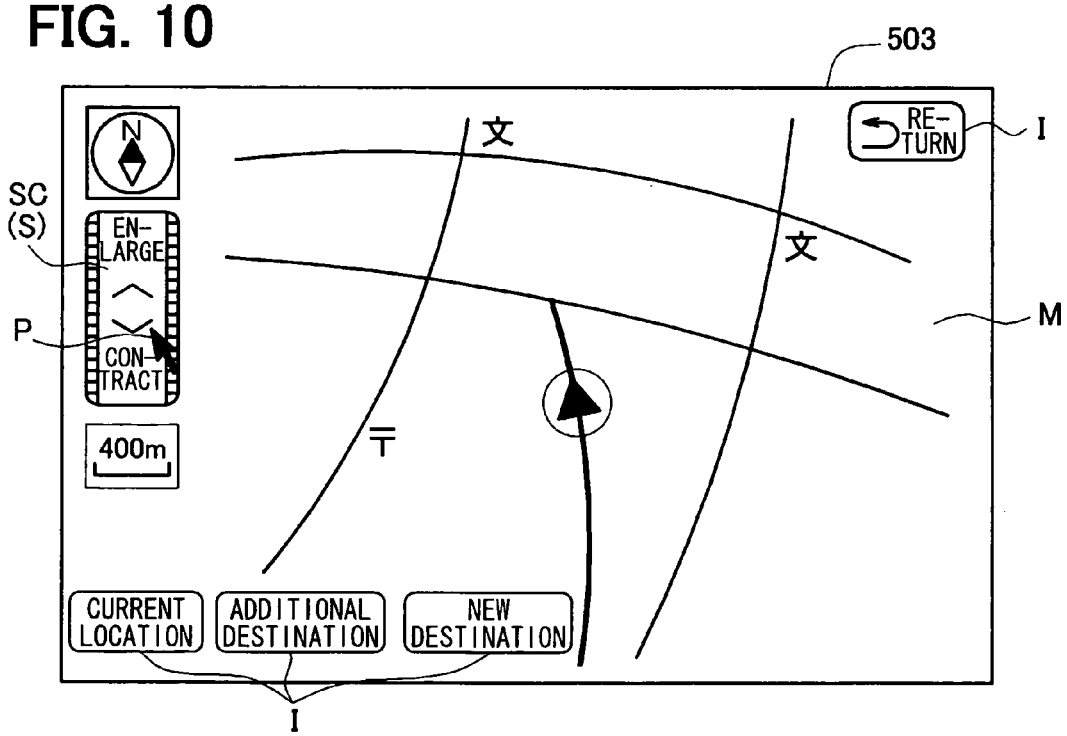
FIG. 10 It is a third embodiment of image display on a display device.

A display screen shown in FIG. 10 is a map screen 503 displaying a current position of one's vehicle, which is a low-order hierarchy screen displayed by position specifying input to an operation image I on the menu screen 502. Even in the map screen 503, a plurality of operation images I are displayed on a map image M being a background image. Furthermore, a scroll operation image (scroll operation area S) S for zooming, which displays a map image M to be displayed in an enlarged or contracted manner, is displayed and set on the map image M. The scroll operation area S is a control-content-change display area (operation image for zooming). For example, when a pointer image P is located on the area S by position instruction operation using the two-dimensional operation section 200, an operation mode of the one-dimensional operation section 300 is changed from the position instruction mode to the control content change mode. When the one-dimensional operation section 300 is operated in this state, zooming display, which induces corresponding change in scale, is preformed depending on operation amount to the section 300. Here, several scales are set in a beforehand determined order, and the scale are sequentially changed from one another depending on operation amount of the one-dimensional operation section 300.

Figure 11A:
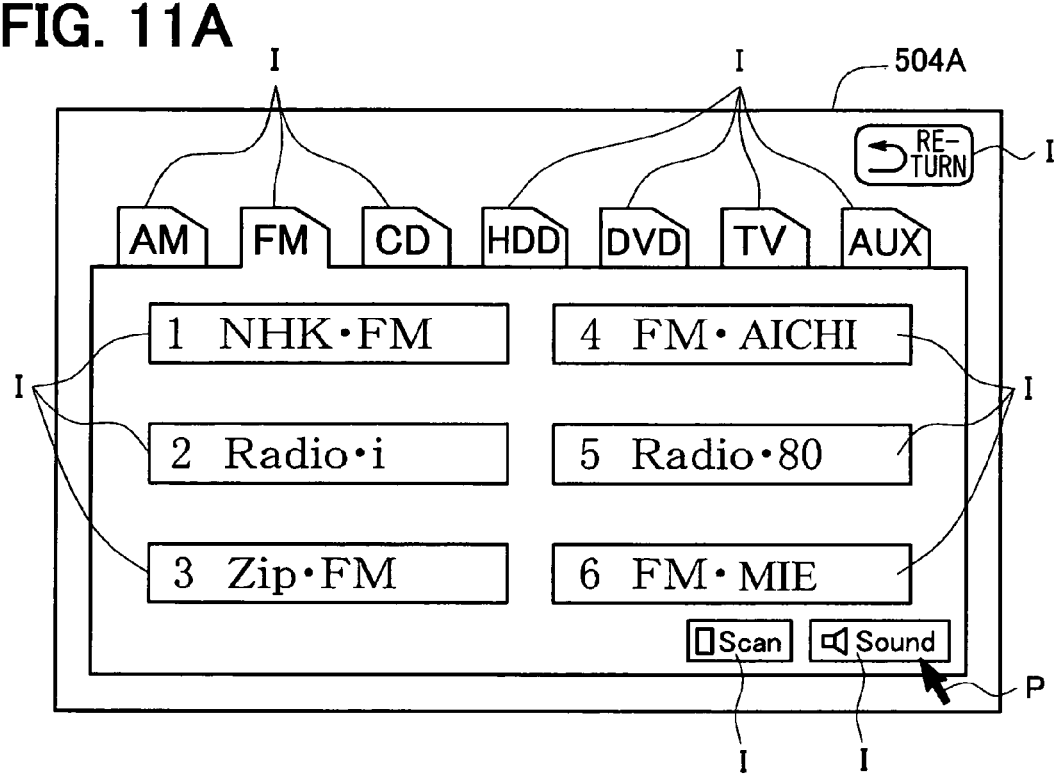
FIG. 11A It is a fourth embodiment of image display on a display device.
Figure 11B:
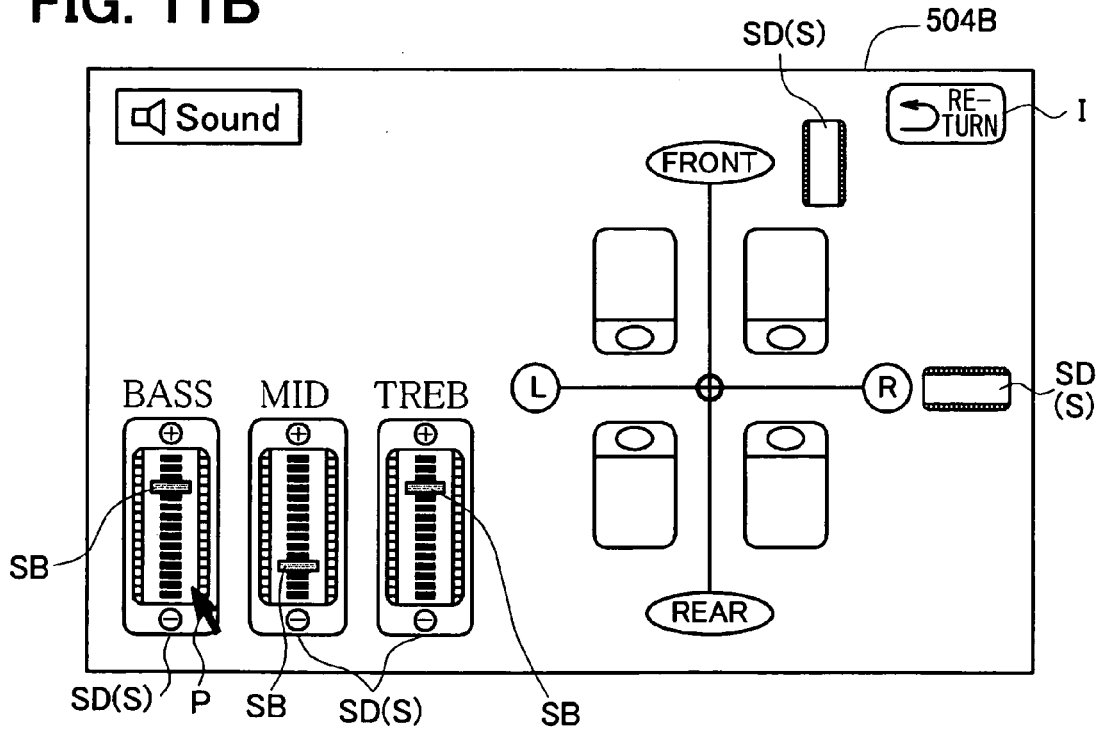
FIG. 11B It is a fifth embodiment of image display on a display device.

FIGS. 11A, 11B show a display example of the display 51, which show a flow of displaying an audio setting screen 504B from an FM channel selection screen 504A in an in-vehicle audio device.

A display screen 504 shown in FIG. 11A is an FM channel selection screen on which a plurality of operation images I are displayed, which is a low-order hierarchy screen displayed by position specifying input to an operation image I on the menu screen 502. Here, a channel set to No. 3 is previously selected, and outputted to a vehicle interior. In this state, position instruction using a pointer image P is performed to an operation image I having correspondence to a control content of changing a screen to an audio setting screen 504B by position instruction operation by at least one of the one-dimensional operation section 300 and the two-dimensional operation section 200. Position specifying input is performed in this state, thereby display is changed to a display screen 504B shown in FIG. 11B.

A display screen 504B shown in FIG. 11B is an audio setting screen, which is a low-order hierarchy screen of the FM channel selection screen 504A. In the audio setting screen 504B, a plurality of scroll operation areas S are displayed and set for various kinds of audio setting. The scroll operation area S corresponds to a control-content-change display area (operation image for volume control). For example, when a pointer image P is located on the area S by position instruction operation using the two-dimensional operation section 200, an operation mode of the one-dimensional operation section 300 is changed from the position instruction mode to the control content change mode. When the one-dimensional operation section 300 is operated in this state, corresponding volume adjustment control is preformed depending on the relevant operation amount. A bar image SB showing a volume level is sometimes displayed in the scroll operation area S. When operation using the one-dimensional operation section 300 is performed to the scroll operation area S, control is concurrently performed to move a display position of the bar image SB along a one-dimensional display direction beforehand determined on a screen depending on the relevant operation amount.

Figure 12A:
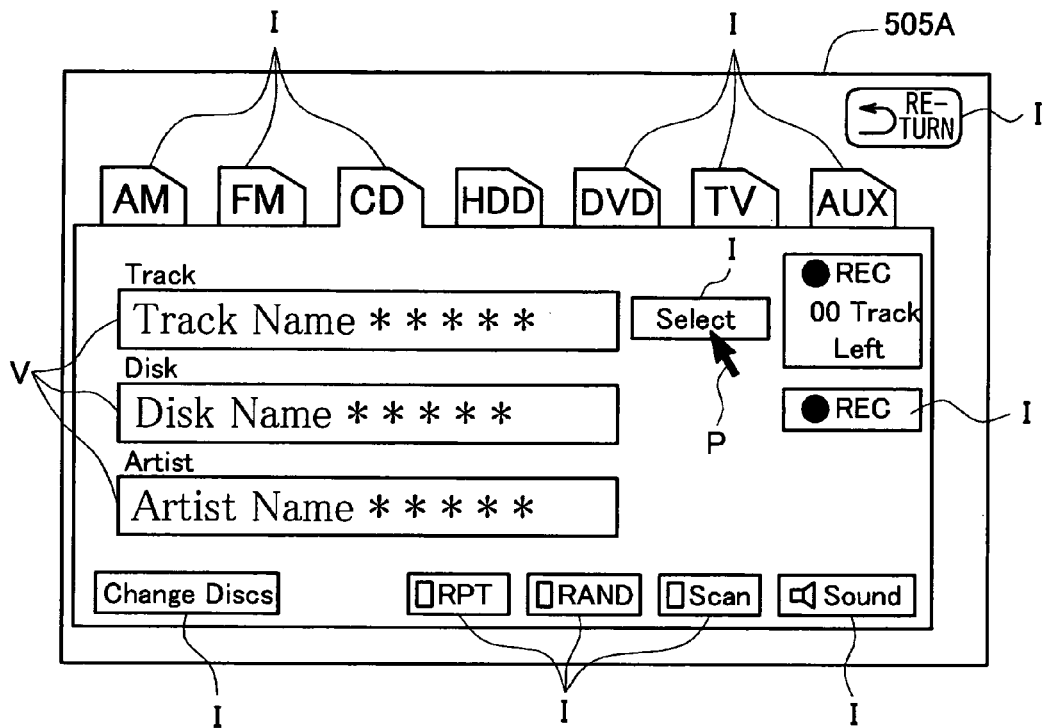
FIG. 12A It is a sixth embodiment of image display on a display device.
Figure 12B:
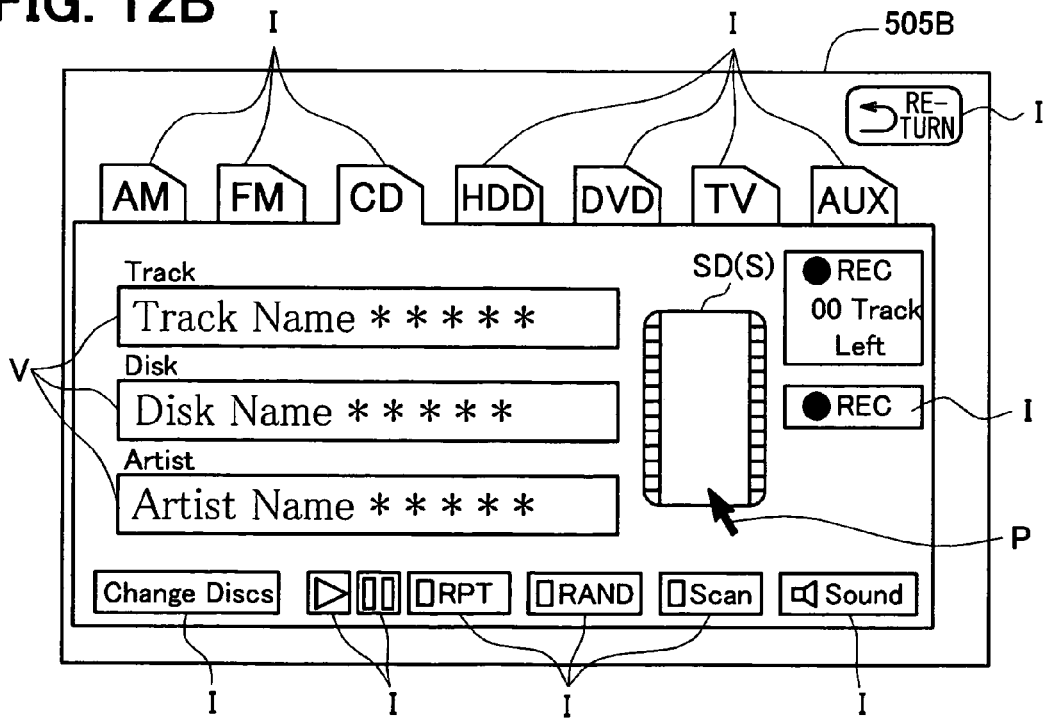
FIG. 12B It is a seventh embodiment of image display on a display device.

FIGS. 12A, 12B show a display example of the display 51, showing a screen on which an operation image I for one-dimensional operation is shown by position instruction operation using the two-dimensional operation section 200 to a predetermined display object. Here, the screen shows a flow of displaying an operation image for music selection as an operation image I for the one-dimensional operation section 300 along with position instruction operation using the two-dimensional operation section 200 and the one-dimensional operation section 300 on a music playback screen 505A in an in-vehicle audio device.

A display screen 505A shown in FIG. 12A is one of music playback screens, which is a low-order hierarchy screen displayed by position specifying input to an operation image I on the menu screen 502. A plurality of operation images I are displayed, and information on a music to be selected is displayed. A control content of changing a current display state is allowed to be corresponding to an operation image I in such a manner that an operation image for CD album selection as one of operation images for music selection is shown on a current display screen. Position instruction using a pointer image P is performed to an operation image I by position instruction operation by at least one of the one-dimensional operation section 300 and the two-dimensional operation section 200, and furthermore, position specifying input is performed in such a state, thereby display is changed to a display screen 504B shown in FIG. 12B.

A display screen 505B shown in FIG. 12B is a screen where an operation image I for music selection is shown on the display screen 505A shown in FIG. 12A, which is a low-order hierarchy screen of the display screen 505A. In the screen 505B, a scroll operation area S is displayed and set for CD album selection. The scroll operation area S is a control content change area (operation image for CD album selection) SC. For example, when a pointer image P is located on the area SC by position instruction operation using the two-dimensional operation section 200, an operation mode of the one-dimensional operation section 300 is changed from the position instruction mode to the control content change mode. When the one-dimensional operation section 300 is operated in this state, the following control is performed: a CD album to be a playback object is sequentially changed according to a beforehand determined order of CD albums depending on amount of the operation. Concurrently, display change control of a CD album display area V is performed, and control of sequentially changing name display of a CD album to be a playback object is correspondingly performed.

FIGS. 13A, 13B show a display example on the display 51, where position instruction is performed on predetermined display screen by position instruction operation using the two-dimensional operation section 200. Position specifying input is performed in the position instruction state, thereby an operation image I for the two-dimensional operation section is displayed for performing a predetermined control content. However, when one-dimensional operation using the one-dimensional operation section 300 is performed in the position instruction state to the operation image I, the operation image I is accordingly changed to a scroll operation image for one-dimensional operation for performing a similar control content. Here, the figures show a flow that an operation image I for the two-dimensional operation section for adjusting a blowoff airflow level to be displayed is changed to a scroll operation image I for one-dimensional operation for similarly adjusting a blowoff airflow level.

A display screen shown in FIG. 13A is a setting screen of an in-vehicle air conditioner, showing a plurality of operation images. The screen shows operation images I for setting a blowoff airflow level, and an operation image I corresponding to each airflow level is indicated in position by position instruction operation using the two-dimensional operation section. The operation image receives position specifying input in such a position instruction state, thereby a corresponding blowoff airflow level is set. When one-dimensional operation using the one-dimensional operation section 300 is performed in the state where position instruction is performed by position instruction operation using the two-dimensional operation section 200 on each of the operation images I for airflow level setting, or on a predetermined operation-image-group display area in which the operation images I are displayed, control of changing a screen to a display screen shown in FIG. 13B is performed.

A display screen shown in FIG. 13B is a screen changed from the display screen shown in FIG. 13A, which however does not shows the operation image I for the two-dimensional operation section for setting a blowoff airflow level, and instead shows an operation image I for the one-dimensional operation section for similarly setting a blowoff airflow level. A horizontal scroll operation area S for a blowoff airflow level is displayed and set on the screen. When position instruction operation is performed by two-dimensional operation of the two-dimensional operation section 200 to locate a pointer image P on a control-content change display area in which the relevant scroll operation image is displayed, an operation mode of the one-dimensional operation section 300 is changed to the control content change mode. When the one-dimensional operation section 300 is operated in such a state, a blowoff airflow level set for an in-vehicle air conditioner is adjusted depending on amount of the operation. In addition, a bar image is displayed for indicating a volume level within a scroll operation image (scroll operation area S), and as the one-dimensional operation is performed, a display position of the bar image moves depending on amount of the operation. Here, a one-dimensional operation direction of the one-dimensional operation section 300 is the Y direction, and a corresponding one-dimensional display direction on the screen of the display 51 is a lateral direction of the screen.

In the screen display example of the display 51, when only one scroll operation area S being a control content change area SC is displayed within a screen, operation assigned to the one-dimensional operation section 300 may be set such that even if position instruction operation is not performed to the control content change area SC, a control content may be changed to a control content corresponding to an operation direction, and display movement operation that a predetermined display object is moved in a one-dimensional display direction by the one-dimensional operation section 300 may be prohibited.

Figure 38:
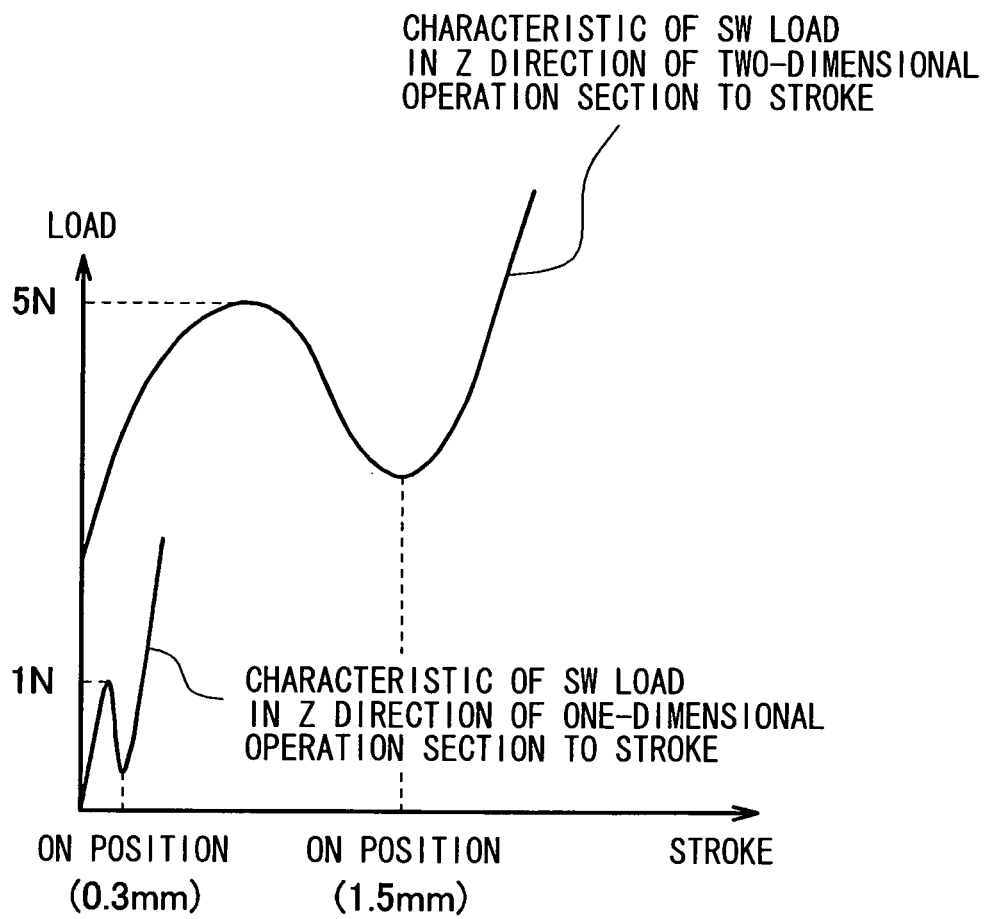
FIG. 38 It is a view for illustrating a configuration for preventing concurrent operation of push switches corresponding to a one-dimensional operation section and a two-dimensional operation section respectively.

The manipulation apparatus 1 of the embodiment has two push switches for pressing operation in the Z direction. The manipulation apparatus 1 has the push switch 106 that is pressed and urged to be ON by push operation of pressing the movable operation section 101 in the Z direction, and the push switch 230 that is pressed and urged to be ON by pressing and displacing the one-dimensional operation section 300 as a whole in the Z direction through push operation of pressing the operation surface 301a of the section 300 in the Z direction. However, when pressing operation of the one-dimensional operation section 300 is performed to press and urge the push switch 106, the movable operation section 101 may be also displaced in the Z direction, so that the push switch 230 may be concurrently pressed and urged, leading to possibility of concurrent operation of both the switches. Therefore, an operation stroke for pressing and urging the push switch 106 is set long (desirably two times or more) compared with an operation stroke for pressing and urging the push switch 230. Alternatively, an operation load for pressing and urging the push switch 106 is set large (desirably two times or more) compared with an operation load for pressing and urging the push switch 230. This may prevent concurrent operation of both the push switches 106 and 230. In the embodiment, as shown in FIG. 38, the operation stroke (1.5 mm herein) for pressing and urging the push switch 106 is set at least five times as long as the operation stroke (0.3 mm herein) for pressing and urging the push switch 230. In addition, the operation load for pressing and urging the push switch 106 (here, the load is set such that an operation load of 5N is produced at a position in the middle of a line from a non-urging position of the push switch 106 to an urging position (ON position) thereof) is set at least five times as large as the operation load for pressing and urging the push switch 230 (here, the load is set such that an operation load of 1N is produced at a position in the middle of a line from a non-urging position of the push switch 230 to an urging position (ON position) thereof).

Hereinafter, embodiments different from the first embodiment are described using drawings.

[Second Embodiment]

A second embodiment is described using FIGS. 17 to 21.

Figure 17:
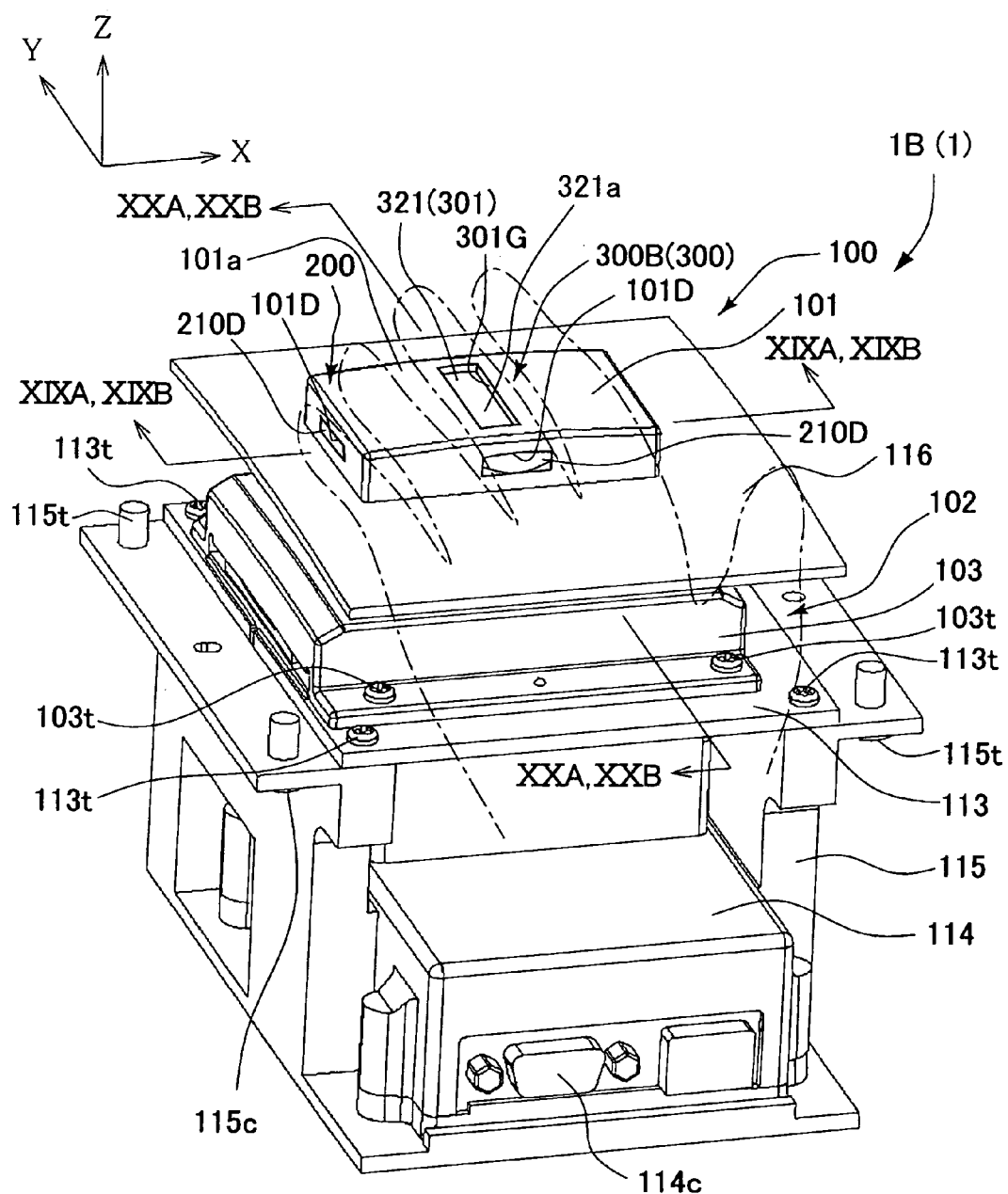
FIG. 17 It is an outside perspective view of a body of a manipulation apparatus of a second embodiment.
Figure 18:
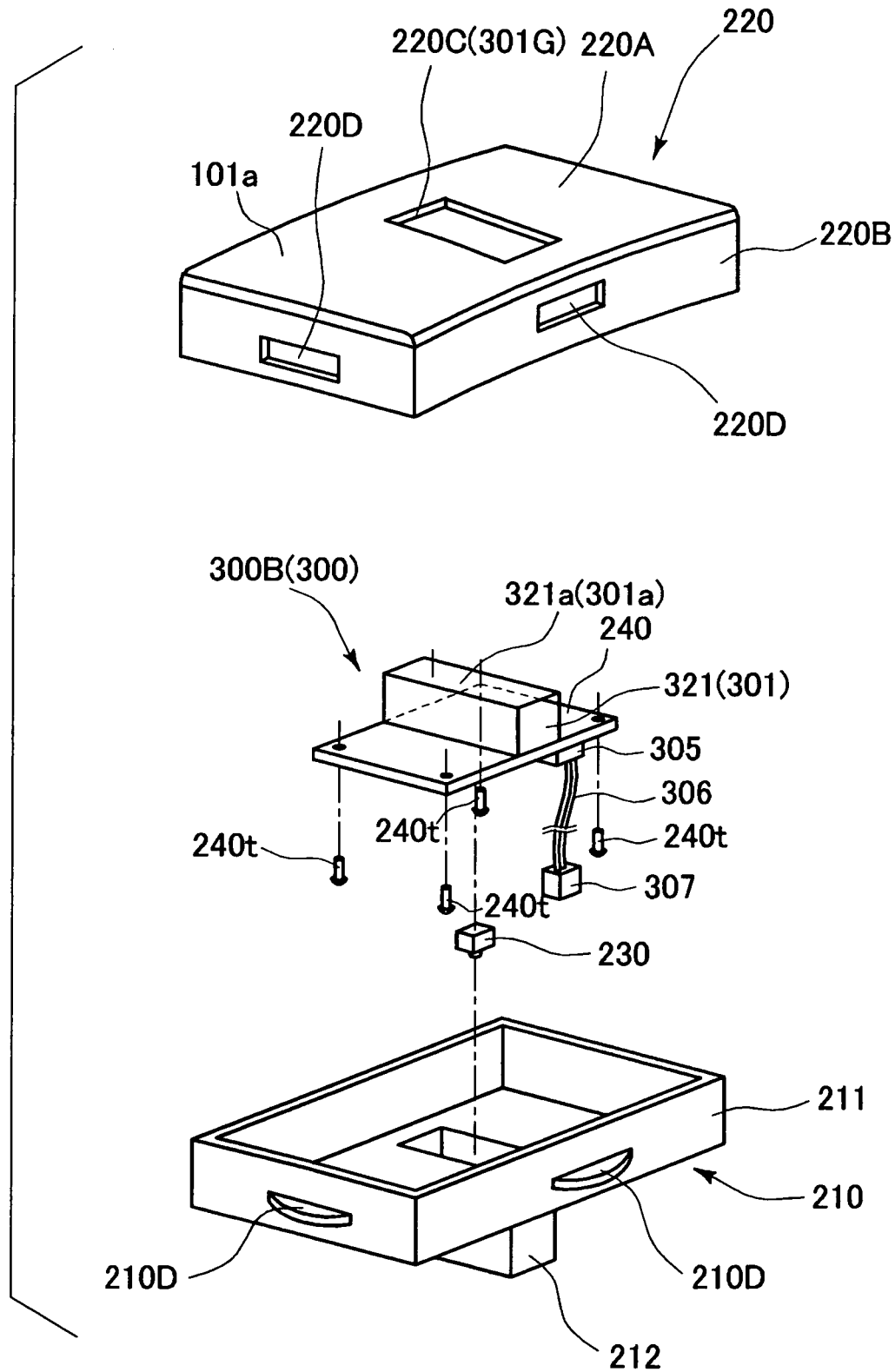
FIG. 18 It is an exploded perspective view of a movable operation section in FIG. 17.
Figure 19A:
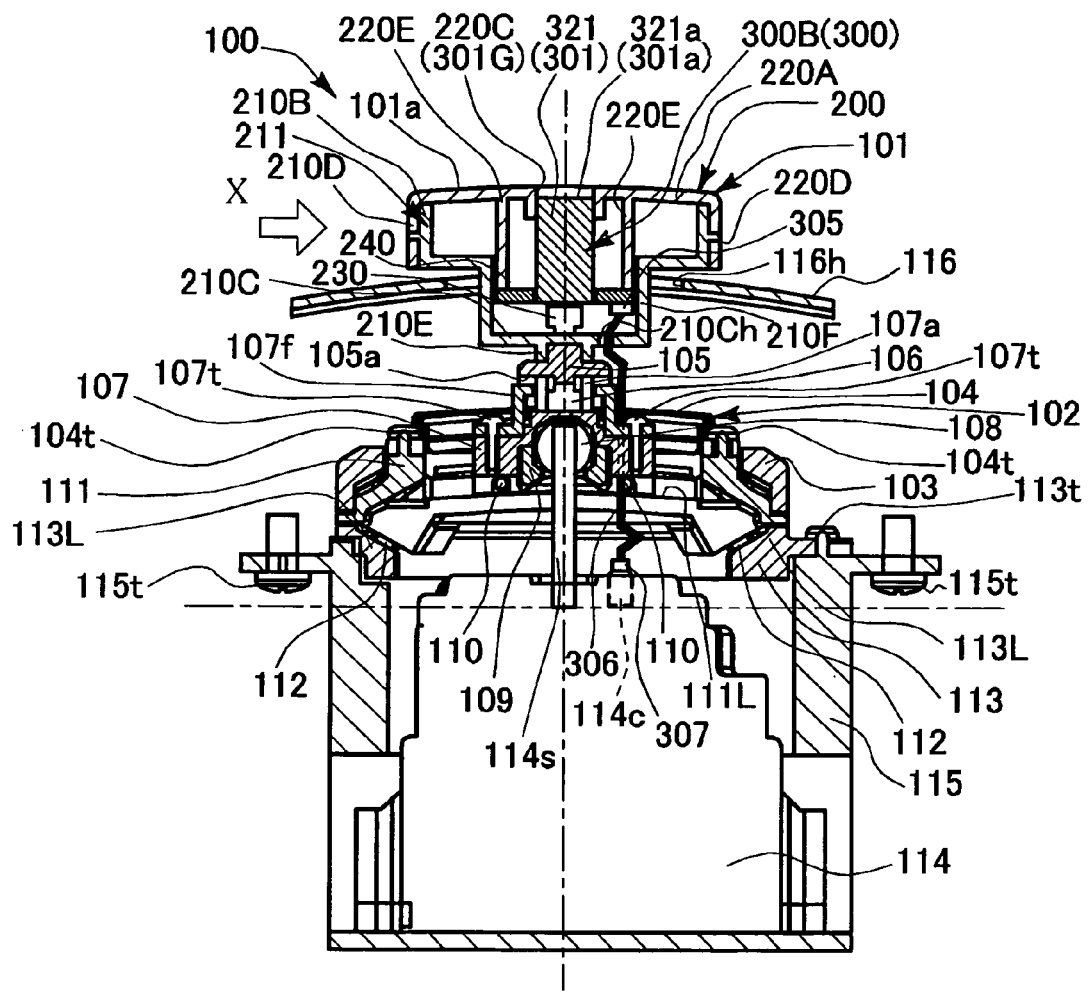
FIG. 19A It is a section view along XIXA-XIXA when a two-dimensional operation section is in a neutral state in FIG. 17.
Figure 19B:
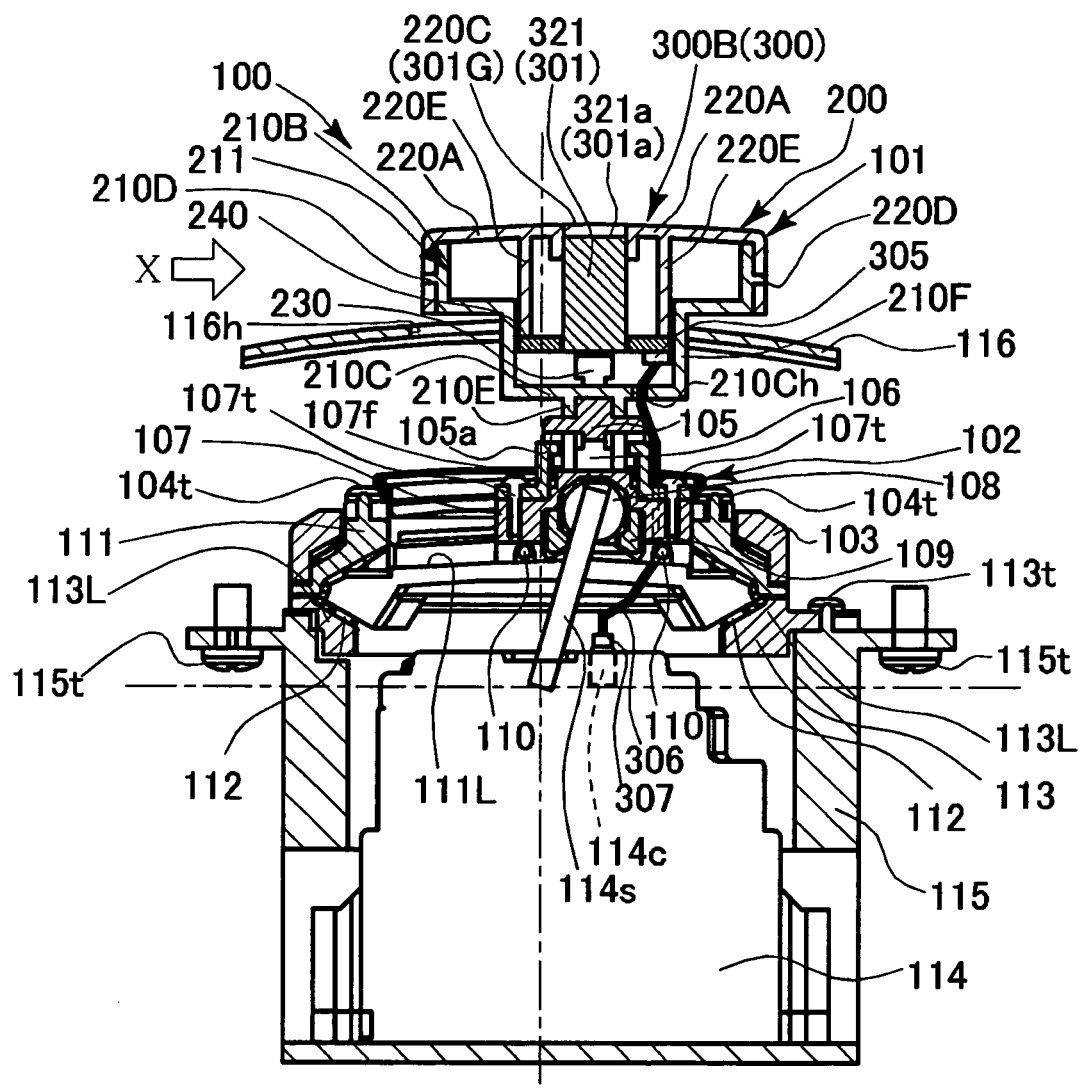
FIG. 19B It is a section view along XIXB-XIXB when the two-dimensional operation section is not in the neutral state in FIG. 17.
Figure 20A:
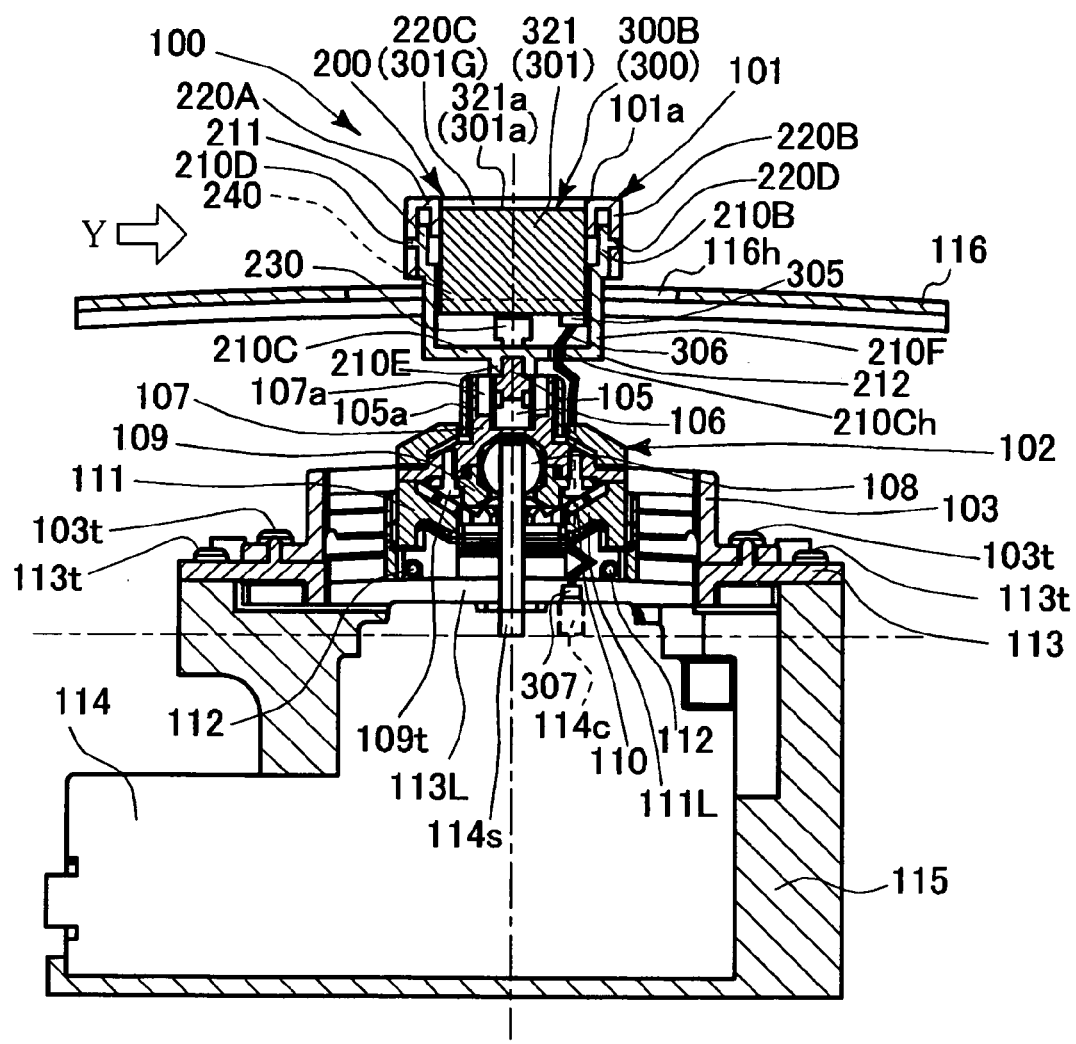
FIG. 20A It is a section view along XXA-XXA when the two-dimensional operation section is in the neutral state in FIG. 17.
Figure 20B:
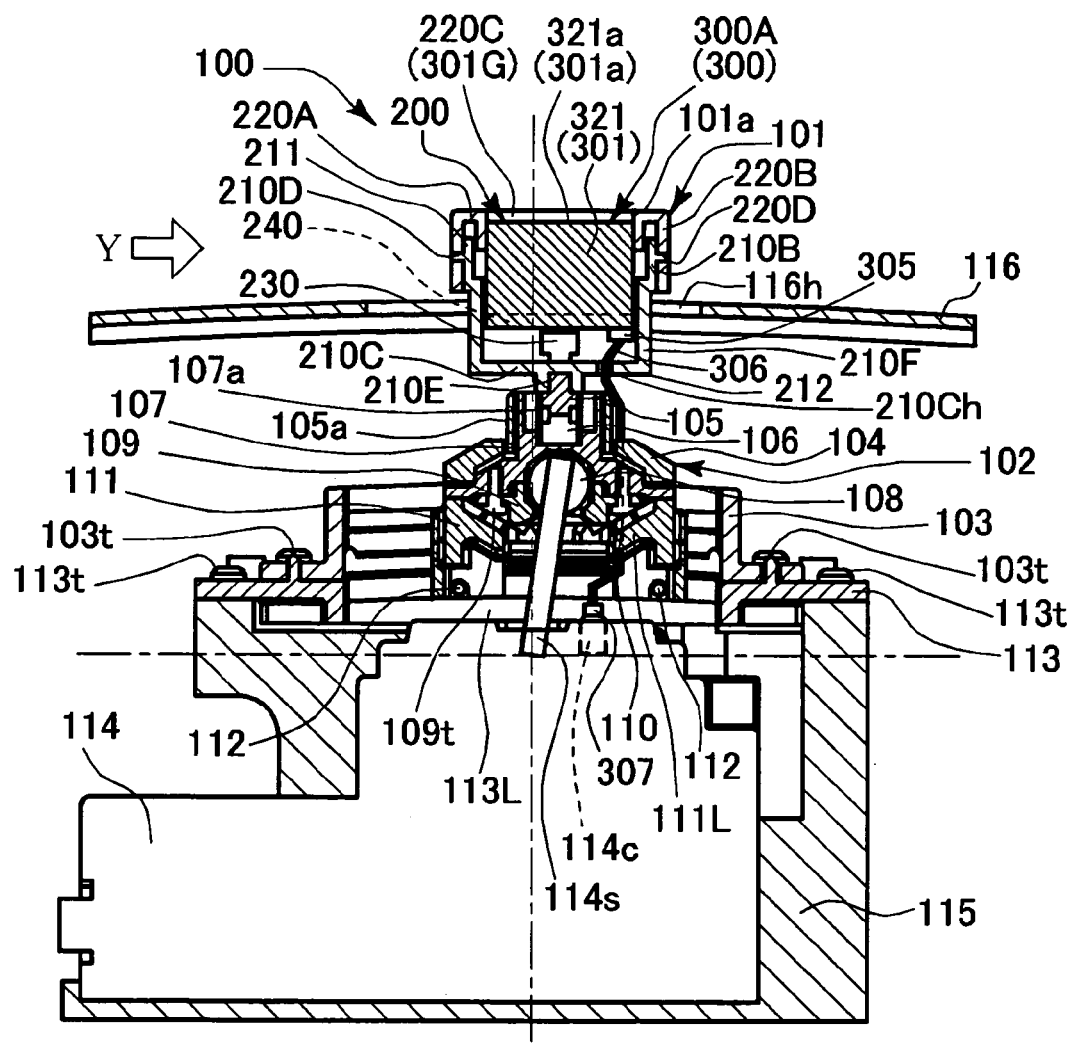
FIG. 20B It is a section view along XXB-XXB when the two-dimensional operation section is not in the neutral state in FIG. 17.
Figure 21:
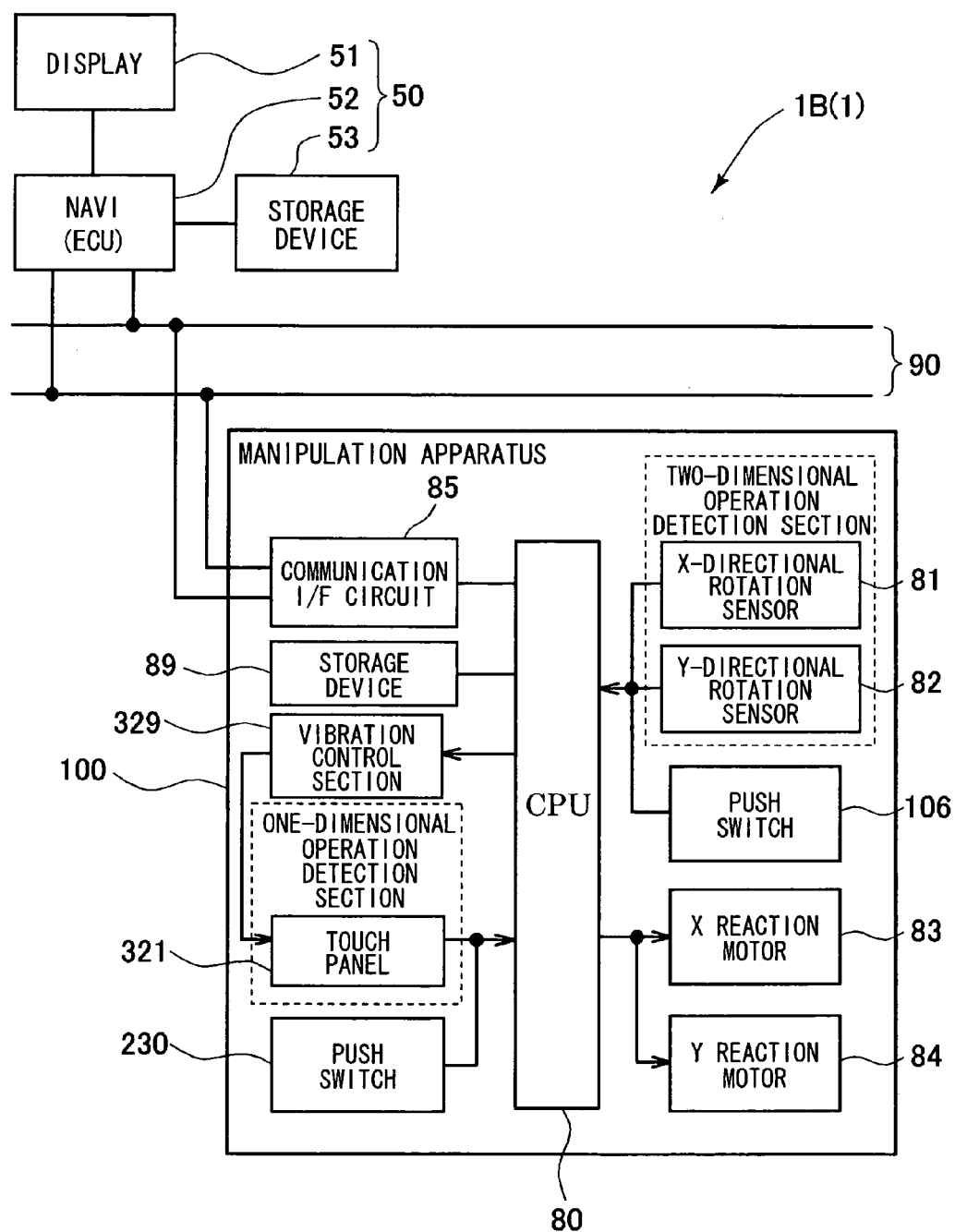
FIG. 21 It is a block diagram showing a general configuration concept of the manipulation apparatus of FIG. 17.

FIG. 17 is a perspective view showing an operational structure portion (body) of an in-vehicle manipulation apparatus of the second embodiment, FIG. 18 is an exploded perspective view of a movable operation section thereof, FIGS. 19A, 19B are section views along XIXA-XIXA and along XIXB-XIXB in FIG. 17 (sections as those of FIGS. 5A, 5B), FIGS. 20A, 20B are section views along XXA-XXA and along XXB-XXB in FIG. 17 (sections as those of FIGS. 6A, 6B), and FIG. 21 is a block diagram showing a general configuration concept of the manipulation apparatus of FIG. 17.

The in-vehicle manipulation apparatus 1B(1) of the second embodiment has a touchpad operation section 300B as a one-dimensional operation section 300. The touchpad operation section 300B has a touch panel 321 on an end surface side of a movable operation section 101 of a two-dimensional operation section 200 in such a manner that a touch operation surface being an operation surface 321a is exposed, and a user performs touch movement operation where the operation section moves while the user touches the touch operation surface 321a. Moving displacement by the touch movement operation in a one-dimensional operation direction, the direction being beforehand determined in the touch operation surface 321a, is detected as operational displacement. In a typical touchpad operation section, CPU vector-decomposes moving displacement caused by touch movement operation performed on a touch operation surface into two orthogonal axes (X-Y) determined on the touch operation surface, and detects amount of each vector as operational displacement. However, CPU 80 in the embodiment detects moving displacement only in a one-dimensional operation direction (Y direction herein), and does not detect moving displacement in another axial direction (X direction herein) perpendicular to the one-dimensional operation direction, or even if the CPU 80 detects such moving displacement, the CPU does not use a value of the moving displacement later. Here, the touch panel 321 is an operation object member 301 in which an operation direction on the touch operation surface 321a is set to a predetermined one-dimensional operation direction set on a two-dimensional displacement direction (two-dimensional operation surface) of the movable operation section 101.

A well-known resistive-film-type or capacitance-type touch panel may be used as the touch panel 321.

In the embodiment, a vibration control section 329 is provided as operational force sense applying means as shown in FIG. 21. The vibration control section 329 has a touch-operation force sense applying mode where as a user performs touch operation to a touch operation surface, certain vibration (force sense) is applied to the user in response to the touch operation, and a touch-movement-operation force sense applying mode where as a user performs the touch movement operation causing certain amount of moving displacement on the touch operation surface, certain vibration (force sense) is applied to the user in response to the operation. Such a force sense is applied according to an instruction from the CPU 80, thereby the vibration control section 329 acts as touch-operation force sense applying means and touch-movement force sense applying means. A force sense being applied is not limited to vibration, and for example, a sense of receiving pressing force in a direction opposite to a touch direction may be used, or other senses may be used.

In the embodiment, the movable operation section 101 has a hollow inside, and the touchpad operation section 300B is accommodated in the inside, and an opening 220C is provided in an end surface 111a, and the touch operation surface 321a is exposed from the opening 220C as in the described embodiment.

The touch operation surface 321a of the embodiment is formed into a rectangular shape of which the width in the one-dimensional operation direction determined on the surface 321a is longer than width in a direction perpendicular to the one-dimensional operation direction. To further describe, the touch operation surface has a shape long in Y direction and short in X direction, the one-dimensional operation direction of which corresponds to the Y direction so that the touch operation surface is operated in both of forward and reverse directions along the Y direction of the movable operation section 101. One-dimensional display directions, which are determined on a screen of the display 51, corresponding to the one-dimensional operation directions are also determined to be perpendicular to each other, and it is determined herein that a Y direction is a longitudinal direction of a screen (vehicle vertical direction), and an X direction is a lateral direction of the screen (vehicle lateral direction).

Furthermore, in the embodiment, the touch operation surface 321a has guide walls 301G projecting from the surface 321a at both end positions in a direction perpendicular to the one-dimensional operation direction determined on the surface 321. Here, inner circumferential walls of the opening 220C are used as the guide walls 301G, and the touch operation surface 321a is located on a bottom of a groove.

In the embodiment, a push switch 230 is pressed and urged by downward pressing the touch panel 321 as in the first embodiment. The touch panel 321 is supported by a board 240 or an operation cover 220 in a manner of being upward urged by urging means (not shown). The touch panel 321 is displaced downward against urging force of the urging means by the pressing operation, so that the push switch 230 is pressed and urged.

Figure 22A:
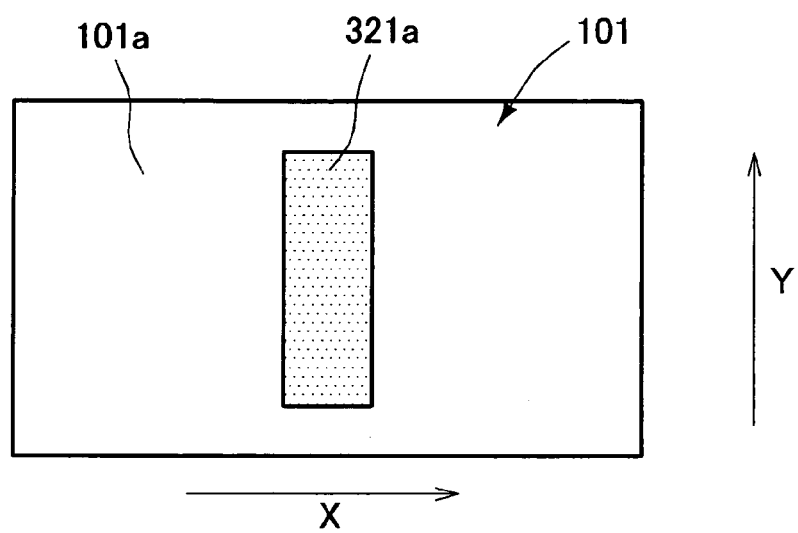
FIG. 22A It is a view showing another embodiment of a touch operation surface shape.
Figure 22B:
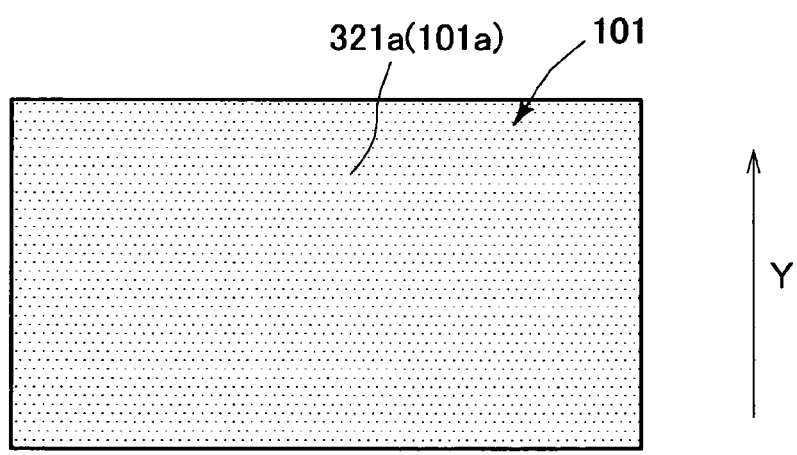
FIG. 22B It is a view showing another embodiment of a touch operation surface shape.
Figure 22C:
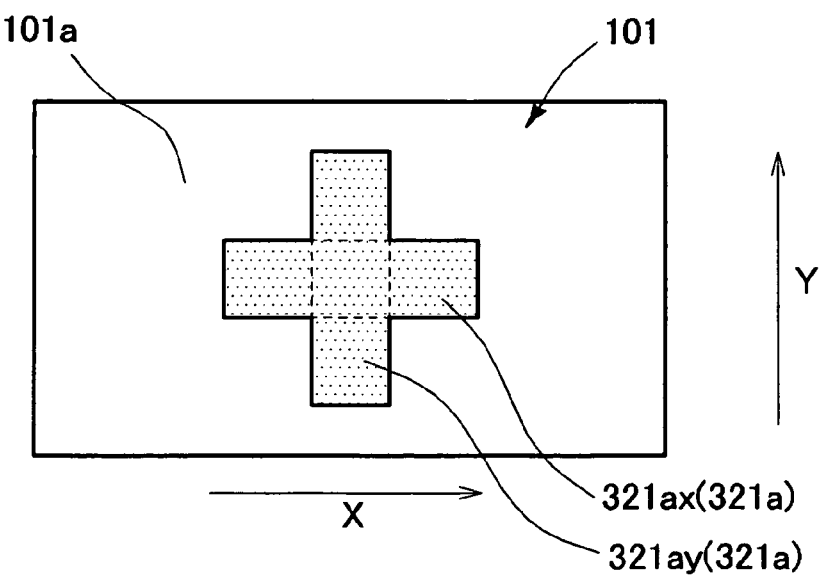
FIG. 22C It is a view showing another embodiment of a touch operation surface shape.

The touch operation surface 321a of the embodiment is formed long in a beforehand determined, one-dimensional direction as shown in FIG. 22A. Alternatively, the whole of a main surface 101a of the movable operation section 101 may be formed to be the touch operation surface 321a as shown in FIG. 22B. As an example where a plurality of one-dimensional operation sections 300 are provided on the main surface 101a of the movable operation section 101 of a two-dimensional operation sections 200, two touch operation surfaces 321ax and 321ay are provided as touch operation surfaces 321a having a rectangular shape, which may be formed into a cross form where respective long side directions of the surfaces intersect with each other at respective long-side centers, as shown in FIG. 22C. In this case, one-dimensional operation directions of the touch operation surfaces 321ax and 321ay are different, and perpendicular to each other herein. Furthermore, one-dimensional display directions, which are determined on a screen of the display 51, corresponding to the one-dimensional operation directions are also determined to be perpendicular to each other on a display screen on which a pointer image P may be moved by both of the one-dimensional operation section 300 and the two-dimensional operation section 200.

Figure 34A:
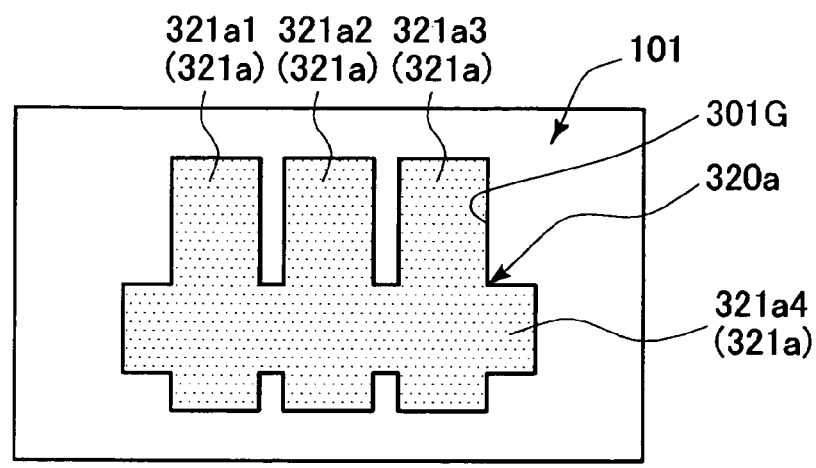
FIG. 34 It is a view showing an example of a touch operation surface shape different from that of FIG. 22.
Figure 34B:
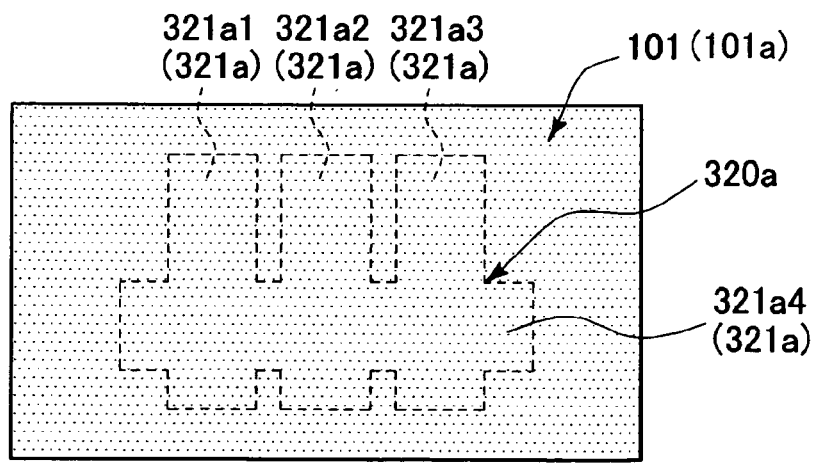

In FIGS. 34A, 34B, a touchpad operation section 300B is provided as the one-dimensional operation section 300 as in the above. However, the figures show different examples from the above respectively. Here, the touch operation surface 321 is disposed on the main surface 101a of the movable operation section 101 in such a manner that user fingers holing the movable operation section 101 of the two-dimensional operation section 200 are assigned to the touch operation surface. To further describe, a one-dimensional operation direction of the disposed touch operation surface 321 is determined to be a direction along which the assigned fingers are easily moved.

Specifically, four touch operation surfaces 321a1, 321a2, 321a3 and 321a4 are provided. Among them, regarding the three touch operation surfaces 321a1, 321a2 and 321a3, the index finger, the middle finger and the ring finger are supposed to be used for the surfaces during user operation respectively, and the surfaces are arranged parallel to one another in a manner of having a long side direction along a vehicle longitudinal direction, and besides, a one-dimensional operation direction of each surface is set to the vehicle longitudinal direction. On the other hand, regarding the touch operation surface 321a4, a thumb is set as a finger used for the surface during user operation, and the surface is disposed at a position (here, on a vehicle rear side) biased in the vehicle longitudinal direction from a central position in a manner of having a long side direction along a vehicle lateral direction, and besides, a one-dimensional operation direction of each surface is determined to be along the vehicle lateral direction.

The embodiment is described for each of FIGS. 34A and 34B. FIG. 34A shows an example where the four touch operation surfaces 321a1, 321a2, 321a3 and 321a4 are directly formed on the main surface 101a of the movable operation section 101. The touch operation surfaces 321a1, 321a2, 321a3 and 321a4 are located as a bottom of a groove formed in the main surface 101a, and groove walls at outer circumferential edges act as the guide walls 301G. In contrast, in FIG. 34B, an operation surface of a touch panel is formed over the whole surface. Touch operation surfaces 321a1, 321a2, 321a3 and 321a4 are provided as a beforehand determined partial area in the operation surface, and even if touch movement operation is performed to residual areas, such operation input is disabled.

In the embodiment, while the one-dimensional operation section 300 is fixedly disposed with respect to the movable operation section 101 of the two-dimensional operation section 200, the section 300 may be configured such that a disposing position thereof may be customized. For example, an operation-surface setting allowable area, which may be set as the operation surface 301a of the one-dimensional operation section 300, is beforehand formed on the main surface 101a of the movable operation section 101, and furthermore a plurality of operation-surface setting expectation areas are beforehand set in the operation-surface setting allowable area. However, each of the operation-surface setting expectation areas to be set is allowed to be corresponding to a one-dimensional operation direction when each expectation area is set as an operation surface 301a. On the other hand, the operation surface 301a of the one-dimensional operation section 300 may be set in a manner of selecting an operation-surface setting expectation area to be set as an operation surface 301a.

Specifically, in FIGS. 34A, 34B, an area 320a (surface area including areas of symbols 321a1 to 321a4) is set as an operation-surface setting allowable area in which the operation surface 311a may be set, and a touch operation surface of the touch panel 321 is beforehand formed in the area 320a. Furthermore, the areas of symbols 321a1 to 321a4 are beforehand set in the area 320a as a plurality of operation-surface setting expectation areas in a manner of having correspondence to respective one-dimensional operation directions (X direction for symbols 321a1 to 321a3, and Y direction for symbol 321a4). An operation surface setting screen for customizing a disposing position of an operation surface of the one-dimensional operation section 300 is beforehand prepared as a display screen of the display 51. For example, a screen 507 shown in FIG. 35 may be displayed as the operation surface setting screen. Here, in the operation surface setting screen 507, an area 517a corresponding to an actual operation-surface setting allowable area 310a is displayed, and besides, areas 507a1 to 507a4 corresponding to the respective operation-surface setting expectation areas 321a1 to 321a4 are displayed in the area 517a in a manner of reflecting a positional relationship of the areas 321a1 to 321a4 to the operation-surface setting allowable area 320a. An area selection operation of selecting one or some from the displayed areas 507a1 to 507a4 is received, thereby the operation-surface setting expectation areas 321a1 to 321a4 corresponding to the selected areas 507a1 to 507a4 are set to be enabled in function as the touch operation surface 321a, and operation-surface setting expectation areas corresponding to unselected, residual areas are set to be disabled in function as the touch operation surface 321a, and such setting information is stored into the storage device (storage section such as ROM or nonvolatile memory) 89 connected to the CPU 80.

Thus, when touch movement operation is performed to an operation surface enabled in function as the touch operation surface, display movement control or control content change control in correspondence to detected operational displacement is performed. On the other hand, when touch movement operation is performed to an operation surface disabled in function as the touch operation surface, display movement control or control content change control in correspondence to detected operational displacement is not performed. The disabling may be performed in a manner of prohibiting control corresponding to detected operational displacement, or in a manner of stopping operational displacement detection itself.

The above area selection operation may be performed, for example, in such a manner that one of the areas 507a1 to 507a4 is indicated by the position instruction operation, and the position specifying input is performed in such area-indicated state, thereby the indicated area is selected.

Display information for displaying the operation surface setting screen 507 is stored into the storage device (storage section such as ROM or nonvolatile memory) 53 connected to CPU of the NAVI ECU 52. When the operation surface setting screen 507 is displayed, the display information is read by the CPU, and display control is performed based on the display information. Furthermore, beforehand set setting information such as a correspondence relationship between the area 507a1 to 570a4 and the operation-surface setting expectation areas 321a1 to 321a4, and a one-dimensional operation direction of each of the areas 321a1 to 321a4 is stored into the storage device (storage section such as ROM or nonvolatile memory) 89 connected to the CPU 80 in the body 100. The setting information is referred when whether each of the operation-surface setting expectation areas 321a1 to 321a4 is enabled or disabled is set. The storage section 89 further stores setting results on enabling or disabling set for each of the operation-surface setting expectation areas 321a1 to 321a4. When touch movement operation is performed to the operation-surface setting expectation areas 321a1 to 321a4, the CPU 80 determines enabling or disabling based on the setting results, and performs control reflecting such determination.

For example, the whole of the main surface 101a of the movable operation section 101 is formed as an operation-surface setting allowable area that may set as the operation surface 301a of the one-dimensional operation section 300. An area specified in an area-specifying manner on the operation-surface setting allowable area may be set as the operation surface 301a of the one-dimensional operation section 300.

Figure 36:
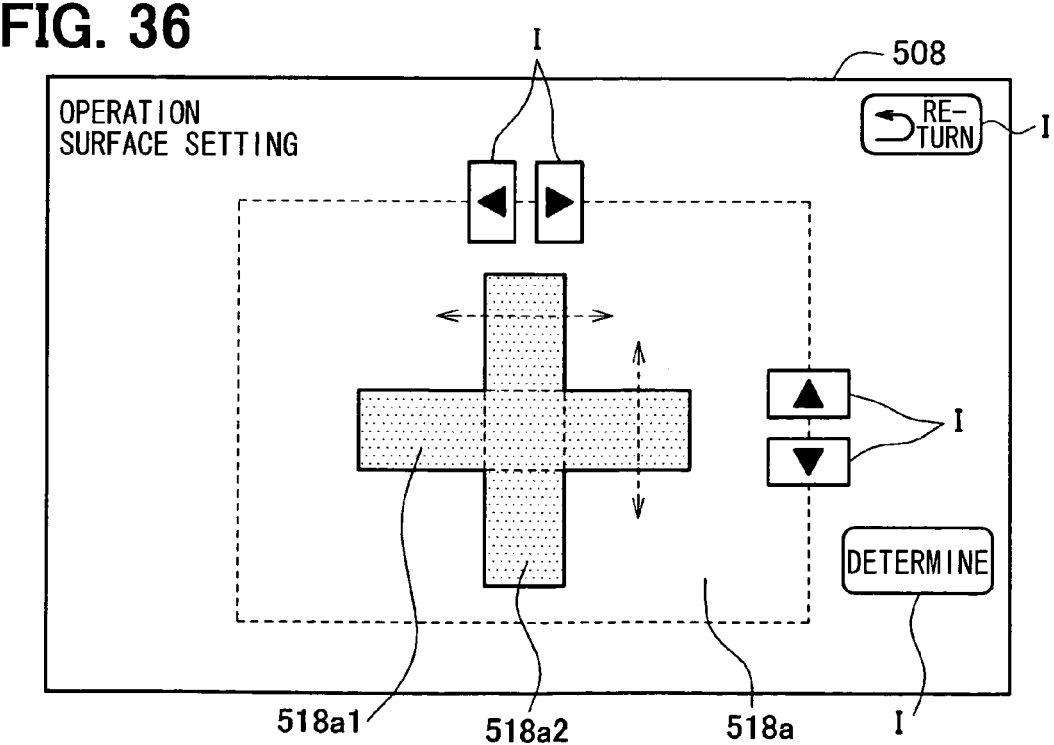
FIG. 36 It is a view for illustrating customization of a setting position of a touch operation surface on a main surface of a movable operation section.

Specifically, as shown in FIG. 34B, the whole of the main surface 101a of the movable operation section 101 is set as the operation-surface setting allowable area 320a (surface area including the areas of the symbols 321a1 to 321a4) that may set as the operation surface 321a, and a touch operation surface of the touch panel 301 is beforehand formed in the area 320a. For example, an operation surface setting screen 508 shown in FIG. 36 is displayed as a display screen of the display 51. An area 518a corresponding to the actual operation-surface setting allowable area 320a is displayed on the operation surface setting screen 508. Area specifying operation of specifying at least one area is received within the area 518a. Thus, areas corresponding to specified areas 518a1 and 518a2 on the operation-surface setting allowable area 320a are set to be enabled in function as the touch operation surface 321a. Operation-surface setting expectation areas corresponding to unselected, residual areas are set to be disabled in function as the touch operation surface 321a. Such setting information is stored into the storage device (storage section such as ROM or nonvolatile memory) 89 connected to the CPU 80.

Thus, when touch movement operation is performed to an operation surface enabled in function as the touch operation surface, display movement control or control content change control in correspondence to detected operational displacement is performed. On the other hand, when touch movement operation is performed to an operation surface disabled in function as the touch operation surface, display movement control or control content change control in correspondence to detected operational displacement is not performed. The disabling may be performed in a manner of prohibiting control corresponding to detected operational displacement, or in a manner of stopping operational displacement detection itself.

The operation specifying operation is performed, for example, in such a manner that as the operation surface setting screen 508 is displayed, a frame image for specifying an area to be displayed is moved. As a position of the frame image is determined, a region within the frame image is set as an operation surface. Movement of the frame image can be performed by the position specifying input to an operation image I for movement, or the like.

Figure 32:
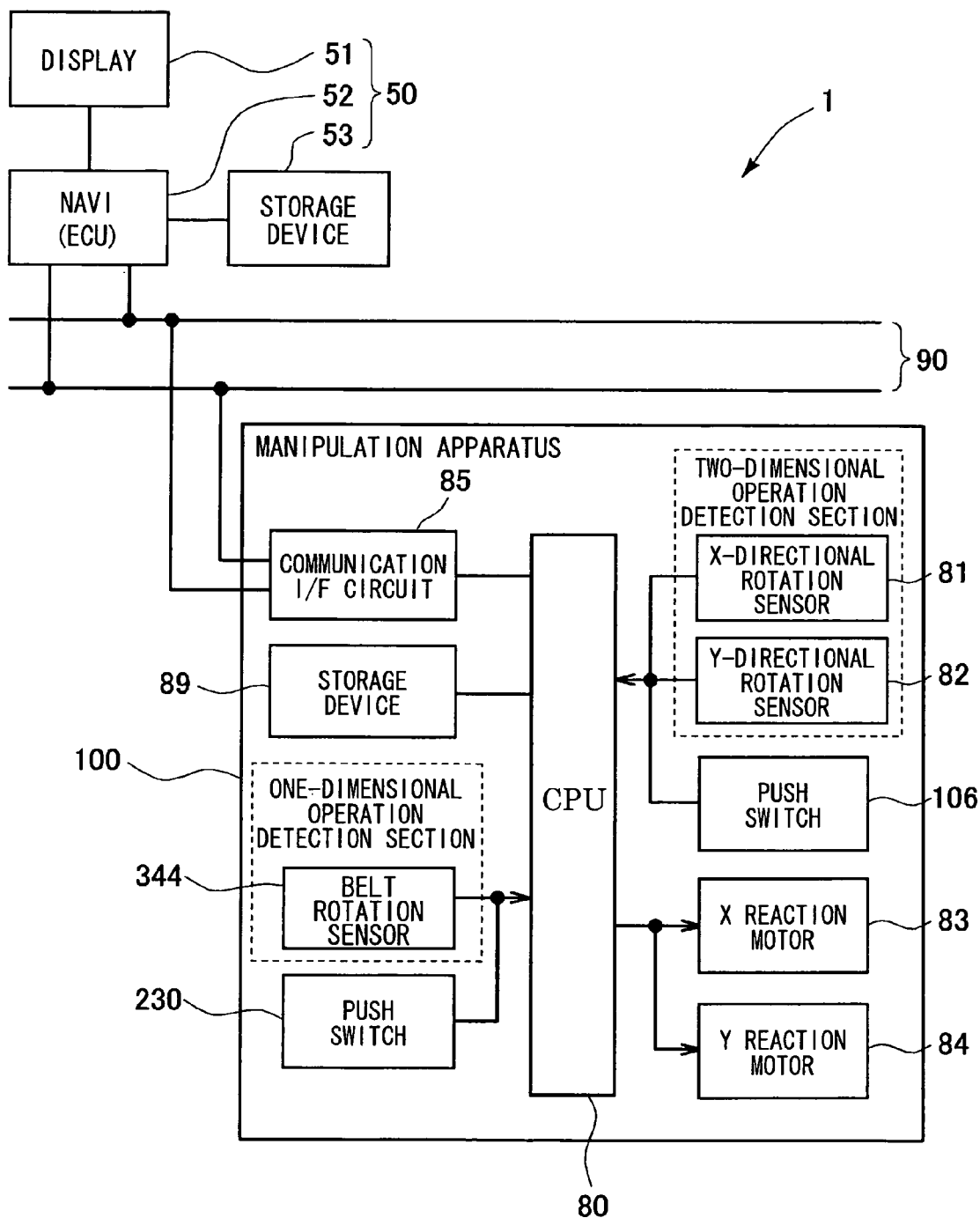
FIG. 32 It is a block diagram showing a general configuration concept of the manipulation apparatus of FIG. 28.
Figure 33:
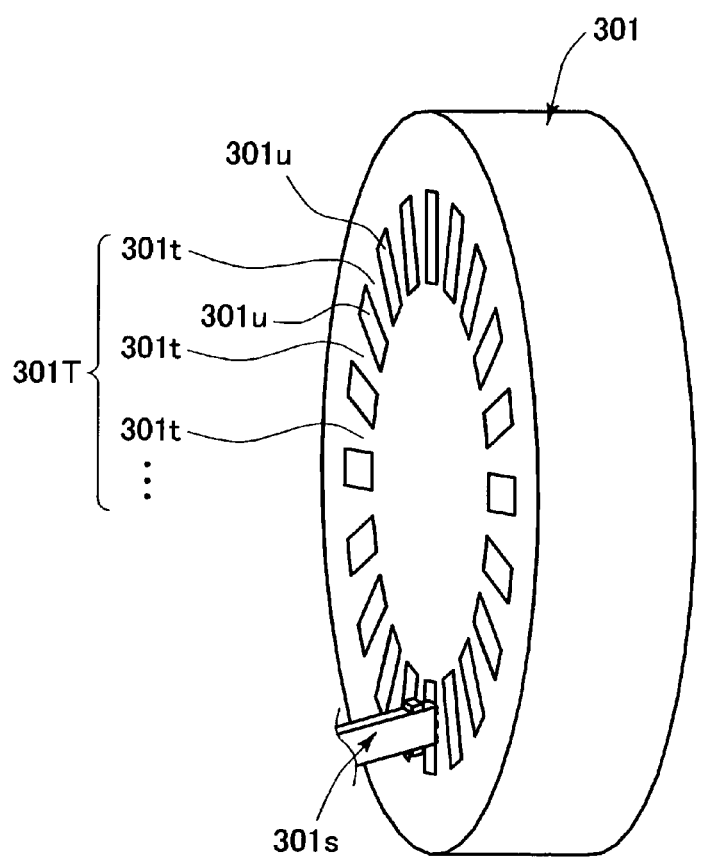
FIG. 33 It is a view simply showing a structure for applying a force sense by a rotational operation member.

Display information for displaying the operation surface setting screen 508 is stored in the storage device (storage section such as ROM or nonvolatile memory) 53 connected to the CPU of the NAVI ECU 52 (FIG. 32). When the operation surface setting screen 508 is displayed, the display information is read by the CPU, and display control is performed based on the display information. Furthermore, the setting results on enabling or disabling set by the area-specifying operation is stored in the storage device (storage section such as ROM or nonvolatile memory) 89 connected to the CPU 80 of the body 100. Regarding the setting results, when touch movement operation is performed to the operation-surface setting allowable area 310*a*, the CPU 80 determines enabling or disabling of operation based on the setting results, and performs control reflecting such determination.

Figure 35:
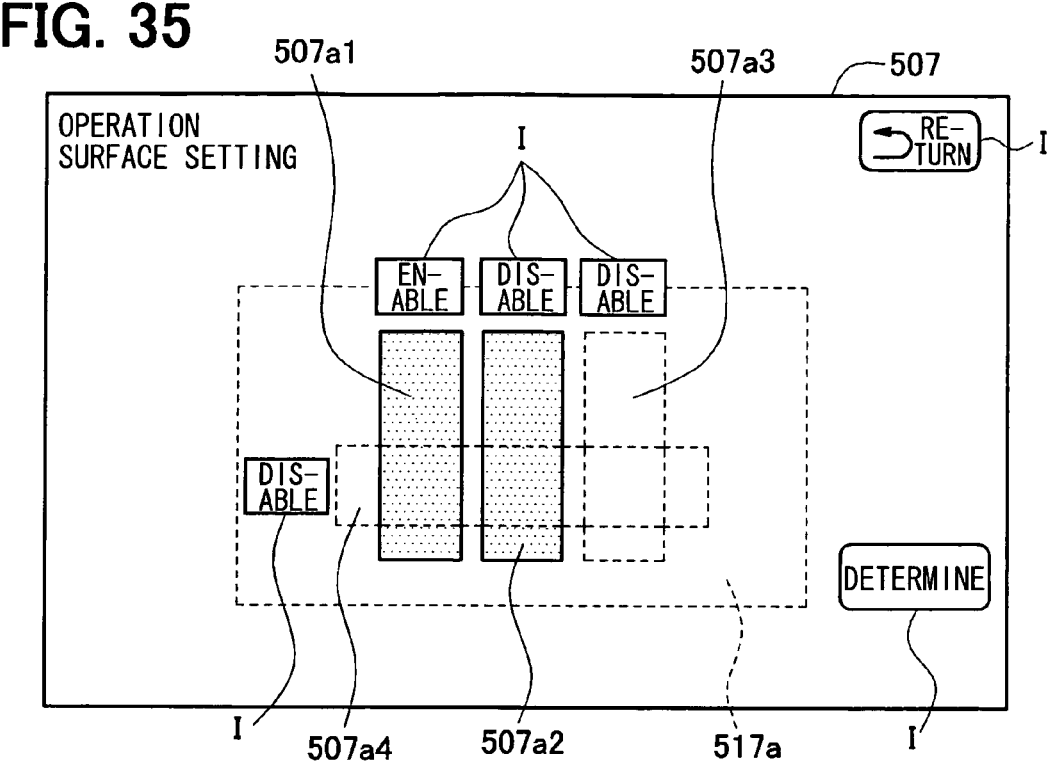
FIG. 35 It is a view for illustrating customization of a setting position of a touch operation surface on a main surface of a movable operation section.

In the embodiments shown in FIGS. 35 and 36, the NAVI ECU 52 and the CPU 80 of the body 100 cooperatively act as operation-surface-position customizing means, so that customization is performed using screen display on the display 51 or operation input with the two-dimensional operation section 200.

[Third Embodiment]

A third embodiment is described using FIGS. 23 to 27.

Figure 23:
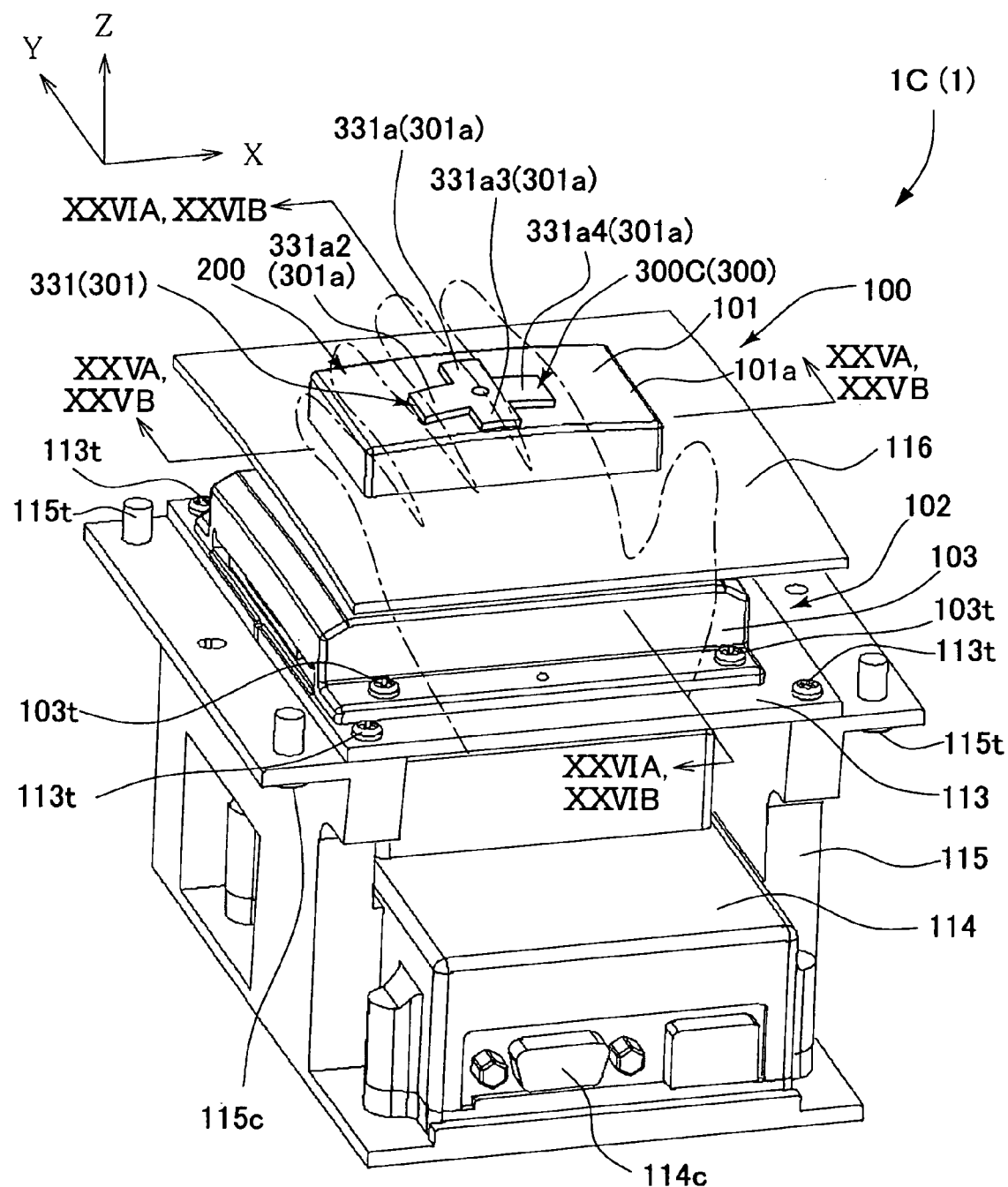
FIG. 23 It is an outside perspective view of a body of an in-vehicle manipulation apparatus according to a third embodiment.
Figure 24:
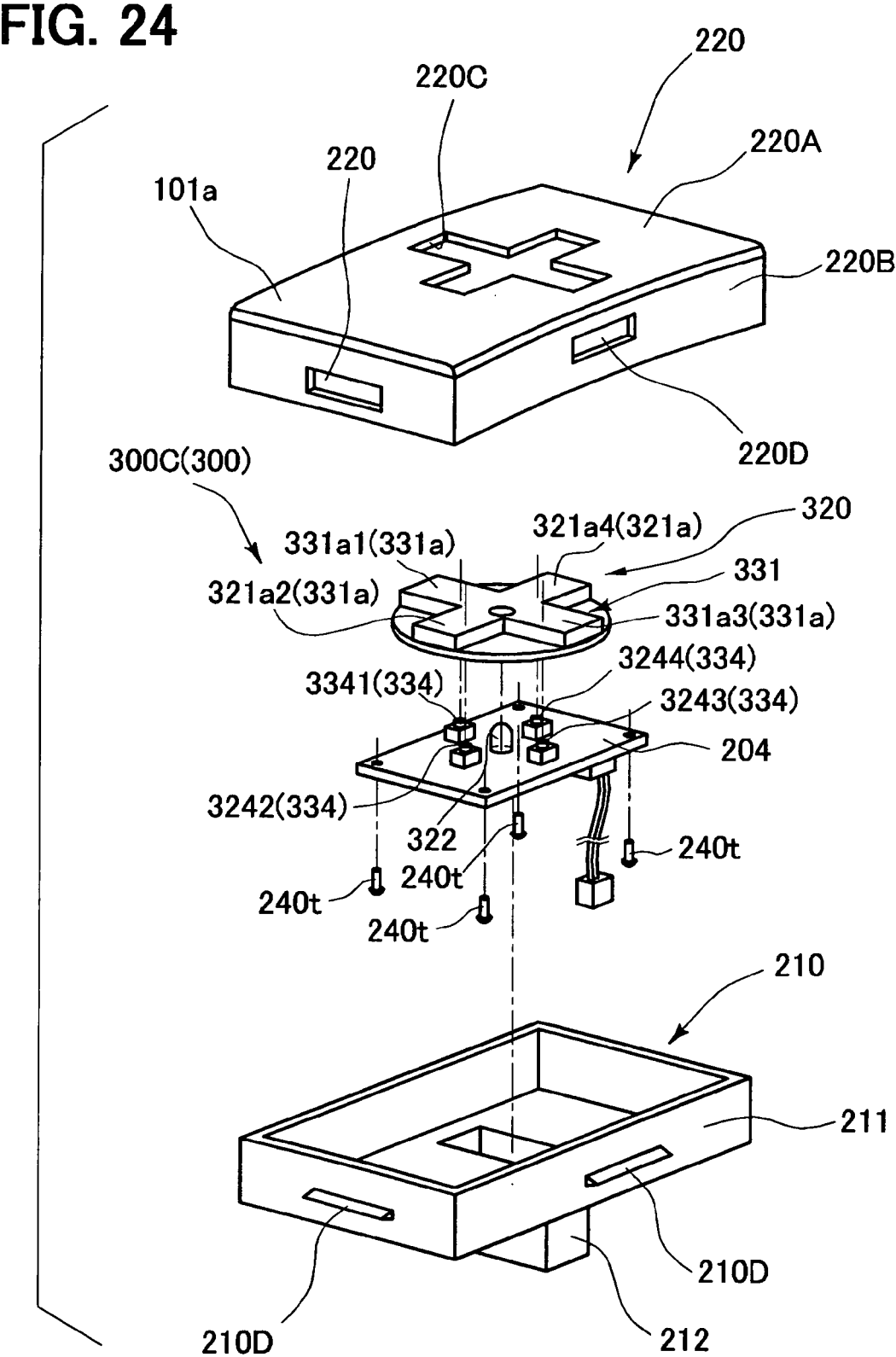
FIG. 24 It is an exploded perspective view of a movable operation section in FIG. 23.
Figure 25A:
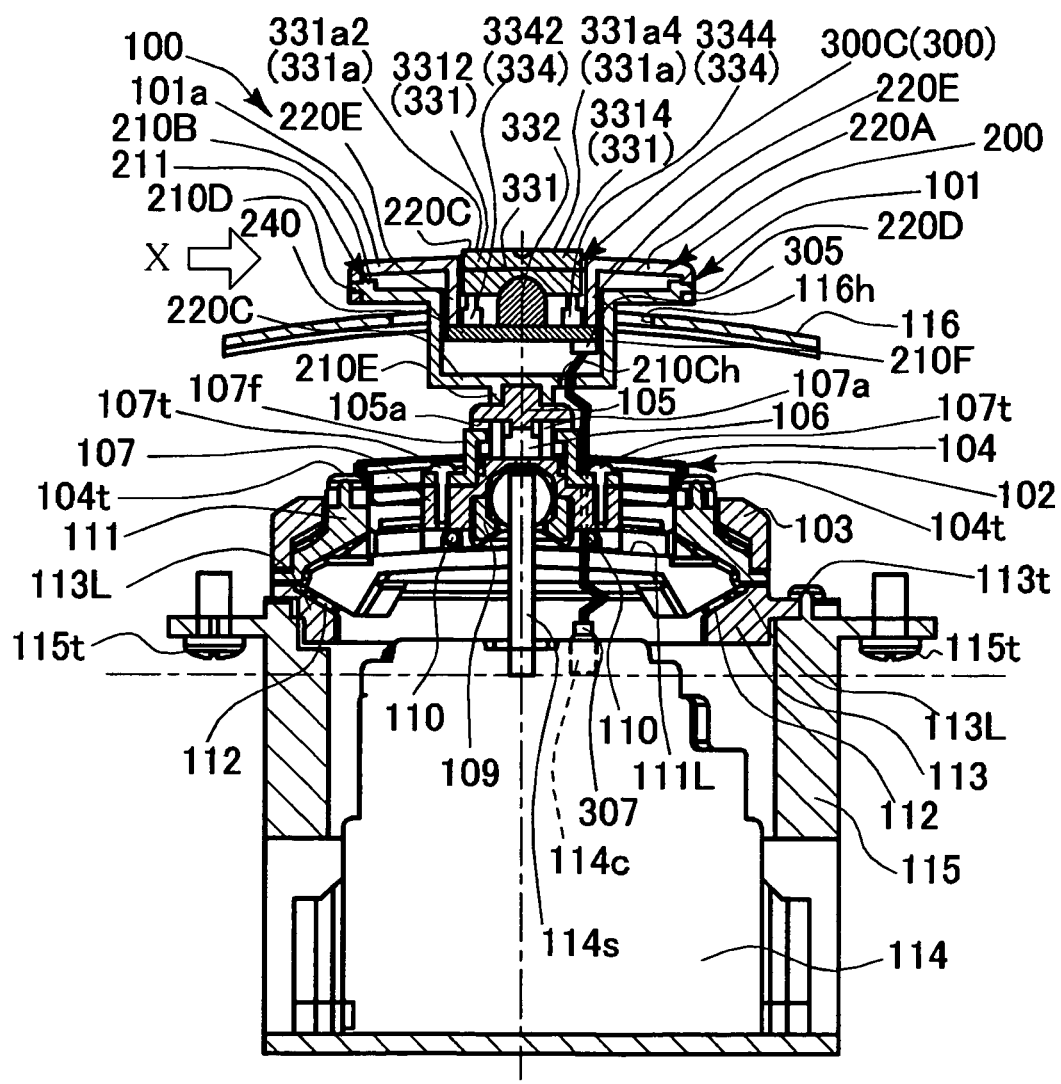
FIG. 25A It is a section view along XXVA-XXVA when a two-dimensional operation section is in a neutral state in FIG. 23.
Figure 25B:
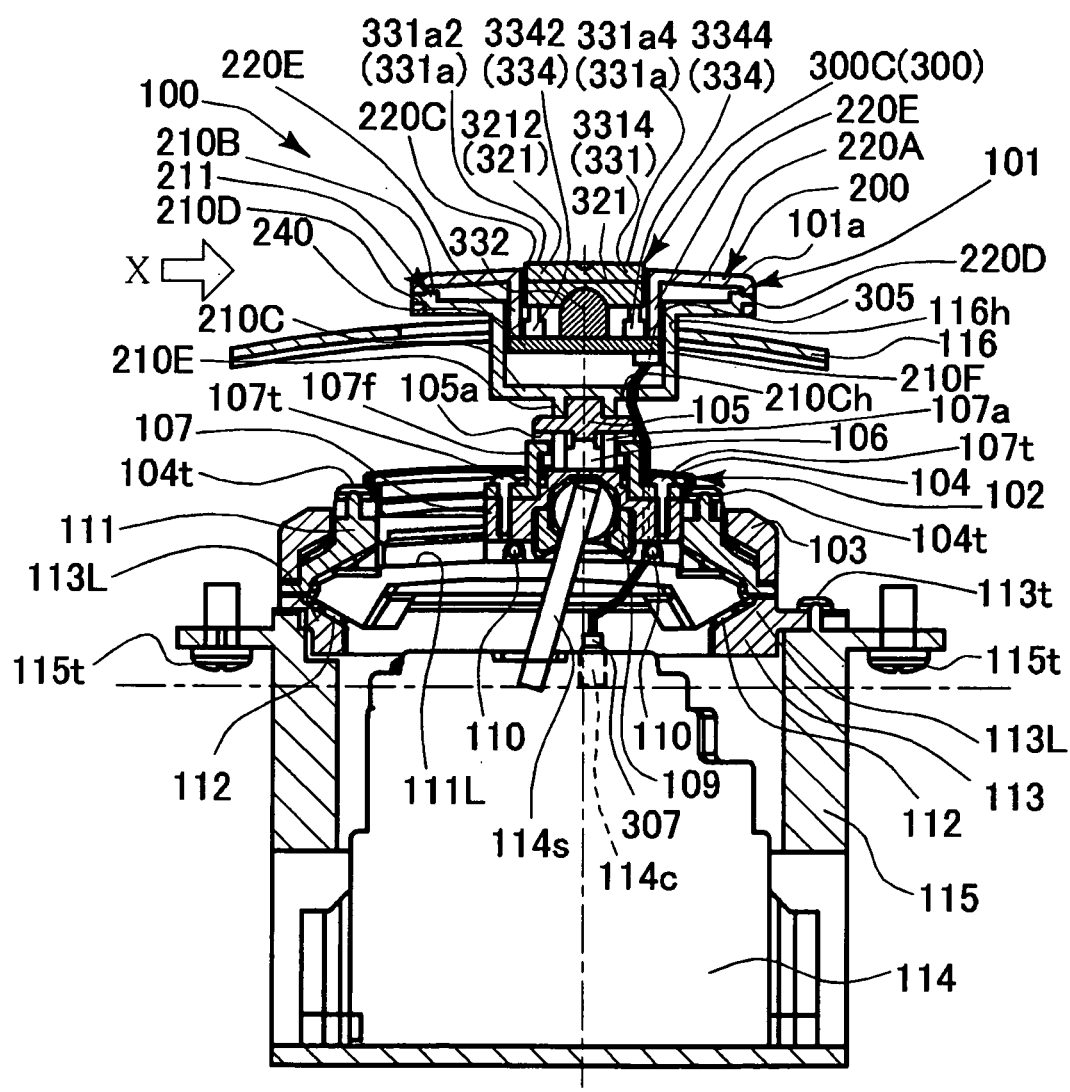
FIG. 25B It is a section view along XXVB-XXVB when the two-dimensional operation section is not in the neutral state in FIG. 23.
Figure 26A:
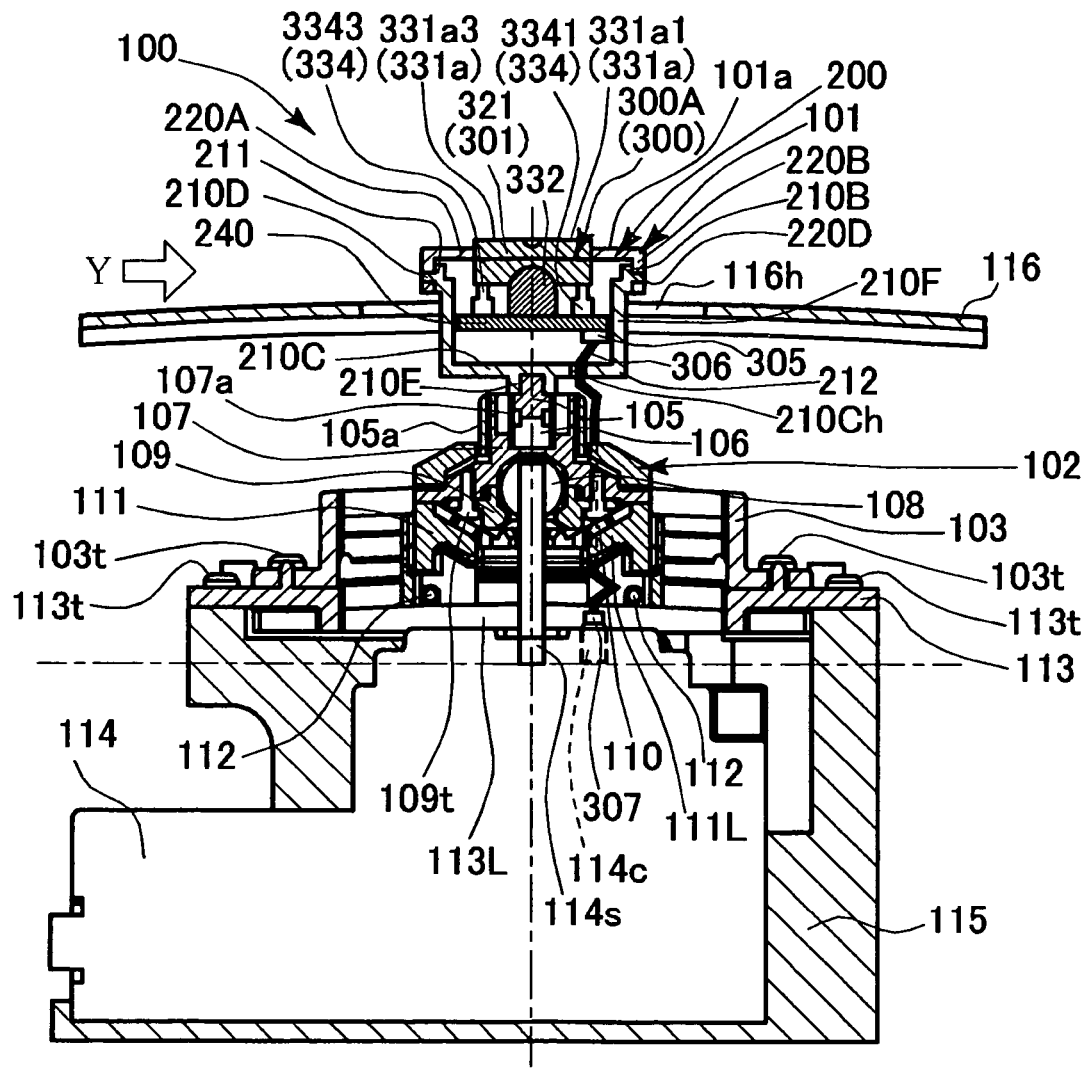
FIG. 26A It is a section view along XXVIA-XXVIA when the two-dimensional operation section is in the neutral state in FIG. 23.
Figure 26B:
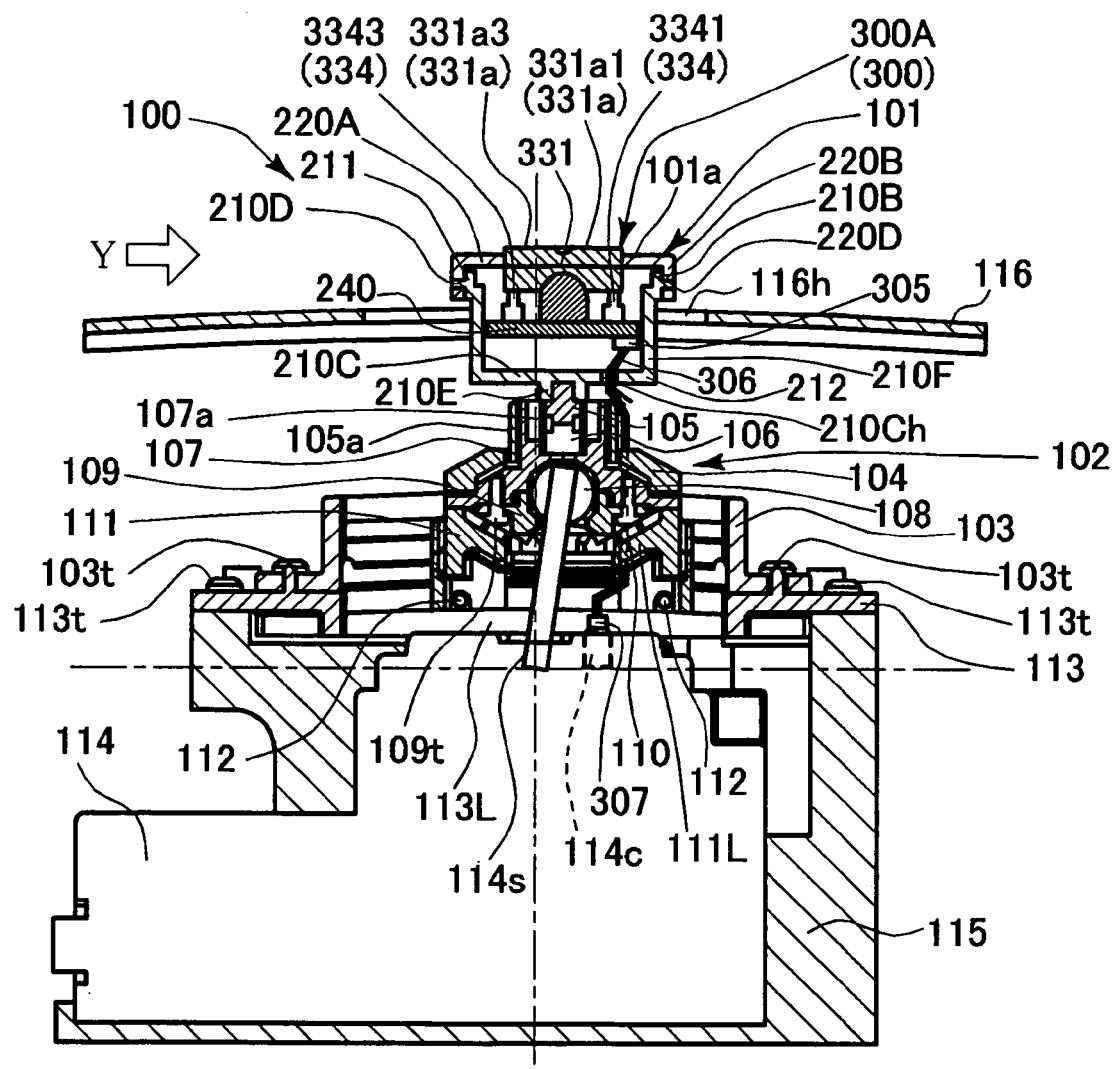
FIG. 26B It is a section view along XXVIB-XXVIB when the two-dimensional operation section is not in the neutral state in FIG. 23.
Figure 27:
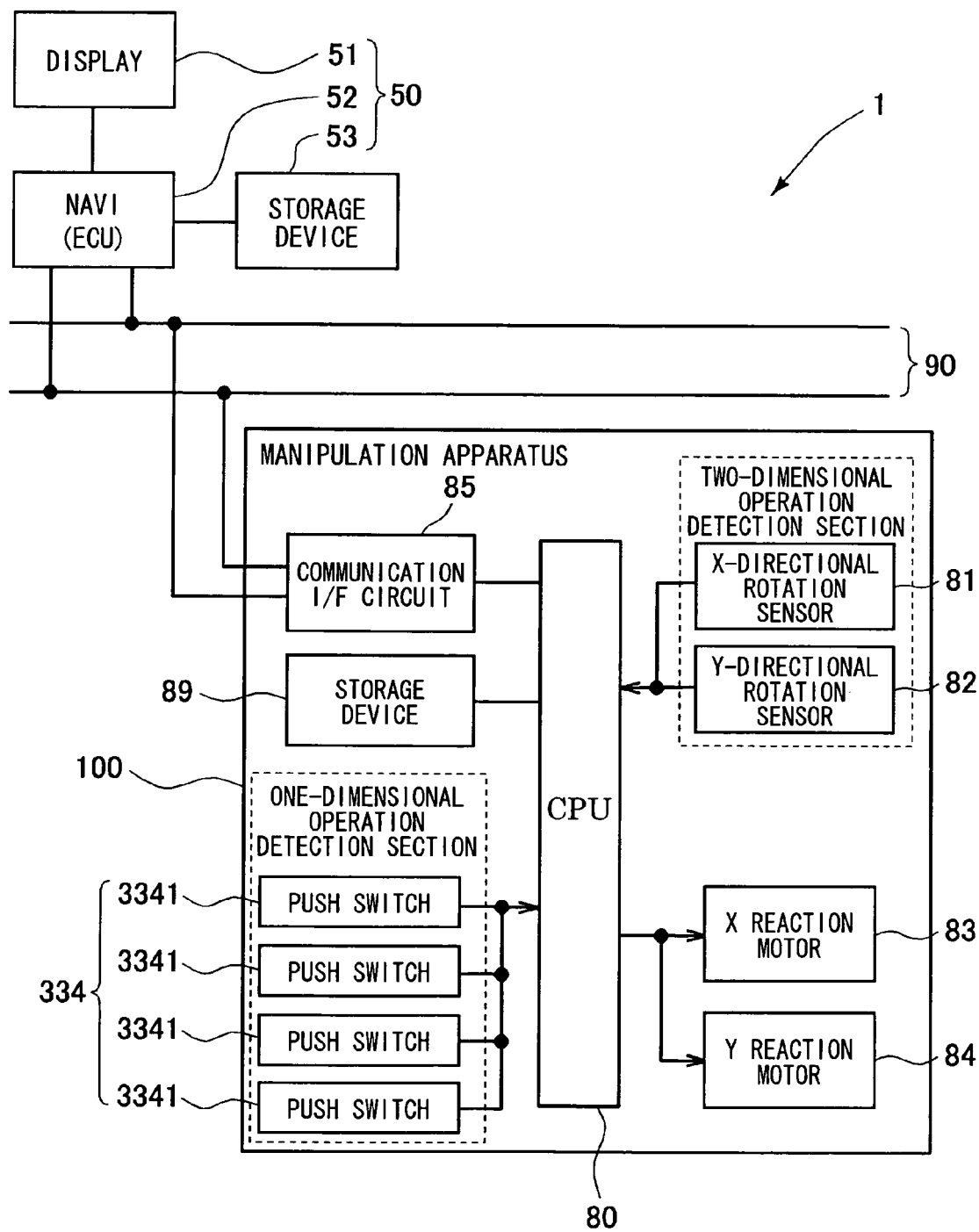
FIG. 27 It is a block diagram showing a general configuration concept of the manipulation apparatus of FIG. 23.

FIG. 23 is a perspective view showing an operational structure portion (body) of an in-vehicle manipulation apparatus of the third embodiment, FIG. 24 is an exploded perspective view of a movable operation section thereof, FIGS. 25A, 25B are section views along A-A in FIG. 23 (sections as those of FIGS. 5A, 5B), FIGS. 26A, 26B are section views along B-B in FIG. 23 (sections as those of FIGS. 6A, 6B), and FIG. 27 is a block diagram showing a general configuration concept of the manipulation apparatus of FIG. 23.

The in-vehicle manipulation apparatus 1C(1) of the third embodiment has a push-type operation section 300C as a one-dimensional operation section 300. The push-type operation section 300C has a push operation member 330 provided on an end surface 101*a* of a movable operation section 101 of a two-dimensional operation section 200. The push operation member 330 is set in one of forward and reverse directions of a beforehand determined one-dimensional display direction as a movement direction of a predetermined display object (for example, pointer image P or scroll image) displayed on a screen of the display 51, and the display object may be moved only in the set direction.

The operation object member 330 of the push-type operation section 300C of the embodiment is a disk-like member having a plurality of push operation surfaces 331*a* on a main surface of the member, and supported in a rocking-allowable manner by a rocking supporter 322, which is fixed on a board 240, and has a spherical upper-end, at the center on a back side of the member. When one operation surface 321*a* is operated, only a corresponding switch 334 is pressed and urged. In the embodiment, four push operation surfaces 334 are arranged in a cross form about the rocking supporter 322 on the disk-like member 320, and corresponding push switches (tact switches herein) 334 are provided respectively. Specifically, a first operation surface 331*a*1 and a first push switch 3341 move a predetermined display object displayed on the display 51 in a forward direction of one of one-dimensional display directions perpendicular to each other, and a second operation surface 331*a*3 and a second push switch 3343 move the display object in a direction opposite to the forward direction. A third operation surface 331*a*2 and a third push switch 3342 move the predetermined display object displayed on the display 51 in a forward direction of the other of the one-dimensional display directions perpendicular to each other, and a fourth operation surface 331*a*4 and a fourth push switch 3344 move the display object in a direction opposite to the forward direction.

[Fourth Embodiment]

A fourth embodiment is described using FIGS. 28 to 32.

Figure 28:
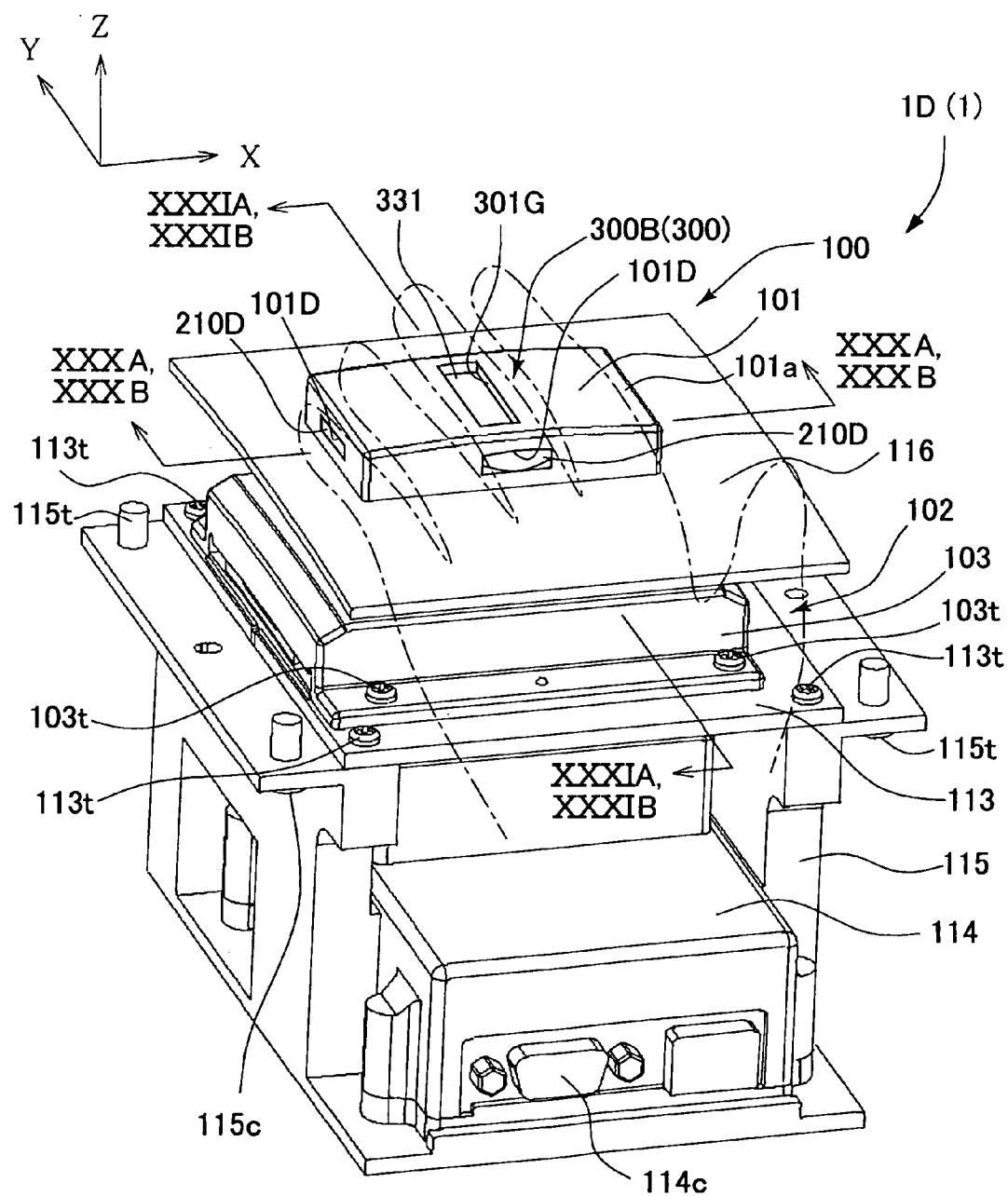
FIG. 28 It is an outside perspective view of a body of a manipulation apparatus of a fourth embodiment.
Figure 29:
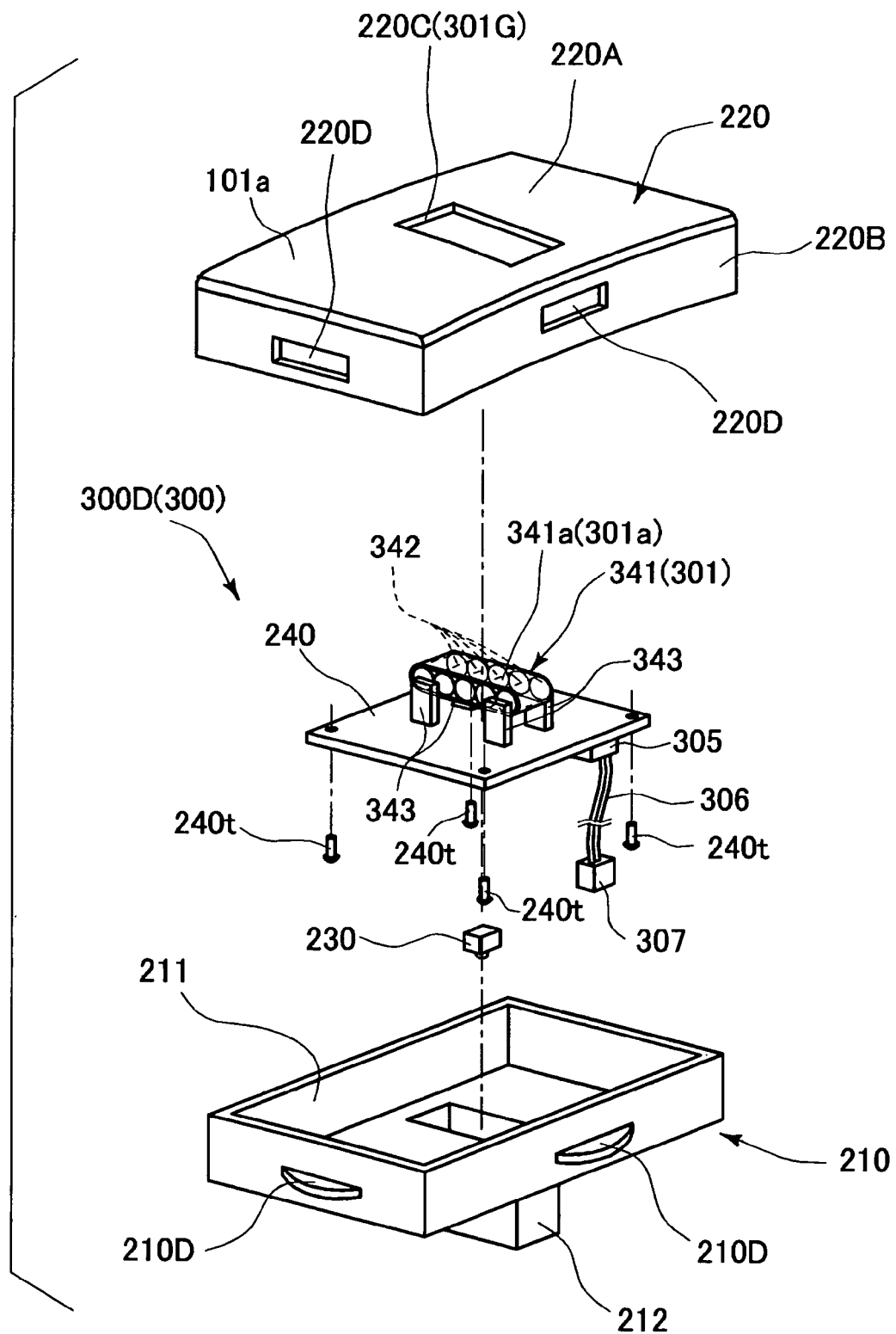
FIG. 29 It is an exploded perspective view of a movable operation section in FIG. 28.
Figure 30A:
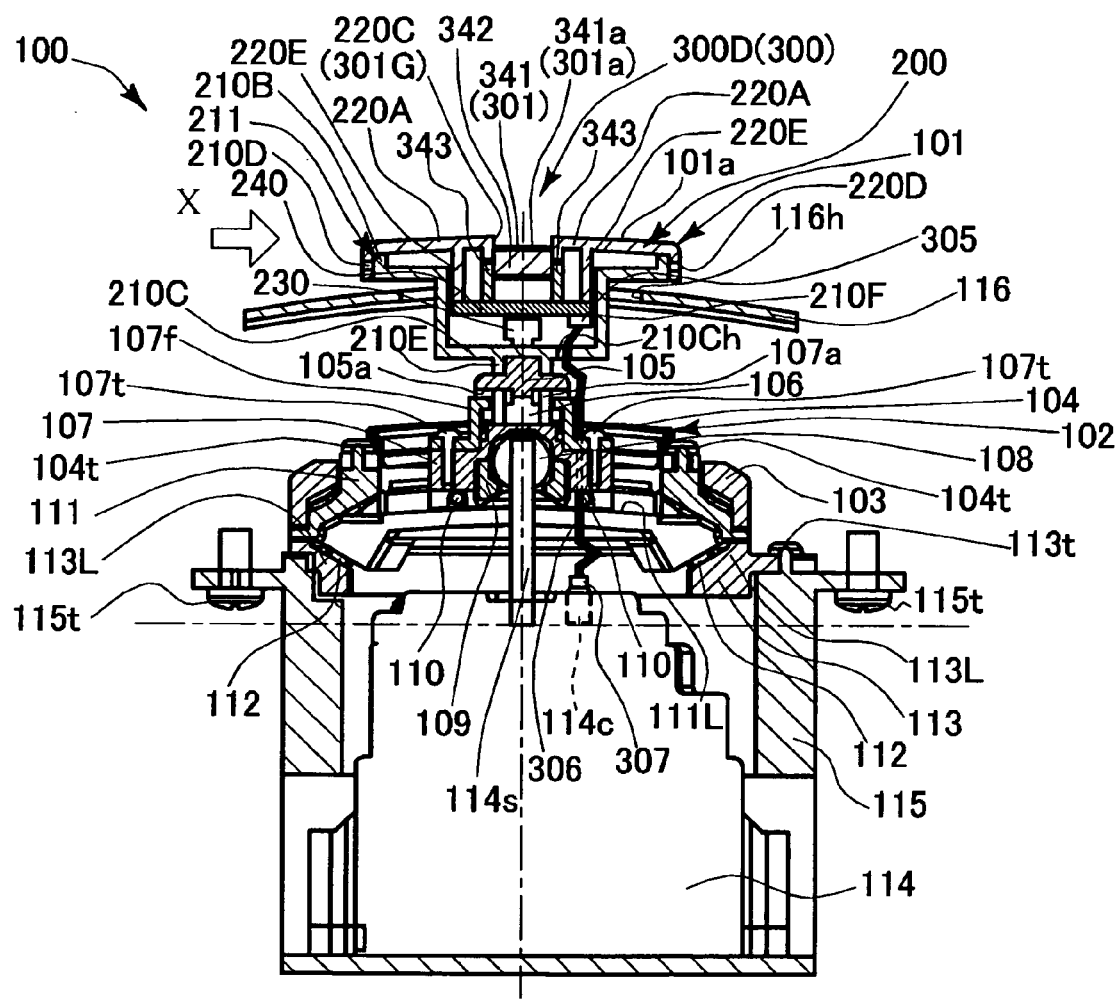
FIG. 30A It is a section view along XXXA-XXXA when a two-dimensional operation section is in a neutral state in FIG. 28.
Figure 30B:
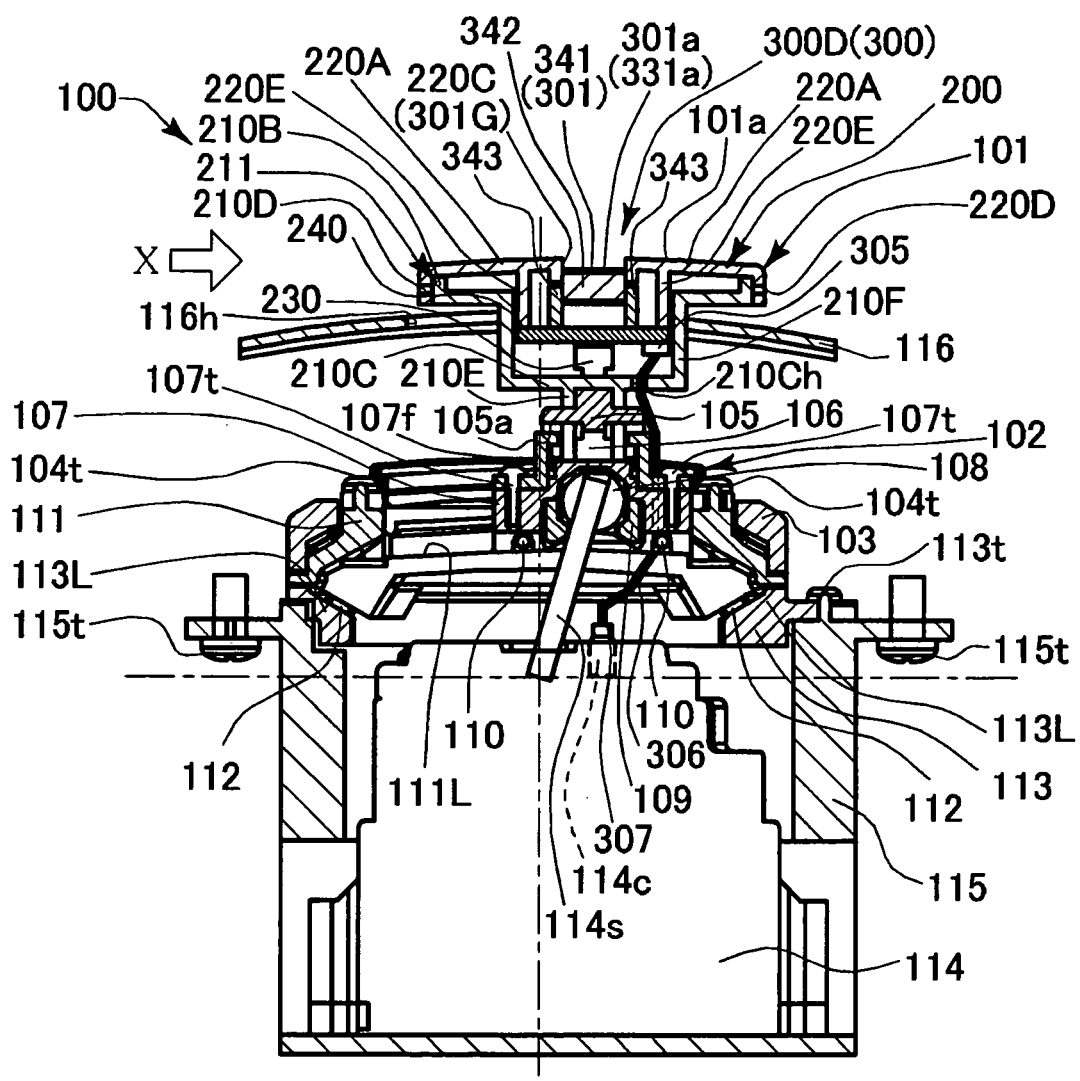
FIG. 30B It is a section view along XXXB-XXXB when the two-dimensional operation section is not in the neutral state in FIG. 28.
Figure 31A:
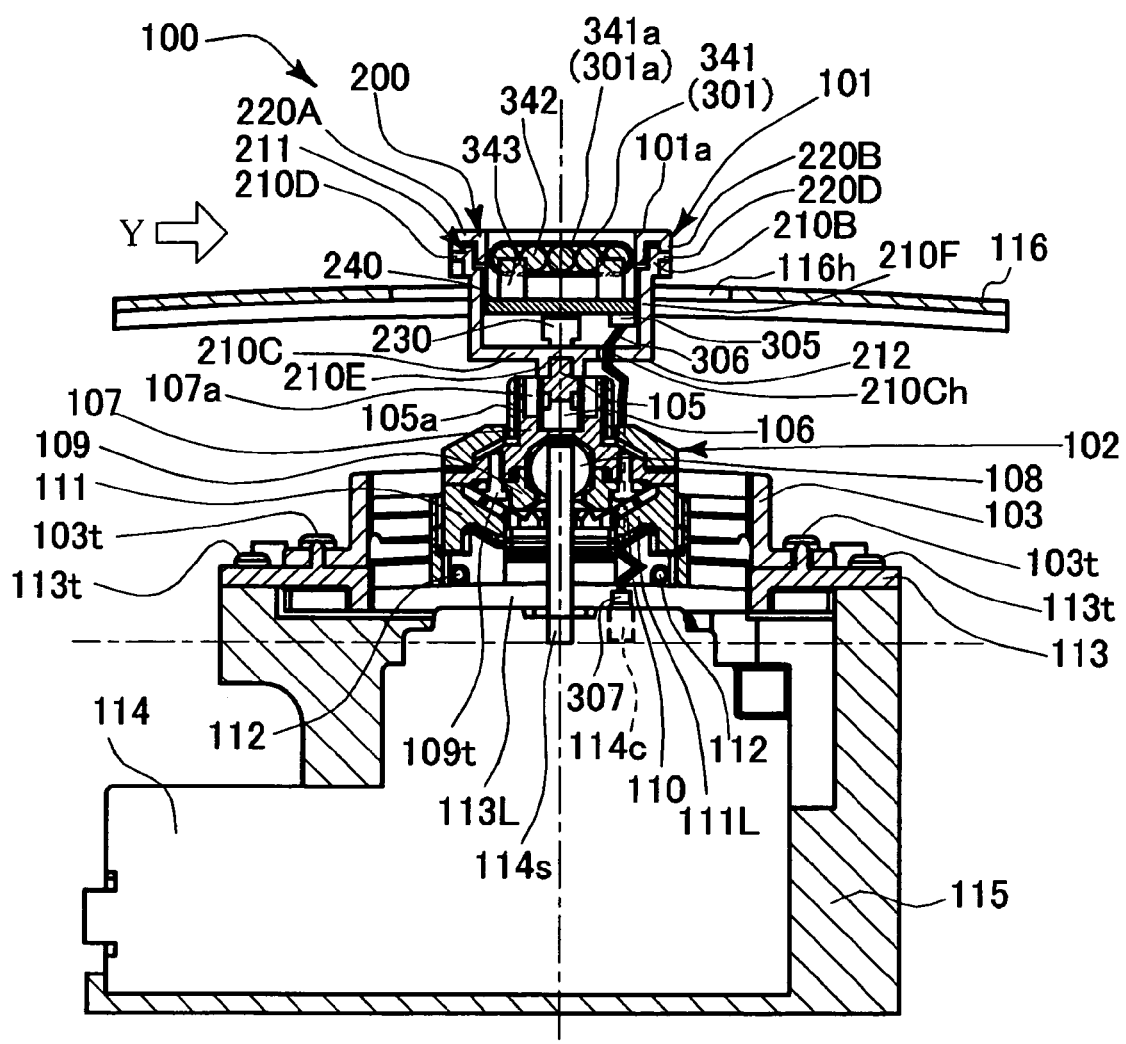
FIG. 31A It is a section view along XXXIA-XXXIA when the two-dimensional operation section is in the neutral state in FIG. 28.
Figure 31B:
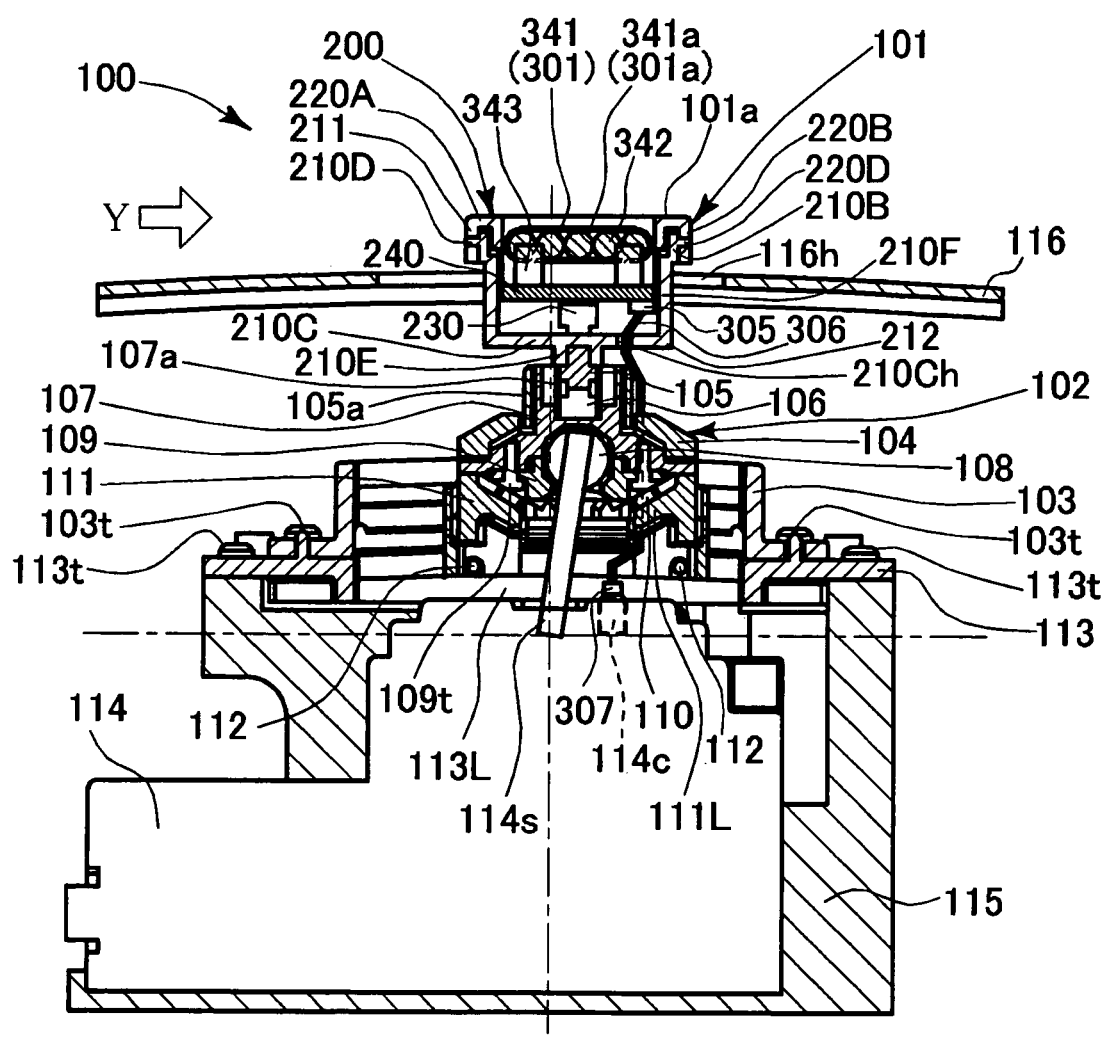
FIG. 31B It is a section view along XXXIB-XXXIB when the two-dimensional operation section is not in the neutral state in FIG. 28.

FIG. 28 is a perspective view showing an operational structure portion (body) of an in-vehicle manipulation apparatus of the fourth embodiment, FIG. 29 is an exploded perspective view of a movable operation section thereof, FIGS. 30A, 30B are section views along A-A in FIG. 28 (sections as those of FIGS. 5A, 5B), FIGS. 31A, 31B are section views along B-B in FIG. 28 (sections as those of FIGS. 6A, 6B), and FIG. 32 is a block diagram showing a general configuration concept of the manipulation apparatus of FIG. 28.

The in-vehicle manipulation apparatus 1D(1) of the fourth embodiment has a rotational operation section as in the described first embodiment, but is different in rotational orbit of the operation section from the first embodiment. In a rotational operation section 300D, an operation surface (exposed surface) of a rotational operation member 341 has a noncircular rotational orbit appearing as a plane parallel to the main surface 101*a* of the movable operation section 101. In the embodiment, the belt member 341 is disposed on the periphery of a plurality of bearing members 342 fixed to the movable operation section 101 in an enclosing manner. An exposed portion exposed on an upper-end side of the belt member 341 is set as the operation surface 341*a*, and the belt is operated in a rotational direction while pressing the operation surface 341*a*, thereby the belt member 341 moves in one of forward and reverse directions with respect to the rotational orbit. Displacement due to such movement is detected by a belt rotation sensor 344. The rotation sensor herein detects rotation of an outer ring (rotating ring) of each bearing 342 rotating with movement of the belt member 341, and the same detection method as that for the wheel rotation sensor may be used for the sensor.

In the embodiment, as in the first embodiment, a push switch 230 is pressed and urged through downward pressing operation of the rotational operation member 341. The rotational operation member 341 is supported by a board 240 and an operation cover 220 in a manner of being upward urged by urging means (not shown). The rotational operation member 341 is displaced downward against urging force of the urging means by such pressing operation, so that the push switch 230 is pressed and urged.

While a position specifying input section is provided in each of two-dimensional and one-dimensional operation sections 200 and 100 in the embodiment, the input section may be provided only in the one-dimensional operation section 100.

While only one operation surface of the one-dimensional operation section is formed on the main surface 101*a* of the movable operation section 101 in the embodiments except for FIG. 22, a plurality of operation surfaces may be formed. In such a case, a plurality of one-dimensional operation sections may be disposed such that one-dimensional operation directions are different from one another, and furthermore, may be set such that one-dimensional display directions corresponding to the one-dimensional operation directions are different from one another. A plurality of rotational operation sections 300A, 300D may be provided on the main surface 101*a* of the movable operation section 101, or different types of one-dimensional operation sections 300 may be provided on the main surface 101*a* of the movable operation section 101.

When two switches are provided for performing position specifying input in the described embodiments, for example, an operation stroke or an operation load may be differently set between the switches so as to prevent concurrent operation of them as shown in FIG. 38. However, one push switch 106 is pressed at a high possibility during operation of the two-dimensional operation section 200, and the other push switch 230 is pressed at a high possibility during operation of the one-dimensional operation section 300. That is, when position instruction operation is performed by the two-dimensional operation section 200, in the case that position specifying input is tried to be immediately performed at a currently indicating position, operation of pressing and urging the push switch 106 through push operation of directly pushing the movable operation section 101 may be promptly and accurately performed compared with pressing and urging the other push switch 230. In contrast, when position instruction operation is performed by the one-dimensional operation section 300, in the case that position specifying input is tried to be immediately performed at a currently indicating position, operation of pressing and urging the push switch 230 through push operation of directly pushing the operation surface 301a of the section 300 may be promptly and accurately performed compared with pressing and urging the other push switch 106.

Figure 39:
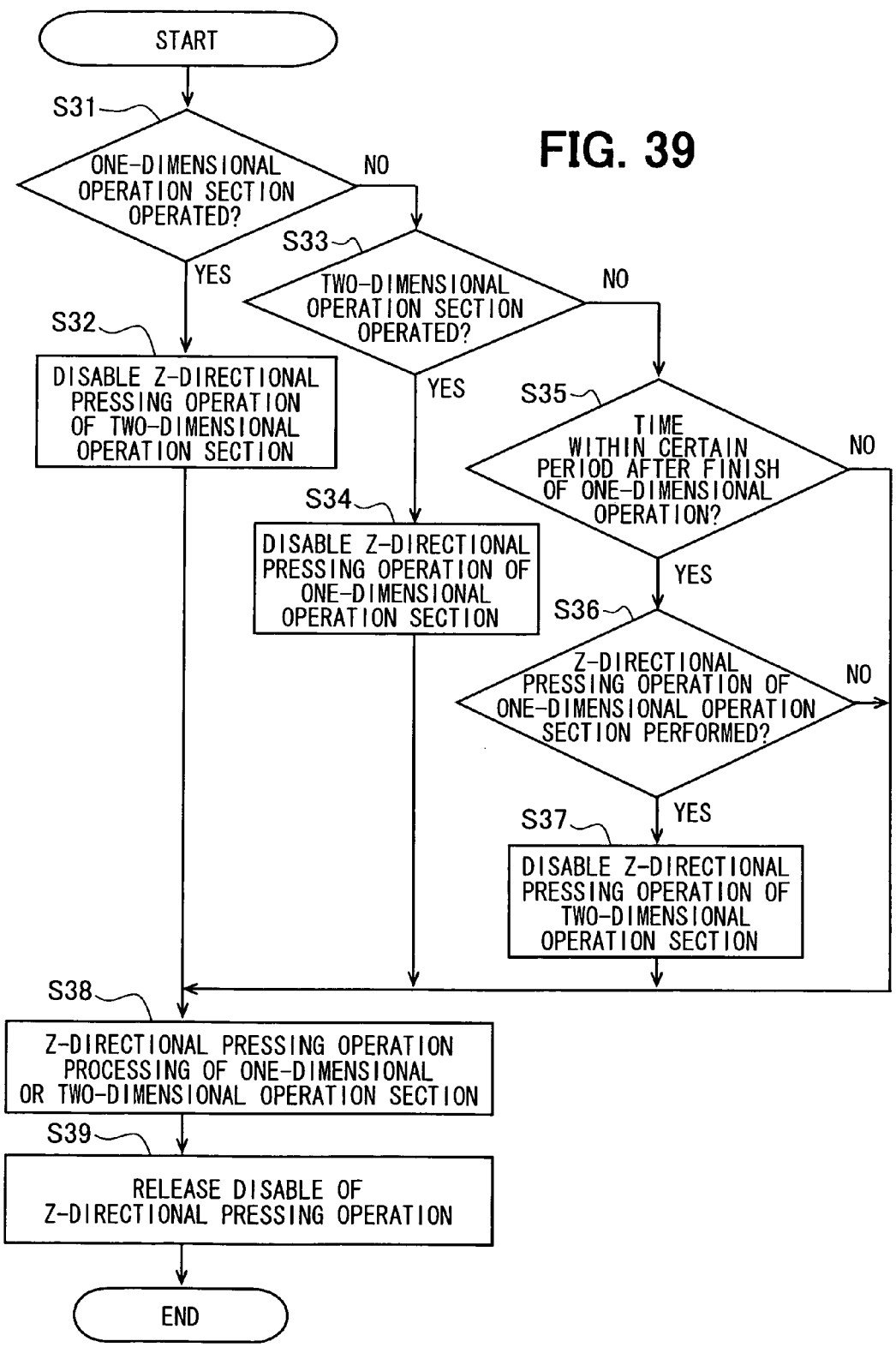
FIG. 39 It is a flowchart for illustrating an example of operation processing for preventing concurrent operation of push switches corresponding to a one-dimensional operation section and a two-dimensional operation section respectively.

Therefore, when the two-dimensional operation section 200 is operated, setting may be made such that pressing and urging of the push switch 106 corresponding to the section 200 is enabled, and pressing and urging of the push switch 230 corresponding to the one-dimensional operation section 300 is disabled. On the other hand, while the one-dimensional operation section 300 is operated, setting may be made such that pressing and urging of the push switch 230 corresponding to the section 300 is enabled, and pressing and urging of the push switch 106 corresponding to the two-dimensional operation section 200 is disabled. This results in a configuration where position instruction operation and position specifying input are performed by the same operation section, leading to simple operation. In addition, this may prevent such false operation that the two-dimensional operation section 200 is pressed by mistake in the Z direction during operating the one-dimensional operation section 300, or false operation that the one-dimensional operation section 300 is pressed by mistake in the Z direction during operating the two-dimensional operation section 200. More desirably, the following false operation may be prevented: when Z-directional operation is performed to the one-dimensional operation section 300, not only the corresponding push switch 230 is pressed and urged, but also the two-dimensional operation section 200 is pressed in the Z direction by excessive force, so that the other push switch 106 is also pressed and urged. Specifically, this may be achieved by performing Z-directional pressing operation processing as shown in FIG. 39.

In S31, the CPU 80 determines whether the one-dimensional operation section 300 is operated or not based on a detection result of the one-dimensional operation detection section. When it is determined that the section 300 is operated, advance is made to S32, and while pressing and urging of the push switch 230 corresponding to the section 300 is enabled, pressing and urging of the push switch 106 corresponding to the two-dimensional operation section 200 is disabled, and advance is made to S38 without any processing. Thus, even if the two-dimensional operation section 200 is pressed by mistake in the Z direction during operating the one-dimensional operation section 300, such pressing operation is disabled. On the other hand, when it is determined in S31 that the section 300 is not operated, advance is made to S33.

In S33, the CPU 80 determines whether the two-dimensional operation section 200 is operated or not based on a detection result of the two-dimensional operation detection section. When it is determined that the section 200 is operated, advance is made to S34, and while pressing and urging of the push switch 106 corresponding to the section 200 is enabled, pressing and urging of the push switch 230 corresponding to the one-dimensional operation section 300 is disabled, and advance is made to S38 without any processing. Thus, even if the one-dimensional operation section 300 is pressed by mistake in the Z direction during operating the two-dimensional operation section 200, such pressing operation is disabled. On the other hand, when it is determined in S33 that the section 200 is not operated, advance is made to S35.

In S35, the CPU 80 determines whether or not a beforehand determined period has passed since the one-dimensional operation section 300 is operated. Specifically, as the section 300 becomes nonoperative, time count is started by a timer function of the CPU 80, and whether a certain period has passed or not is determined from such a count value. Here, the certain period is determined to be, for example, 2 sec. When it is determined that the certain period has not passed, advance is made to S36, and whether or not Z-directional pressing operation is performed to the one-dimensional operation section 300 is determined. When Z-directional pressing operation is performed to the section 300, advance is made to S37, and while pressing and urging of the push switch 230 corresponding to the section 300 is enabled, pressing and urging of the push switch 106 corresponding to the two-dimensional operation section 200 is disabled, and advance is made to S38 without any processing. Thus, when Z-directional operation is performed to the one-dimensional operation section 300, even if the two-dimensional operation section 200 is also pressed in the Z direction by excessive force, such pressing operation to the section 200 is disabled. When it is determined in S35 that the certain period has passed, in the case that Z-directional pressing operation is determined to be not performed to the one-dimensional operation section 300 in S36, advance is made to S38 while pressing and urging of the push switches 230 and 106 corresponding to the one-dimensional and two-dimensional operation sections 300 and 200 are enabled respectively.

In S38, the CPU detects pressing and urging of the push switch 230 or 106 based on Z-directional pressing operation to the one-dimensional operation section 300 or the two-dimensional operation section 200. When such pressing and urging are detected, the CPU performs the following control based on whether the pressed and urged push switch 230 or 106 is set to be disabled: when the push switch is set to be disabled, the relevant pressing and urging are disabled, in contrast, when the push switch is set to be not disabled, the relevant pressing and urging are considered to be enabled, and corresponding control is performed.

In subsequent S39, all kinds of disabling setting are released, and then the processing is finished. Even after that, the processing is repeatedly performed with certain periods.

[Fifth Embodiment]

Figure 40:
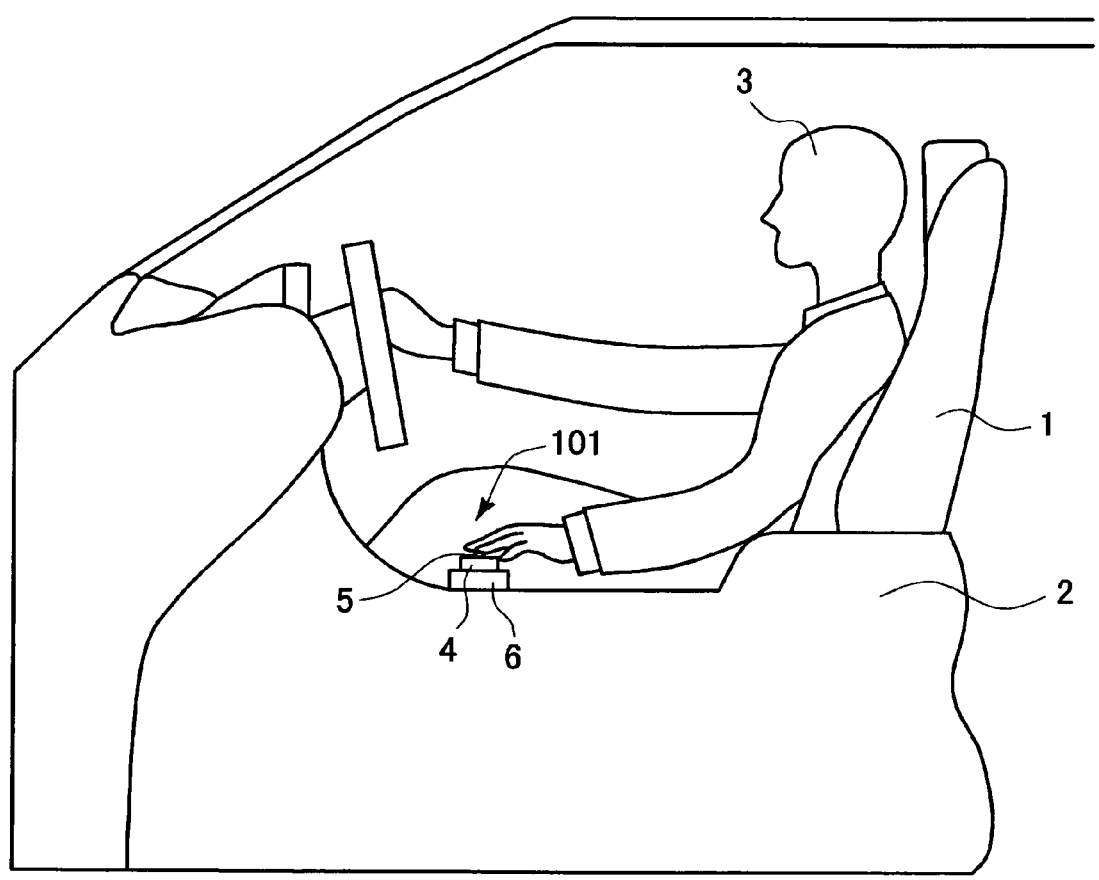
FIG. 40 It is a schematic view of an input apparatus 101 of a fifth embodiment mounted in a vehicle.
Figure 41:
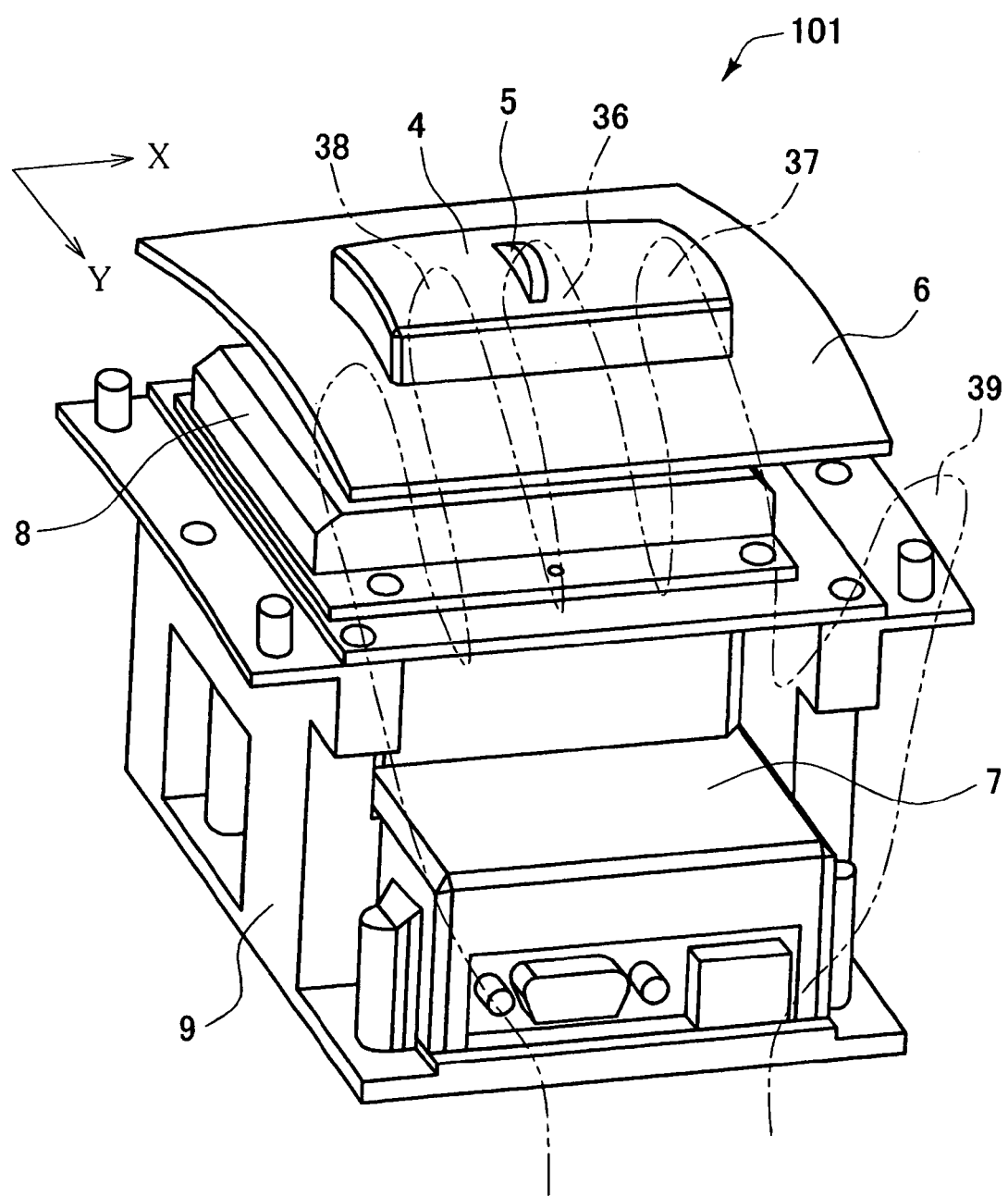
FIG. 41 It is a perspective view of the input apparatus 101.
Figure 42:
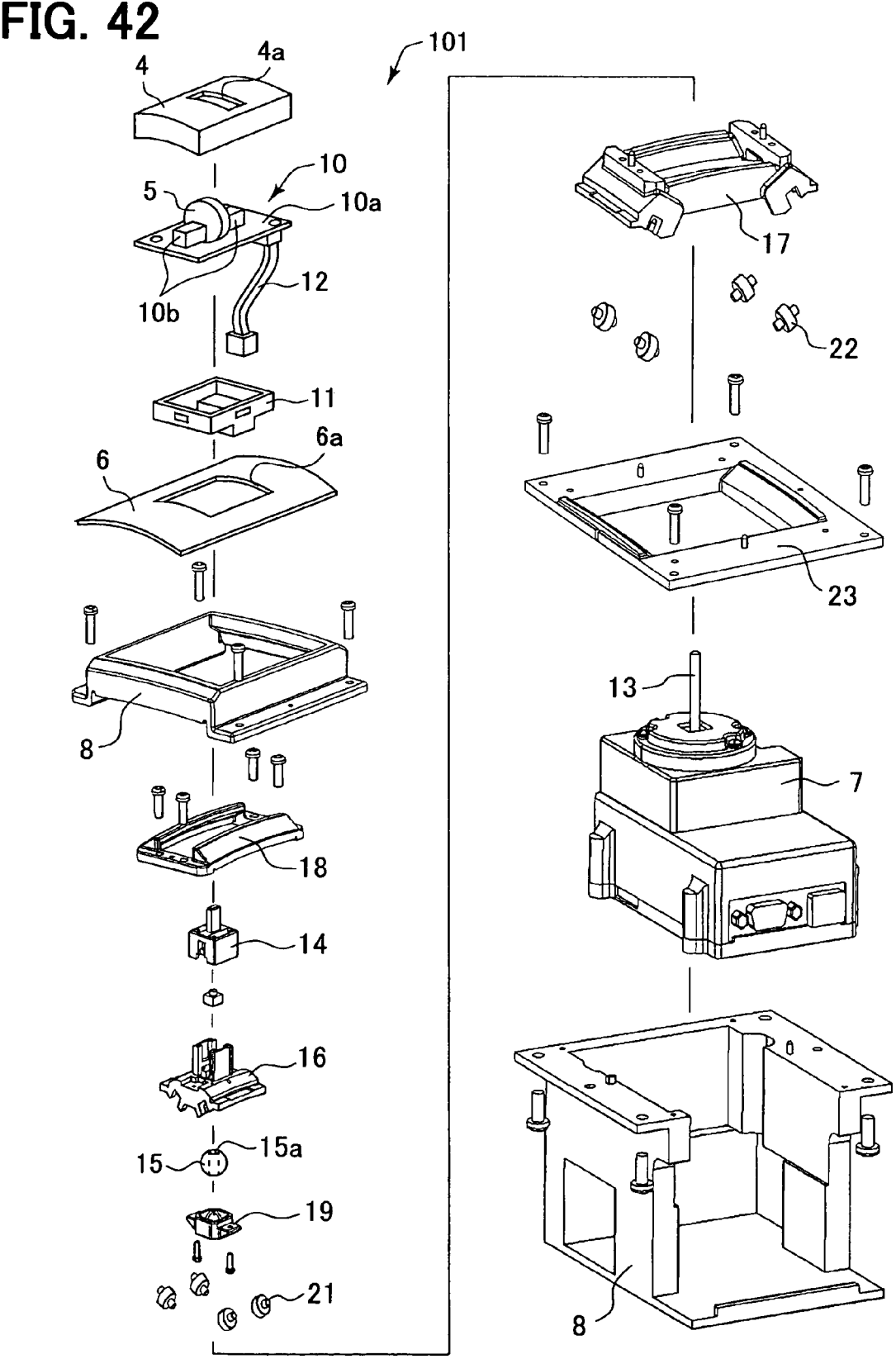
FIG. 42 It is an exploded perspective view of the input apparatus 101.
Figure 43:
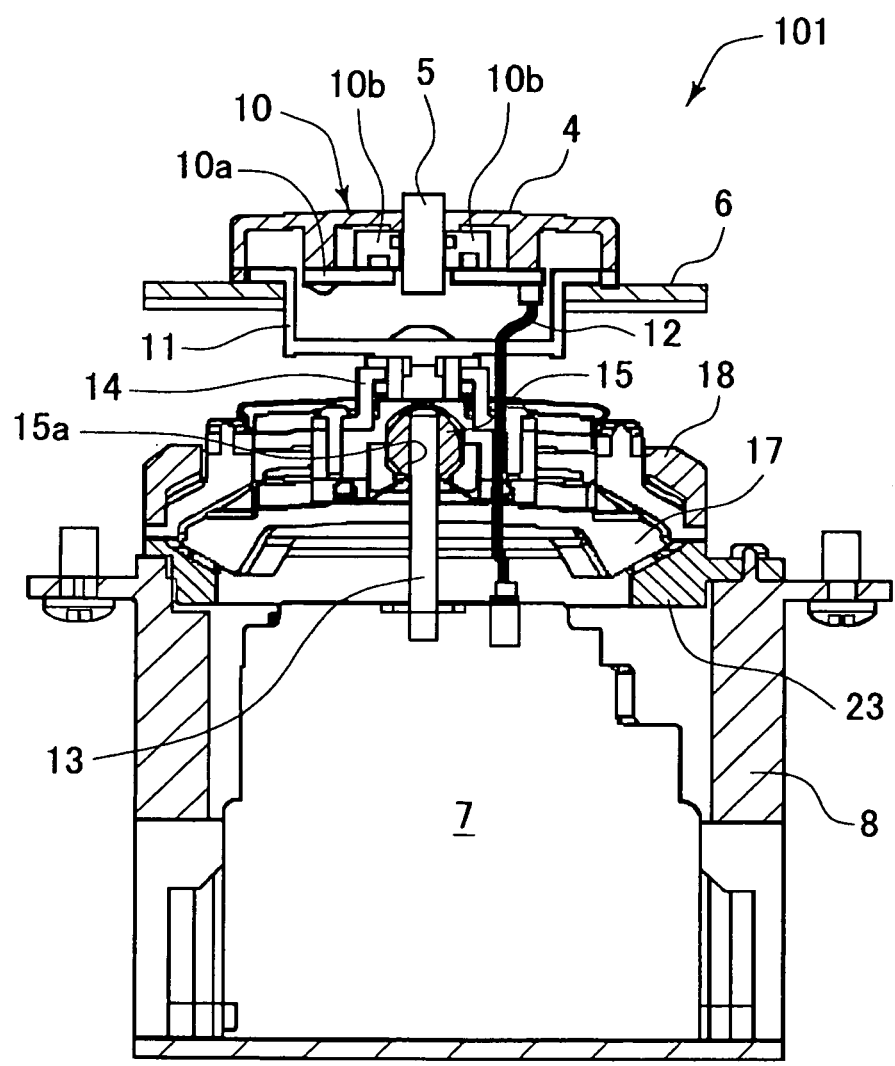
FIG. 43 It is a front section view of the input apparatus 101.

FIG. 40 is a schematic view of an input apparatus 101 of a fifth embodiment mounted in a vehicle, FIG. 41 is a perspective view of the input apparatus 101, FIG. 42 is an exploded perspective view of the input apparatus, and FIG. 43 is a front section view of the input apparatus.

First, the input apparatus 101 of the fifth embodiment is described. As shown in FIG. 40, the input apparatus 101 of the fifth embodiment is installed in a console box 2 provided next to a driver seat 1 of a vehicle. A driver 3 sit on the driver seat 1 operates the input apparatus with a left hand. A passenger (not shown) sit on a passenger seat may operate the input apparatus with a right hand.

As shown in FIG. 41, the input apparatus 101 has a commander 4 (first input device) operated by a finger of an operator (for example, the driver 3), a wheel 5 (second input device)

mounted on a top of the commander, a bezel 6 to be a base surface when the commander 4 is activated, and a joystick device 7 activating the commander 4. Such members are accommodated in vertically divided case bodies 8 and 9. The input apparatus 101 mounted in a vehicle is designed such that members (commander 4, wheel 5 and bezel 6) above an upper case body 8 are disposed projecting from the console box 2. The commander 4 freely moves on a top of the bezel 6 along an X direction (horizontal direction as viewed on a figure in FIG. 41) or along a Y direction (longitudinal direction perpendicular to the X direction).

Major members configuring the input apparatus 101 of the embodiment are described. As shown in FIG. 42, the commander 4 is a hollow block body having an approximately rectangular prism shape, and top and bottom portions thereof are slightly curved in the Y direction. A wheel module 10 rotatably assembled with the wheel 5 is mounted in a hollow portion of the commander 4. In a condition that the wheel module 10 is mounted in the commander 4 while being supported by a holder 11, an upper half of the wheel 5 projects from a through-hole 4a provided in a top of the commander 4. Thus, an operator may rotate only the wheel 5 without operating the commander 4. In this way, the wheel 5 is a part of the commander 4, and area of the wheel 5 in the commander 4 is smaller than area of the top of the commander 4. The amount of rotation of the wheel 5 is detected by a sensor 10b attached to the wheel module 10, and converted into output (for example, movement of a cursor shown on a display, or screen scroll) of an output device (for example, display of a car navigation device). In FIG. 42, 12 shows a cable for connecting the sensor 10b attached to the wheel module 10 to the joystick device 7.

A top of the bezel 6 is a curved surface slightly curved in the Y direction in correspondence to the bottom of the commander 4 (in other words, part of a cylindrical body). Therefore, the commander 4 may be smoothly moved in the X or Y direction with respect to the bezel 6. The bezel 6 is provided with a through-hole 6a for passing a shaft rod 13 (shat, described later) of the joystick device 7. The through-hole 6a is hidden by the commander 4 even if the commander 4 is maximally moved in the X or Y direction. Therefore, the through-hole is not viewed by an operator.

The shaft rod 13 projects upward from the joystick device 7. The shaft rod 13 is tiltable about a base end (in this case, lower end). The commander 4 is connected to the shaft rod 13 via a spherical ball bearing 15 accommodated in a stem 14 in a freely rollable manner. That is, the ball bearing 15 is provided with a through-hole 15a passing through an axis of the bearing, and the through-hole 15a is inserted with an end portion of the shaft rod 13. Since inner diameter of the through-hole 15a is slightly larger than outer diameter of the shaft rod 13, the shaft rod 13 may move through the through-hole 15a of the ball bearing 15 in an axial direction of the shaft. As the commander 4 moves in the X or Y direction, the shaft rod 13 tilts. Shift in position occurring at that time is absorbed by rolling of the ball bearing 15 within the stem 14, and by movement of the end portion of the shaft rod 13 through the through-hole 15a of the ball bearing 15. In FIG. 42, 16 shows an X-directional slider for guiding X-directional movement of the commander 4, 17 shows a Y-directional slider for guiding Y-directional movement thereof, 18 shows a Y-directional slider cover, 19 shows an X-directional slider cover, 21 and 22 show rollers, and 23 shows a base.

Figure 44:
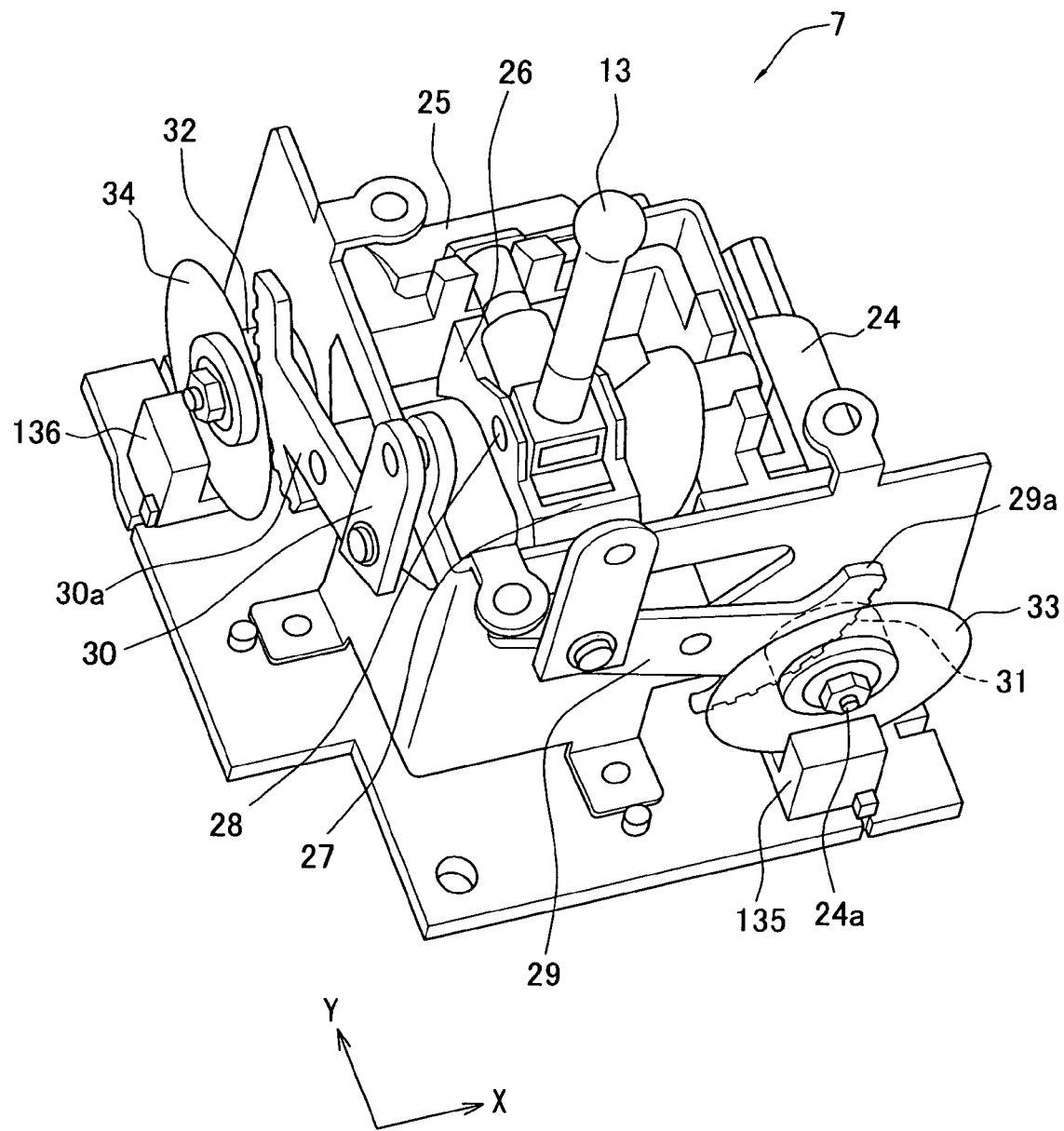
FIG. 44 It is a perspective view showing a configuration of a joystick device 7.

Next, the joystick device 7 is described. As shown in FIG. 44, the joystick device 7 is internally equipped with motors 24 and 25 corresponding to movement in the X and Y directions of the shaft rod 13 respectively. Levers 29 and 30 are mounted on support shafts 27 and 28 mounted on a supporter 26 supporting the shaft rod 13 when the rod 13 is tilted in the X or Y direction, and tooth portions 29a and 30a cut on fan-shaped end portions of the levers 29 and 30 engage with corresponding pinions 31 and 32 mounted on motor shafts 24a and 25a of the motors 24 and 25 respectively. Thus, rotational force of the motor shafts 24a and 25a of the motors 24 and 25 is transmitted as reaction force of the shaft rod 13 to rotation of the support shafts 26 and 27 via the pinions 31 and 32 and the levers 29 and 30. That is, when an operator moves the commander 4 to tilt the shaft rod 13, reaction force from each of the motors 24 and 25 is given to the operator.

Figure 45:
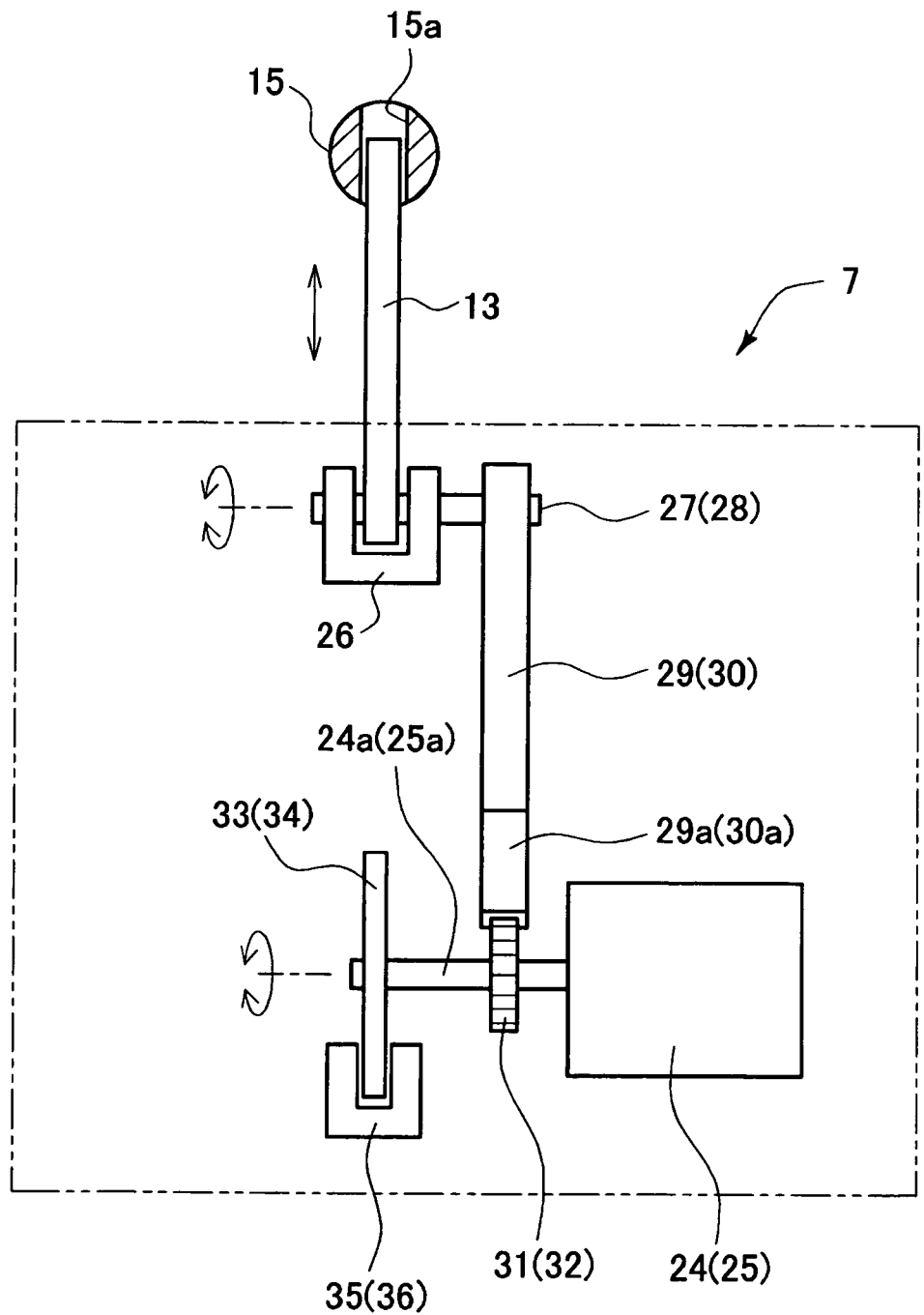
FIG. 45 It is a schematic view of an operation system from a shaft rod 13 to a motor 24.

The motor shafts 24a and 25a of the motors 24 and 25 are mounted with disk-like slit plates 33 and 34 respectively as shown in FIGS. 44 and 45. Each of the slit plates 33 and 34 is inserted between each of optical rotation detection sensors 135 and 136 (FIG. 44). Thus, rotational frequency of each of the motor shafts 24a and 25a is detected.

The motors 24 and 25 are provided with holding means for temporarily locking the motor shafts 24a and 25a of the motors so that the motor shafts are forcibly hard to be rotated, respectively. For example, the holding means applies a lock current to the motor 24 or 25, and thus electrically lock the motor shaft 24a or 25a to be hardly rotated. This makes it difficult to move the commander 4 in the X or Y direction. Since the motor shaft 24a or 25a is electrically locked, configuration of the holding means is simplified. However, it is also acceptable that a disk plate (not shown) is mounted on each of the motor shafts 24a and 25a, and the disk plate is pressed by a caliper, or each of the motor shafts 24a and 25a is clamped by an electromagnet (not shown) so as to mechanically lock each motor shaft. The holding means starts operation with an action, as a trigger, that an operator puts a finger on the wheel 5 to rotate the wheel 5. When a timer (not shown) detects that a predetermined time has passed since rotation of the wheel 5 is finished, the holding means is released.

Figure 46:
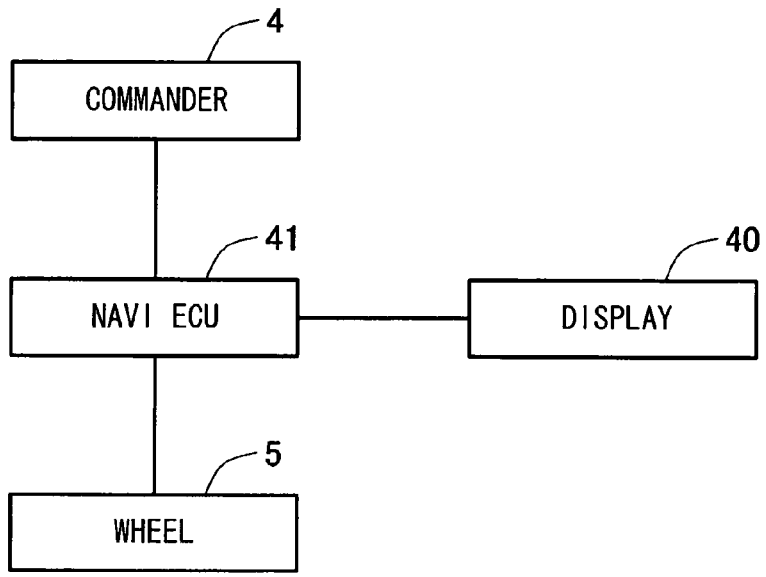
FIG. 46 It is a block diagram of the input apparatus 101.

FIG. 46 shows a block diagram of the input apparatus 101 of the embodiment. The input apparatus 101 of the embodiment, for example, moves (commander 4) a cursor (not shown) shown on a display 40 (output device) of a car navigation device, or scrolls a screen (wheel 5). When a sensor (sensor 35 or 36 for commander 4, or sensor 10b for wheel 5) detects that the commander 4 or the wheel 5 is operated, such information is transmitted to NAVI ECU 41. The NAVI ECU 41 transmits operation information of the commander 4 or the wheel 5 to the display 40, and motion of the commander 4 or the wheel 5 is displayed on the display 40.

Operation of the input apparatus 101 of the fifth embodiment is described. As shown in FIG. 40, when an operator desires to move the commander 4, the operator moves the commander in the X or Y direction while putting fingers on the whole of the commander 4. Since a finger of the operator is typically not put on the wheel 5, possibility that the wheel 5 is rotated by mistake while the commander 4 is moved is low.

As shown in FIG. 41, when an operator intends to rotate only the wheel 5, the operator puts one finger (for example, the middle finger 36) on an upper end of the wheel 5, and places other fingers (the index finger 37 and the ring finger 38) on a top of the commander 4, and performs rotational operation of the wheel 5 only using the middle finger 36 put on the wheel 5. At that time, the index finger 37 and the ring finger 38 have a function of supporting rotation of the wheel 5 using the middle finger 36. Therefore, excessive force is applied even to the index finger 37 and the ring finger 38 depending on a level of force applied to the middle finger 36, leading to a possibility that the commander 4 is moved by mistake.

To prevent the false operation, the input apparatus 101 of the fifth embodiment performs such control that the NAVI ECU 41 allows the motor 24 and 25 internally equipped in the joystick device 7 to activate the holding means with rotation start of the wheel 5 by an operator as a trigger, so that the motor shafts 24a and 25a of the motors are temporarily locked, and thereby the shaft rod 13 is prevented from tilting. Thus, since the commander 4 is prevented from moving in the X or Y direction (lock state), the operator may concentrate on only operation (in this case, rotation) of the wheel 5.

The same is true in the case that the middle finger 36 and the thumb 39 are used to support the commander 4, and the index finger 37 is used to operate the wheel 5.

When a certain time has passed since the operator finished operation of the wheel 5, the holding means of each of the motors 24 and 25 is released, and the commander 4 may be thus moved.

Figure 47:
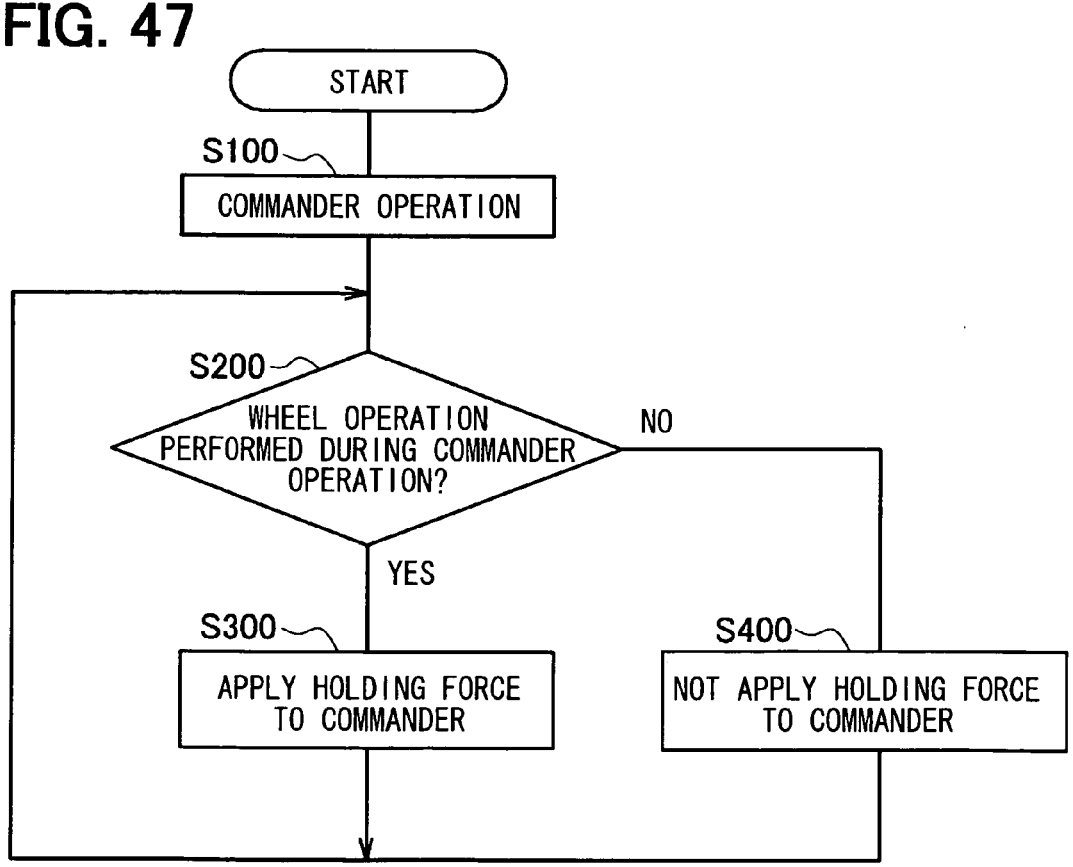
FIG. 47 It is a flowchart showing operation of the input apparatus 101.

The operation is described with reference to a flowchart of FIG. 47 as follows. That is, while an operator operates the commander 4 (step S100), when the wheel 5 is operated ("performed" in step S200), holding force is applied to the commander 4 to stably operate the wheel 5 (step S300). Thus, since the commander 4 is locked, the operator may concentrate on only operation of the wheel 5. When operation of the wheel 5 is not performed during operating the commander 4 ("not performed" in step S200), it will be appreciated that holding force is not applied to the commander 4 (step S400).

Figure 48:
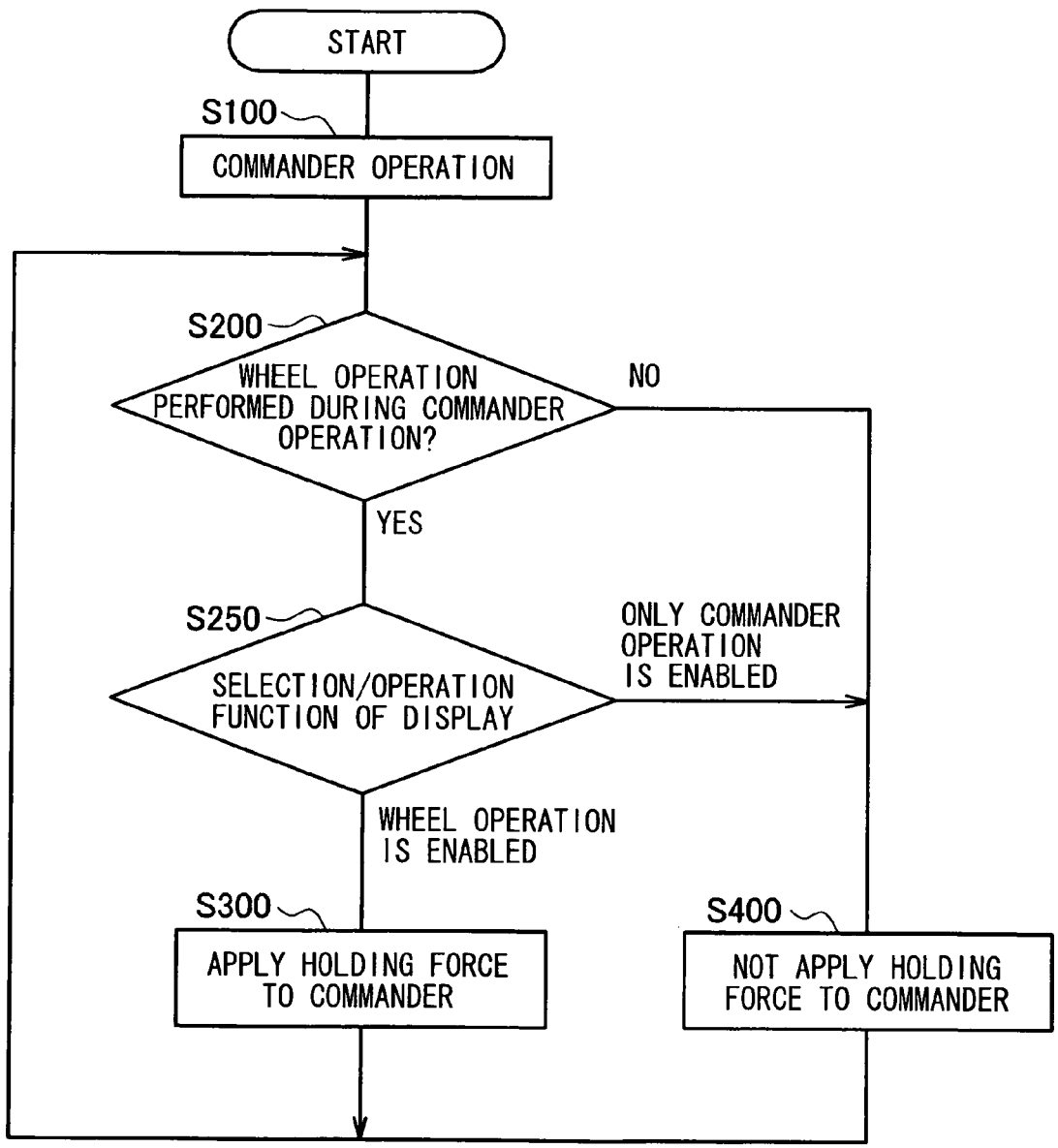
FIG. 48 It is a flowchart showing other operation of the input apparatus 101.

Next, description is made on a case where while the commander 4 is operated by the input apparatus 101 of the fifth embodiment, the wheel 5 is intentionally operated, or unintentionally operated by mistake. As described before, when operation of the commander 4 is temporarily locked during operating the wheel 5, even in the case that the wheel 5 is operated by mistake during operating the commander 4, operation of the commander 4 may be locked. Therefore, when the commander 4 is operated, it is desirable to perform determination on whether the commander 4 is locked or not depending on a state of a selection/operation function of the display 40. Operation in such a case is described with reference to a flowchart shown in FIG. 48.

While an operator operates the commander 4 (step S100), when the operator performs operation of the wheel 5 ("performed" in step S200), the selection/operation function of the display 40 is determined (step S250). The "selection/operation function of the display 40" refers to operation of moving a cursor to a button or an icon shown on the display 40, operation of scrolling a screen and the like. The "operation of the wheel 5" includes both of a case where an operator intentionally operates the wheel 5, and a case where the operator unintentionally operates the wheel 5 by mistake. If operation of the wheel 5 is enabled in the selection/operation function of the display 40 ("operation of wheel is enabled" in step S250), it is determined that the operator intentionally operates the wheel 5, and holding force is applied to the commander 4 (step S300). Thus, since operation of the commander 4 is forcibly stopped, the operator may perform operation of the wheel 5 without concerning a possibility of operating the commander 4 by mistake. The case that "operation of wheel is enabled" is supposed to be one of a case where the selection/operation function of the display 40 is performed only by the wheel 5, and a case where the function is performed by both the commander 4 and the wheel 5. The holding force applied to the commander 4 is released after certain time has passed (for example, 2 sec).

When only operation of the commander 4 is enabled in the selection/operation function of the display 40 (in other words, operation of the wheel 5 is disabled) ("only operation of commander is enabled" in step S250), even if the operator operates the wheel 5 for some reason, holding force is not applied to the commander 4 (step S400). Thus, the operator may continuously operate the commander 4, and even if the operator operates the wheel 5 by mistake, false operation does not occur.

When operation of the wheel 5 is not performed during operating the commander 4 ("not performed" in step S200), or when only operation of the commander 4 is enabled in the selection/operation function of the display 40 ("only operation of commander is enabled" in step S250), it will be appreciated that holding force is not applied to the commander 4 (step S400).

[Sixth Embodiment]

Figure 49:
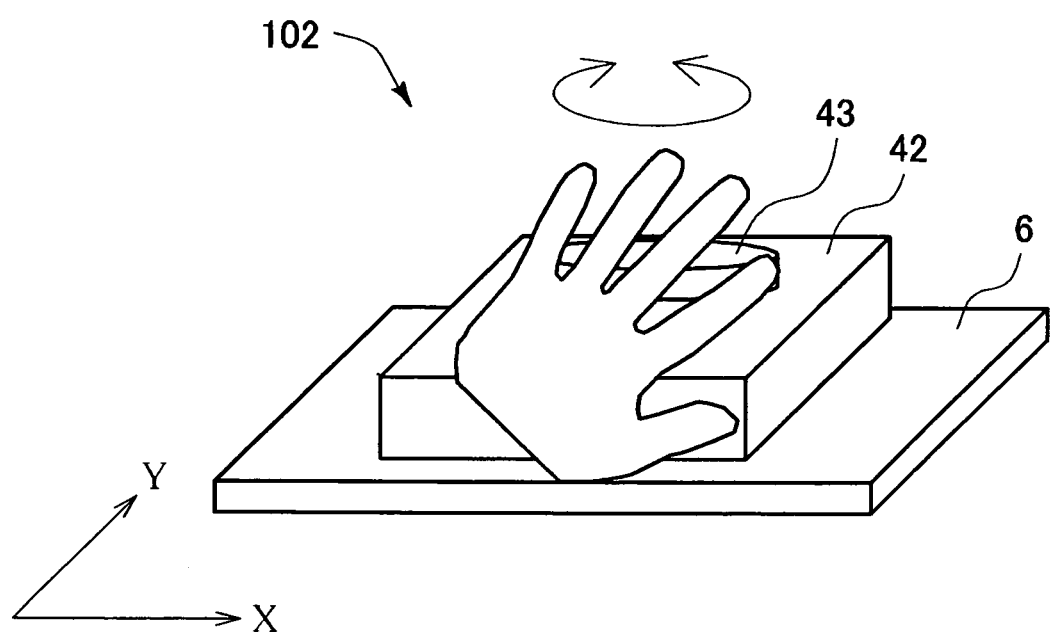
FIG. 49 It is a perspective view of an input apparatus 102 of a sixth embodiment.

Next, an input apparatus 102 of a sixth embodiment is described. As shown in FIG. 49, the input apparatus 102 of the sixth embodiment is provided with a dial 43 on a top of a commander 42. An operator rotates the dial 43 in a horizontal plane, thereby some input is performed. Even in the case of the input apparatus 102 of the sixth embodiment, when an operator operates the dial 43, the commander 42 is prevented from moving in an X or Y direction as in the input apparatus 101 of the fifth embodiment. Consequently, the operator may concentrate on operation of the dial 43 without concerning moving the commander 42 by mistake.

As in the input apparatus 101 and 102 of the fifth and sixth embodiments, the first input device (commander 4, 42) and the second input device (wheel 5 or dial 43) may be different in operation, or may be similar in operation.

Furthermore, the second input device may be, for example, a capacitance-type touch panel. In this case, even when a fingertip is moved in the X or Y direction while the fingertip is contacted to a surface of the touch panel so that an icon or a button shown on a display is operated, the commander 4 being the first input device may be prevented from moving in the X or Y direction. That is, the fifth or sixth embodiment may be combined with the touch panel of one of the first to fourth embodiments.

Industrial Applicability

The invention may be used for an input apparatus (for example, input apparatus of car navigation or the like) mounted in a vehicle.

As described above, a first in-vehicle manipulation apparatus, which is mounted in an operable position for a user sitting on a seat, is characterized by having a two-dimensional operation section having a stick-shaped rocking shaft having an operation knob formed at an end of the shaft, wherein the operation knob is operated within a predetermined two-dimensional operation surface determined as an operation range such that a rocking axis of the rocking shaft tilts from a beforehand determined, neutral angular position to a direction corresponding to an instructed position, and a one-dimensional operation section that has an operation surface exposed in a main surface of the operation knob, the main surface being an end surface of the rocking shaft, and may be operated in a predetermined one-dimensional operation direction determined within the two-dimensional operation surface relative to the operation surface.

The first configuration may further have a display device disposed in a screen-viewable manner for the user, two-dimensional operation control means for two-dimensionally moving, on a screen of the display device, a predetermined display object being displayed on the screen based on operation to the two-dimensional operation section, and one-dimensional operation control means for performing, based on the operation to the one-dimensional operation section, at least one of display movement control of moving, on the screen of the display device, a predetermined display object being displayed on the screen in a predetermined one-dimensional display direction corresponding to the one-dimensional operation direction along which operation is performed, and control content change control of sequentially changing a plurality of control contents beforehand determined in changing order into a direction corresponding to the one-dimensional operation direction, along which operation is performed, between forward and reverse directions of the changing order.

A second in-vehicle manipulation apparatus, which is mounted in an operable position for a user sitting on a seat, is characterized by having a display device disposed in a screen-viewable manner for the user, a two-dimensional operation section having a stick-shaped rocking shaft having an operation knob formed at an end of the shaft, wherein the operation knob is operated within a predetermined two-dimensional operation surface determined as an operation range such that a rocking axis of the rocking shaft tilts from a beforehand determined, neutral angular position to a direction corresponding to a direction along which the display object is to move on the screen, a one-dimensional operation section that has an operation surface exposed in a main surface of the operation knob, the main surface being an end surface of the rocking shaft, and may be operated in a predetermined one-dimensional operation direction relative to the operation surface, two-dimensional operation control means for two-dimensionally moving, on the screen of the display device, a predetermined display object being displayed on the screen based on operation to the two-dimensional operation section, and one-dimensional operation control means for performing, based on the operation to the one-dimensional operation section, at least one of display movement control of moving, on the screen of the display device, a predetermined display object being displayed on the screen in a predetermined one-dimensional display direction corresponding to the one-dimensional operation direction along which operation is performed, and control content change control of sequentially changing a plurality of control contents beforehand determined in changing order into a direction corresponding to the one-dimensional operation direction, along which operation is performed, between forward and reverse directions of the changing order.

According to the configuration, the two-dimensional operation section having the stick-type operation member having an end held by a user is provided with the one-dimensional operation section that may be operated by a finger of a hand holding the operation member on an end surface (top) of the stick-type operation member held by the hand of the user. Fine operation may be performed by the one-dimensional operation section compared with the stick-type operation member operated by a finger of a hand, and fine correction of an indicating position may be thus performed using the one-dimensional operation section while performing position instruction operation by the two-dimensional operation section. Since operation of the one-dimensional operation section is performed only in the predetermined one-dimensional operation direction, operation input is not performed in another direction.

For example, in the case that the in-vehicle manipulation apparatus is used to move a display object such as pointer image, when operation is performed to the one-dimensional operation section, the display object moves only in the one-dimensional display direction within a screen (for example, one-dimensional linear direction) corresponding to the one-dimensional operation direction along which operation is performed. That is, since the display object moves along the one-dimensional display direction, the object may not move in a direction deviated from the relevant direction. Therefore, operation to the one-dimensional operation section can be performed only caring about the amount of the operation, and thus moving displacement of a pointer image may be adjusted.

Since the one-dimensional display direction on a screen is determined on a two-dimensional plane being the screen, the one-dimensional operation direction of the one-dimensional operation section is beforehand determined on the two-dimensional operation surface of the two-dimensional operation section, and thus a correspondence relationship between both the directions is easily recognized. Since a vehicle passenger basically sits on a seat in a manner of facing the vehicle front, a screen of a display device is disposed facing the vehicle rear as a two-dimensional display surface extending in a vehicle vertical direction and in a vehicle lateral direction (sometimes, the screen is further disposed in a form of an inclined figure where a screen upper-end side is located on a vehicle front side compared with a screen lower-end side). In this case, the two-dimensional operation surface of the two-dimensional operation section is determined in a two-dimensional plane extending in a vehicle longitudinal direction and the vehicle lateral direction (that is, the two-dimensional operation section is disposed as an operation section that may be obliquely displaced in longitudinal and horizontal directions of a vehicle), and a vehicle vertical direction on a screen is allowed to be corresponding to a vehicle longitudinal direction on the two-dimensional operation surface, and a vehicle lateral direction on the screen is allowed to be still corresponding to a vehicle lateral direction on the two-dimensional operation surface, thereby a relationship between an operation direction and a display direction is instinctively easily understood. In such a case, the one-dimensional operation direction determined on the two-dimensional operation surface of the two-dimensional operation section, and the one-dimensional display direction determined on the two-dimensional display surface of the screen are set in a manner of reflecting the correspondence relationship between the two-dimensional operation surface and the two-dimensional display surface, thereby a direction of movement of a display object due to operation in the one-dimensional operation direction is also instinctively easily understood.

When the in-vehicle manipulation apparatus is used to perform operation of sequentially changing control contents, for example, when volume adjustment is performed, a volume adjustment direction includes two directions of "increase" and "decrease". Therefore, when the two directions are allowed to be corresponding to forward and reverse, two directions of the one-dimensional operation direction of the one-dimensional operation section, a volume adjustment direction may be determined depending on an operation direction, so that adjustment is facilitated.

A display object may be a scroll image where part of an image is displayed within a certain display area determined on a screen of the display device, and residual portions of the image may be displayed by scrolling. In this case, the one-dimensional operation section may perform operation of scroll-moving a scroll image being displayed on a screen of the display device (display object) within the screen in the one-dimensional display direction corresponding to the one-dimensional operation direction. One-dimensional operation to the one-dimensional operation section is applied to scroll operation, thereby scroll display may be easily performed.

A display object may be a pointer image that may move to an optional position on a screen of the display device. In this case, the one-dimensional operation section may perform operation of moving a position of a pointer image (display object) within the relevant screen, the pointer image being displayed on a screen of the display device in the one-dimensional display direction corresponding to the one-dimensional operation direction. Thus, position instruction operation using a pointer image may be performed not only by the two-dimensional operation section, but also by the one-dimensional operation section, and besides, movement of the pointer image by the one-dimensional operation section is limited to movement in a determined direction (one-dimensional display direction) within a screen, and therefore motion in another direction does not occur, and an indicating position is thus easily adjusted, and consequently fine adjustment may be performed.

In this case, the one-dimensional display direction is specified along a straight line, thereby movement adjustment of a pointer image may be more easily performed. Particularly, since a display screen typically has a rectangular shape, for example, when the one-dimensional operation direction of the one-dimensional operation section is determined as a longitudinal direction of a screen, operation without lateral shift may be performed, leading to easy alignment. Since finer position adjustment operation tends to be required in a direction being narrower in screen width, the one-dimensional display direction is specified to be a direction being narrower in screen width, and operation is thus facilitated.

A display object may be a pointer image that sequentially moves on a plurality of predetermined operation images displayed on a screen of the display device. In this case, a predetermined movement order determined for a plurality of operation images may be allowed to be corresponding to the one-dimensional operation direction. For example, in the case of Japanese Syllabary input screen, a "row a" is sequentially displayed in a longitudinal direction, and a "row ka" is sequentially displayed next to the left of the "row a", and similarly other rows are sequentially displayed. Therefore, it may be determined that the so-called "a-i-u-e-o order" of "a-i-u-e-o-ka-ki-ku-ke ●●●" is allowed to be corresponding to the one-dimensional operation direction so that the pointer image is sequentially moved on the operation images according to the "a-i-u-e-o order". Thus, the pointer image may move in one of forward and reverse directions in an order determined in such a manner that the pointer image advances downward on the "row a", and in turn advances to the upper left "ka", and advances downward on the "row ka". Since the order is determined, a user can perform operation of moving the pointer image to an indicating position desired by the user itself, leading to easy operation.

The one-dimensional operation section is a rotational operation section having a rotational operation member that may be rotationally operated in both forward and reverse directions around a predetermined rotational axis perpendicular to a rocking axis of the two-dimensional operation section, which may be designed such that an exposed surface exposed from a main surface of an operation knob in an outer circumferential surface of the rotational operation member is determined as an operation surface, and rotational feed operation and rotational back operation to the operation surface, which are along a one-dimensional operation direction determined within a two-dimensional operation surface, are determined as rotational operation, and rotational displacement of the rotational operation member due to the rotational operation is detected as operational displacement. The rotational operation member may be, for example, formed into a wheel shape. Previously, such a wheel-type rotational operation section has been mounted on a substrate, as a mounting object, having an operation section body being not affected in position by operation, for example, a mouse of a personal computer, and has been considered to be bad in operability even if mounted for a conversely unstable substrate having a body being affected in position by operation, resulting in no application case to such an unstable substrate. It is located that the one-dimensional operation section is provided on an end of the rocking shaft developing tilting displacement in the two-dimensional operation section, particularly, on an end surface of the shaft, thereby an operation section excellent in operability is formed, and eventually such a configuration is realized. In recent vehicles, many operation sections are disposed due to mounting of various new functions, so that it is being difficult to ensure a space for disposing an additional operation section in a vehicle interior. The configuration further has an advantage that since a wheel-type operation section being the one-dimensional operation section is provided on the stick-shaped rocking operation section configuring the two-dimensional operation section, an additional operation section may be provided without ensuring a new space in a vehicle interior.

For example, the rotational operation member may be designed such that the exposed surface being the operation surface of the one-dimensional operation section has a rotational orbit appearing as a plane parallel to the main surface of the operation knob of the two-dimensional operation section, and the member rotates along the rotational orbit. Thus, a long operation surface may be prepared, which enables long stroke operation, consequently a large amount of operation may be performed.

The rotational operation section may be provided with guide walls projecting from the operation surface at both end positions in a direction perpendicular to the one-dimensional operation direction of the operation surface. For example, the rotational operation section may be configured such that a groove formed to be fitted with a user finger is provided on a main surface of the operation knob, and the rotational operation member is exposed in a bottom of the groove. Since the one-dimensional operation section is operated by a finger of a user hand grasping the two-dimensional operation section, a guide wall is formed as a guide for positioning the finger on a rotational operation member of the wheel-type operation section, thereby a position of the rotational operation member may be known without viewing the member, and besides, operation in the one-dimensional operation direction is guided and thus may be easily performed.

A configuration having the rotational operation section may be provided with rotational-operation force sense applying means applying a certain force sense to a user as the user performs a certain amount of rotational operation to the rotational operation member. Thus, the user recognizes operation amount of the rotational operation section by the force sense, resulting in easy operation.

The one-dimensional operation section may be formed as a touchpad operation section having a touch operation surface as an operation surface, wherein touch movement operation, where the operation section moves while the user touches the touch operation surface, is performed, and moving displacement caused by the touch movement operation in the one-dimensional operation direction is detected as operational displacement. Previously, the touchpad operation section has been mounted in a substrate as a mounting object having an operation section body being not affected in position by operation, for example, a notebook personal computer, and has been considered to be bad in operability even if mounted for a conversely unstable substrate having a body being affected in position by operation, resulting in no application case to such an unstable substrate. It is located that the above configuration is designed such that the one-dimensional operation section is provided on an end of the rocking operation section developing tilting displacement in the two-dimensional operation section, particularly, on an end surface of the rocking operation section, and furthermore, only moving displacement in the one-dimensional direction due to touch movement operation is detected as operation amount, thereby an operation section excellent in operability is formed, and eventually such a configuration is realized. In recent vehicles, many operation sections are disposed due to mounting of various new functions, so that it is being difficult to ensure a space for disposing an additional operation section in a vehicle interior. The configuration further has an advantage that since a touch operation surface (touchpad) being the one-dimensional operation section is provided on the stick-shaped rocking operation section configuring the two-dimensional operation section, a new space need not be ensured in a vehicle interior.

The touch operation surface of the touchpad operation section may be formed over the whole of the main surface of the operation knob of the two-dimensional operation section. The whole of the main surface of the operation knob to be touched by a user hand operating the two-dimensional operation section is the touch operation surface, thereby operation in one-dimensional operation direction is detected in any portion, leading to excellent operability.

The touch operation surface of the touchpad operation section may be formed into a rectangular shape of which the width in the one-dimensional operation direction is larger than width in a direction perpendicular to the one-dimensional operation direction. Thus, since the one-dimensional operation direction corresponds to a long side direction in a planarly formed touch operation surface, a user easily recognizes the one-dimensional operation direction. Since an operation range is ensured wide in the one-dimensional operation direction, a long operation stroke may be ensured, so that a large amount of operation may be performed.

The touch operation surface of the touchpad operation section may be provided with guide walls projecting from both edge positions in a direction perpendicular to the one-dimensional operation direction. For example, a groove formed to be fitted with a user finger may be provided on a main surface of the operation knob so that the touch operation surface may be provided in a bottom of the groove. Thus, a position of the touch operation surface on the operation knob is easily known, and besides, side faces of the groove act as guide walls for touch movement operation, leading to easy operation.

A configuration having the touchpad operation section may be provided with touch-operation force sense applying means applying a certain force sense to a user as the user performs touch operation to the touch operation surface. Thus, since the user may recognize first touch operation for starting touch movement operation to the touch operation surface, if a user touches the touch operation surface by mistake, the user may recognize such false touch operation.

A configuration having the touchpad operation section may be provided with touch-movement force sense applying means applying a certain force sense to a user as the user performs the touch movement operation, which causes a certain amount of moving displacement, to the touch operation surface. Thus, the user may recognize amount of operation to the touch operation surface, leading to easy operation.

The one-dimensional operation section may be formed to be a push-type operation section including a push operation member provided on an end surface of the operation knob of the two-dimensional operation section, which may be configured such that depending on push operation to the push operation section, a predetermined display object displayed on a screen of a display is moved in one of forward and reverse directions of a one-dimensional display direction beforehand determined within the screen, or a plurality of control contents beforehand determined in changing order are changed into one of forward and reverse directions of the changing order. Since push operation is not performed in forward and reverse, two directions, movement of a display object or changing of a control object may be performed in a manner of fixing a direction to one of the forward and reverse directions.

A plurality of operation surfaces of the one-dimensional operation sections may be formed on the operation knob of the two-dimensional operation section. This increases number of regions for performing operation in the one-dimensional direction, so that operability may be improved.

The operation surfaces of the one-dimensional operation sections may be arranged such that one-dimensional operation directions thereof are parallel to one another. Since the one-dimensional operation section, which is supposed to be operated by a finger, is sometimes different in finger to be desirably used depending on users, the operation surfaces of the one-dimensional operation sections are provided in positions corresponding to various fingers respectively, thereby operation becomes easier. At least operation surfaces corresponding to the index finger and the middle finger, which tend to be used for operation, are provided, thereby operation is further facilitated.

In contrast, the operation surfaces of the one-dimensional operation sections may be arranged such that one-dimensional operation directions thereof are different from one another on the operation knob of the two-dimensional operation section. The operation surfaces of the one-dimensional operation sections may be set such that one-dimensional display directions thereof are different from one another. Thus, a suitable one-dimensional operation section is appropriately used depending on applications, thereby position instruction onto an objective position is facilitated. Particularly, such one-dimensional operation sections are arranged such that one-dimensional operation directions thereof are different from one another, and furthermore, the sections are set such that one-dimensional display directions thereof are different from one another, thereby fine adjustment operation may be performed in different directions.

The operation surfaces of the one-dimensional operation sections may be arranged such that one-dimensional operation directions thereof are perpendicular to one another, and besides, may be set such that one-dimensional display directions thereof are perpendicular to one another. To further describe, one-dimensional directions of two one-dimensional operation sections are set to be orthogonal biaxial directions, thereby fine operation in such directions may be easily performed. When a pointer image or the like is moved within a rectangular display screen, it is often required to select input-permissible areas arranged vertically and horizontally. In this case, vertical movement and horizontal movement of the pointer are basic operation, and therefore accuracy of each movement is important (particularly, accuracy of movement in a minor axis direction: in the case of a landscape screen, accuracy of vertical movement). Therefore, when input may be performed in both the directions, operation is facilitated. In addition, designable features are obtained. Particularly, when the touchpad operation section is provided with two touch operation surfaces, and respective lengthwise directions are perpendicular to each other, and thus a crosswise operation surface is formed, the designable features are further conspicuous.

When the plurality of operation surfaces of the one-dimensional operation sections are provided, the operation surfaces may be formed in such a manner that respective lengthwise directions are perpendicular to each other, and one of the orthogonal operation surfaces is in a position biased to one end side in a lengthwise direction of the other operation surface. Since the one-dimensional operation section, which is supposed to be operated by a finger, is sometimes different in finger to be desirably used depending on users, the operation surfaces of the one-dimensional operation sections are provided in positions corresponding to various fingers respectively, thereby operation becomes easier. However, a hand holds the operation knob of the two-dimensional operation section, wherein four fingers of the index, middle, ring and little fingers are located on a back side of the main surface of the operation knob, and easily subjected to operation of moving the fingers from the back side to a longitudinally near side, but the thumb is located on a one of right and left side-face sides of the main surface of the operation knob, and easily subjected to operation of moving the finger from the one side-face side to the other side-face side. Furthermore, the thumb tends to be located at a position on a slightly longitudinally near side with respect to a central position of the main surface of the operation knob. Therefore, all operation surfaces of fingers other than the thumb are arranged to be parallel to one another in a longitudinal direction, and the thumb is arranged in a position in a lateral direction perpendicular to the longitudinal direction, and on a near side with respect to the center in the longitudinal direction, leading to a one-dimensional operation section excellent in operability using fingers.

When a position instruction image such as pointer image is determined as a predetermined display object displayed within a screen of a display device, an in-vehicle manipulation apparatus may include a position specifying input section for performing position specifying input to a position indicated by the position instruction image within the screen of the display device. This enables input operation to an operation image (icon) or the like displayed on a screen, in addition to operation of indicating a position within the screen by the position instruction image.

In this case, the one-dimensional operation section is configured such that pressing operation in a rocking axis direction of the two-dimensional operation section may be performed, thereby the position specifying input section may be combined by the one-dimensional operation section, and the pressing operation may be determined as the position specifying input. The position specifying input refers to operation of determining input at a position indicated by the pointer image or the like within a screen (position specifying input). Such position specifying input is operation that is desired to be immediately performed when an objective position is indicated during performing position instruction operation by the one-dimensional operation section. When the above configuration is used, position specifying input may be immediately performed only by directly pressing a one-dimensional operation section being operated. In the case of the wheel-type operation section, operation of pressing and displacing the wheel member in a rocking axis direction is performed, and in the case of the touchpad operation section, operation of pressing and displacing the whole of touch panel forming a touch operation surface is performed. In the case of the touchpad operation section, the position instruction input operation may be operation of touching a touch operation surface twice within a certain period.

The two-dimensional operation section may include a tilting displacement detection section detecting tilting displacement of a rocking shaft occurring along with operation of the operation knob by a user within a manipulation apparatus body supporting the rocking shaft in a rocking-allowable manner. In such a configuration, the one-dimensional operation section may include a one-dimensional operation member that has an operation surface formed thereon, and thus becomes an operation object of a user, an operation amount detection section that detects amount of operation performed to the one-dimensional operation member, a signal output section that outputs an operation signal based on the detected operation amount, and a signal wiring section that includes a bendable member extending to a side of the manipulation apparatus body in order to input the outputted operation signal to a main control circuit section incorporated in the manipulation apparatus body. Thus, the signal may be stably transmitted to the manipulation apparatus body side without obstructing tilting displacement incidental to operation to the two-dimensional operation section.

In this case, the operation knob of the two-dimensional operation section may be configured to accommodate the one-dimensional operation member in a manner of exposing the operation surface of the member on a main surface side of the knob, and furthermore, to form a housing accommodating the one-dimensional operation detection section and the signal output section. Considering that it is difficult in recent vehicles to ensure a space in a vehicle interior, the configuration may contribute to space saving because the detection section and the signal output section are disposed in the knob. The signal wiring section may be configured to extend from the signal output section to the outside via a wiring hole penetrating a main back surface of the housing. This may extremely decrease exposure of the signal wiring section to the outside, so that degradation in design is reduced.

The operation knob of the two-dimensional operation section may be formed to have an outer circumferential wall extending from an outer circumferential edge of the main surface of the knob, from which the operation surface of the one-dimensional operation section is exposed, to a rocking center side of the rocking shaft. Thus, the two-dimensional operation section may be operated in such a manner that the outer circumferential wall of the operation knob acts as a holding portion of a user hand, and furthermore, a finger of the hand may be used to operate the one-dimensional operation section in the main surface of the operation knob. The outer circumferential wall may be formed, for example, as a wall having an outer circumferential surface being perpendicular to the main surface of the operation knob.

In the above, an input apparatus mounted in a vehicle is characterized by having a first input device operated by operation of an operator, a second input device that is operated by operation of an operator, the operation being similar to or different from the operation to the first input device, and integrally provided with the first input device as a part of the first input device, and holding means for stopping operation of the first input device and holding the first input device, wherein when operation to the second input device is performed, the holding means temporarily locks operation of the first input device so as to hold the first input device not to work.

An input apparatus, which is mounted in a vehicle, and performs predetermined input to an output device, is characterized by having a first input device operated by operation of an operator, a second input device that is operated by operation of an operator, the operation being similar to or different from the operation to the first input device, and integrally provided with the first input device as a part of the first input device, and holding means for stopping operation of the first input device and holding the first input device, wherein when operation to the second input device is performed during performing operation to the first input device, and output from the output device relates to output produced when the second input device is operated, the holding means temporality locks operation of the first input device so as to hold the first input device not to work.

The in-vehicle input apparatus according to the first invention is configured as above, wherein when operation to the second input device is performed, the holding means temporality locks operation of the first input device. Thus, an operator may concentrate on operation of the second input device without feeling fear that the first input device may be operated by mistake.

In the second invention, when operation to the second input device is performed during performing operation to the first input device, and output from the output device relates to output produced when the second input device is operated, the holding means temporality locks operation of the first input device. That is, in the case that the holding means locks operation of the first input device, determination is made on relation to output from the output device. Thus, even if the second input device is operated by mistake during operating the first input device, influence of such false operation may be reduced.

The first input device of the inventions is locked with start of operation of the second input device as a trigger, and such a lock state is released by detecting finish of the operation.

Thus, since the first input device may be operated immediately after operation of the second input device is finished, the first and second input devices may be smoothly (without feeling any stress) operated.

It is acceptable that the first input device is a joystick device, and the holding means is means where a motor connected to a shaft of the joystick device is allowed to effect electrical holding means so that operation of the first input device is held. Thus, a configuration of an input apparatus may be simplified.

Respective operation methods of the first and second input devices may be different from each other (for example, one is rocking operation, and the other is rotational operation), or may be similar to each other (for example, one is operation of rotating a device about an horizontal axis, and the other is operation of rotating a device about a vertical axis).

The above processings such as calculations and determinations are not limited being executed by the CPU. The control unit may have various structures including the CPU shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alterations may be diversely made to the above embodiments without departing from the spirit of the present invention.

What is claimed is:

1. An in-vehicle manipulation apparatus located in an operable position for a user sitting on a seat, comprising:
    a two-dimensional operation section including a stick-shaped rocking shaft having an end having an operation knob, the operation knob being operated within a predetermined two-dimensional operation surface as an operation range such that a rocking axis of the rocking shaft tilts from a predetermined neutral angular position to a direction corresponding to an instructed position;
    a one-dimensional operation section having an operation surface exposed from a main surface of the operation knob, the main surface being an end surface of the rocking shaft, the one-dimensional operation section can be operated in a predetermined one-dimensional operation direction relative to the operation surface within the two-dimensional operation surface;
    a display device disposed in a screen-viewable manner for the user;
    two-dimensional operation control means for two-dimensionally moving a predetermined display object being displayed on a screen of the display device based on operation to the two-dimensional operation section; and
    one-dimensional operation control means for performing at least one of the following i) and ii) to the predetermined display object being displayed on the screen based on operation to the one-dimensional operation section:
    i) display movement control of moving the display object in a predetermined one-dimensional display direction corresponding to the one-dimensional operation direction along which operation is performed; and
    ii) control content change control of sequentially changing a plurality of control contents in predetermined changing order to one of forward and reverse directions of the changing order corresponding to the one-dimensional operation direction along which operation is performed,
    wherein the display object is a pointer image that can move to an optional position on the screen of the display device.

2. The in-vehicle manipulation apparatus according to claim 1, further comprising:
    a position specifying input section for performing position specifying input to a position indicated by the pointer image within the screen of the display device.

3. The in-vehicle manipulation apparatus according to claim 2,
    wherein the one-dimensional operation section can perform pressing operation in a rocking axis direction of the two-dimensional operation section, and
    the position specifying input section also functions as the one-dimensional operation section, and the pressing operation functions as the position specifying input.

4. The in-vehicle manipulation apparatus according to claim 3, wherein the touch operation surface is the whole of the main surface of the operation knob.

5. The in-vehicle manipulation apparatus according to claim 1,
    wherein the one-dimensional operation section is a touchpad operation section,
    the operation surface has a touch operation surface, and
    the touchpad operation section detects moving displacement in the one-dimensional operation direction of touch movement operation where the touchpad operation section moves while the user touches the touch operation surface.

6. The in-vehicle manipulation apparatus according to claim 5, wherein the touch operation surface is in a rectangular shape where a width in the one-dimensional operation direction is larger than a width in a direction perpendicular to the one-dimensional operation direction.

7. The in-vehicle manipulation apparatus according to claim 5, wherein the touch operation surface has guide walls projecting from both edge positions in a direction perpendicular to the one-dimensional operation direction.

8. The in-vehicle manipulation apparatus according to claim 5, further comprising:
touch-operation force sense applying means applying a certain force sense to the user as the user performs touch operation to the touch operation surface.

9. The in-vehicle manipulation apparatus according to claim 5, further comprising:
touch-movement force sense applying means applying a certain force sense to the user as the user performs touch movement operation causing a certain amount of moving displacement to the touch operation surface.

10. The in-vehicle manipulation apparatus according to claim 1, wherein the main surface of the operation knob has a plurality of operation surfaces of one-dimensional operation sections.

11. The in-vehicle manipulation apparatus according to claim 10, wherein the plurality of operation surfaces of the one-dimensional operation sections are arranged such that the one-dimensional operation directions of the operation surfaces are parallel to one another.

12. The in-vehicle manipulation apparatus according to claim 10, wherein the plurality of operation surfaces of the one-dimensional operation sections include operation surfaces different in the one-dimensional operation direction from one another.

13. The in-vehicle manipulation apparatus according to claim 12, wherein the operation surfaces of the one-dimensional operation sections being different in the one-dimensional operation direction respectively correspond to one-dimensional display directions different from one another.

14. The in-vehicle manipulation apparatus according to claim 13, wherein the plurality of operation surfaces of the one-dimensional operation sections are arranged such that the one-dimensional operation directions are perpendicular to one another, and the one-dimensional display directions are also perpendicular to one another.

15. The in-vehicle manipulation apparatus according to claim 14,
wherein each of the one-dimensional operation sections is a touchpad operation section,
each of the operation surfaces has a touch operation surface,
the touchpad operation section detects moving displacement in the one-dimensional operation direction of touch movement operation where the touchpad operation section moves while the user touches the touch operation surface,
each of the touch operation surfaces is in a rectangular shape where a width in the one-dimensional operation direction is larger than a width in a direction perpendicular to the one-dimensional operation direction, and
the touch operation surfaces is in a cross shape where lengthwise directions of the touch operation surfaces are perpendicular to one another.

16. The in-vehicle manipulation apparatus according to claim 15,
wherein each of the one-dimensional operation sections is a touchpad operation section,
each of the operation surfaces has a touch operation surface,
the touchpad operation section detects moving displacement in the one-dimensional operation direction of touch movement operation where the touchpad operation section moves while the user touches the touch operation surface,
each of the touch operation surfaces has a rectangular shape where a width in the one-dimensional operation direction is larger than a width in a direction perpendicular to the one-dimensional operation direction, and
the touch operation surfaces of the touchpad operation sections have lengthwise directions perpendicular to one another, and one of the operation surfaces is located in a position biased to one end side in a lengthwise direction of the other operation surface.

17. The in-vehicle manipulation apparatus according to claim 10, further comprising:
operation-surface position customizing means for customizing a position of each of the operation surfaces on the main surface of the movable operation section.

18. The in-vehicle manipulation apparatus according to claim 17,
wherein each of the one-dimensional operation sections is a touchpad operation section,
each of the operation surfaces has a touch operation surface,
the touchpad operation section detects moving displacement in the one-dimensional operation direction of touch movement operation where the touchpad operation section moves while the user touches the touch operation surface,
the touchpad operation section has an operation surface settable area on the main surface of the movable operation section, and
the touchpad operation section has the operation-surface position customizing means for customizing a setting position of the touch operation surface within the operation surface settable area.

19. An in-vehicle input apparatus, comprising:
a first input device manipulated by operation of an operator;
a second input device manipulated by operation of an operator and integrally provided with the first input device as a part of the first input device, the operation being similar to or different from the operation to the first input device; and
holding means for stopping operation of the first input device and holding the first input device,
wherein when the following condition i) is satisfied, the holding means temporarily locks operation of the first input device so as to hold the first input device not to work:
i) operation to the second input device is performed:
wherein the holding means locks the first input device in response to start of operation of the second input device as a trigger, and
the holding means detects that the operation of the second input device is finished, thereby releases lock of the first input device.

20. An in-vehicle input apparatus performing predetermined input to an output device, comprising:
a first input device manipulated by operation of an operator;
a second input device manipulated by operation of an operator, the operation being similar to or different from the operation to the first input device, and integrally provided with the first input device as a part of the first input device; and holding means for stopping operation of the first input device and holding the first input device, wherein when the following conditions i) and ii) are satisfied, the holding means temporality locks operation of the first input device so as to hold the first input device not to work:

i) operation to the second input device is performed during operation of the first input device, and ii) output from the output device relates to output produced when the second input device is manipulated:

wherein the holding means locks the first input device in response to start of operation of the second input device as a trigger, and the holding means detects that the operation of the second input device is finished, thereby releases lock of the first input device.

21. An in-vehicle manipulation apparatus located in an operable position for a user sitting on a seat, comprising:

a two-dimensional operation section including a stick-shaped rocking shaft having an end having an operation knob, the operation knob being operated within a predetermined two-dimensional operation surface as an operation range such that a rocking axis of the rocking shaft tilts from a predetermined neutral angular position to a direction corresponding to an instructed position;

a one-dimensional operation section having an operation surface exposed from a main surface of the operation knob, the main surface being an end surface of the rocking shaft, the one-dimensional operation section can be operated in a predetermined one-dimensional operation direction relative to the operation surface within the two-dimensional operation surface;

a display device disposed in a screen-viewable manner for the user;

two-dimensional operation control means for two-dimensionally moving a predetermined display object being displayed on a screen of the display device based on operation to the two-dimensional operation section; and one-dimensional operation control means for performing at least one of the following i) and ii) to the predetermined display object being displayed on the screen based on operation to the one-dimensional operation section:

i) display movement control of moving the display object in a predetermined one-dimensional display direction corresponding to the one-dimensional operation direction along which operation is performed; and ii) control content change control of sequentially changing a plurality of control contents in predetermined changing order to one of forward and reverse directions of the changing order corresponding to the one-dimensional operation direction along which operation is performed, wherein the display object is a pointer image that sequentially moves on a plurality of predetermined operation images displayed on the screen of the display device.

22. An in-vehicle manipulation apparatus located in an operable position for a user sitting on a seat, comprising:

a two-dimensional operation section including a stick-shaped rocking shaft having an end having an operation knob, the operation knob being operated within a predetermined two-dimensional operation surface as an operation range such that a rocking axis of the rocking shaft tilts from a predetermined neutral angular position to a direction corresponding to an instructed position; and a one-dimensional operation section having an operation surface exposed from a main surface of the operation knob, the main surface being an end surface of the rocking shaft, the one-dimensional operation section can be operated in a predetermined one-dimensional operation direction relative to the operation surface within the two-dimensional operation surface, wherein the two-dimensional operation section has a manipulation apparatus body supporting the rocking shaft in a rocking-allowable manner, the manipulation apparatus body has a tilting displacement detection section within the body, the tilting displacement detection section detecting tilting displacement of the rocking shaft occurring along with operation of the operation knob by the user, and the one-dimensional operation section includes a one-dimensional operation member having the operation surface as an operation object of the user, an operation amount detection section for detecting amount of operation performed to the one-dimensional operation member, a signal output section for outputting an operation signal based on the detected operation amount, and a signal wiring section including a bendable member extending to the manipulation apparatus body in order to input the outputted operation signal to a main control circuit section accommodated in the manipulation apparatus body.

* * * * *